(12) United States Patent
Ouslis et al.

(10) Patent No.: US 8,570,446 B2
(45) Date of Patent: Oct. 29, 2013

(54) METHOD AND APPARATUS FOR PROCESSING A SIGNAL WITH A COARSELY POSITIONED IF FREQUENCY

(76) Inventors: Chris Ouslis, Kleinburg (CA); Steve Selby, Scarborough (CA); Lance Greggain, Woodbridge (CA); Vyacheslav Shyshkin, Etobicoke (CA); Larry Silver, Etobicoke (CA)

( * ) Notice: Subject to any disclaimer, the term of this patent is extended or adjusted under 35 U.S.C. 154(b) by 1121 days.

(21) Appl. No.: 12/041,720

(22) Filed: Mar. 4, 2008

(65) Prior Publication Data

US 2008/0225168 A1 Sep. 18, 2008

Related U.S. Application Data

(63) Continuation-in-part of application No. 12/038,781, filed on Feb. 27, 2008.

(60) Provisional application No. 60/894,832, filed on Mar. 14, 2007.

(51) Int. Cl.
*H04N 5/50* (2006.01)

(52) U.S. Cl.
USPC ............ 348/735; 348/726; 348/737; 348/555; 348/558; 348/607; 348/572; 725/131; 725/139; 725/151; 455/182.3; 455/188.1; 455/180.3; 455/213; 375/260

(58) Field of Classification Search
USPC .......... 725/131, 139, 151; 348/725, 726, 735, 348/737, 555, 558, 607, 572; 455/213, 455/188.1, 180.3
See application file for complete search history.

(56) References Cited

U.S. PATENT DOCUMENTS

| | | |
|---|---|---|
| 3,555,182 A | 1/1971 | Griepentrog |
| 4,253,118 A | 2/1981 | Flasza |
| 4,340,975 A | 7/1982 | Onishi et al. |
| 4,647,875 A | 3/1987 | Argintaru et al. |
| 4,831,378 A | 5/1989 | Baars et al. |
| 4,974,087 A | 11/1990 | Rumreich |
| 5,200,826 A | 4/1993 | Seong |
| 5,493,581 A | 2/1996 | Young et al. |
| 5,574,997 A | 11/1996 | Hong |

(Continued)

FOREIGN PATENT DOCUMENTS

| | | |
|---|---|---|
| EP | 0 600 637 A1 | 12/1992 |
| EP | 1032173 A2 | 8/2000 |

(Continued)

OTHER PUBLICATIONS

Maxim Hi-Fi Single-Chip Broadband TV Tuners, Maxim Integrated Products 19-3307; Rev 1; 4/05.

(Continued)

*Primary Examiner* — Jason Salce
(74) *Attorney, Agent, or Firm* — Trellis IP Law Group, PC

(57) ABSTRACT

Various embodiments are described herein for a universal television receiver that is capable of processing television channel signals broadcast according to a variety of analog and digital broadcast standards. Analog processing includes using coarse filtering with pass bands that are wide enough to accommodate frequency shifts in a desired television channel signal and analog circuitry variability and digital processing includes tracking a carrier frequency of the desired television channel signal to generate and apply a frequency shift feedback signal to compensate for frequency shifts in the carrier frequency.

29 Claims, 24 Drawing Sheets

(56) References Cited

U.S. PATENT DOCUMENTS

| | | | |
|---|---|---|---|
| 5,640,698 | A | 6/1997 | Shen et al. |
| 5,737,035 | A | 4/1998 | Rotzoll |
| 5,745,848 | A | 4/1998 | Robin |
| 5,754,252 | A | 5/1998 | Kuhn et al. |
| 5,784,414 | A | 7/1998 | Bruekers et al. |
| 5,796,358 | A | 8/1998 | Shih et al. |
| 5,982,457 | A | 11/1999 | Limberg |
| 6,026,129 | A | 2/2000 | Ohta et al. |
| 6,046,775 | A | 4/2000 | Jonnalagadda et al. |
| 6,081,822 | A | 6/2000 | Hillery et al. |
| 6,094,236 | A | 7/2000 | Abe et al. |
| 6,115,419 | A * | 9/2000 | Meehan ............... 375/233 |
| 6,147,713 | A | 11/2000 | Robbins et al. |
| 6,151,368 | A | 11/2000 | Cochran |
| 6,177,964 | B1 | 1/2001 | Birleson et al. |
| 6,369,857 | B1 | 4/2002 | Balaban et al. |
| 6,377,315 | B1 | 4/2002 | Carr et al. |
| 6,430,234 | B1 | 8/2002 | Perlow |
| 6,433,830 | B1 | 8/2002 | Groff et al. |
| 6,498,927 | B2 | 12/2002 | Kang et al. |
| 6,577,855 | B1 | 6/2003 | Moore et al. |
| 6,593,974 | B1 | 7/2003 | Brilka et al. |
| 6,625,433 | B1 | 9/2003 | Poirier et al. |
| 6,643,502 | B1 | 11/2003 | Van De Plassche et al. |
| 6,714,776 | B1 | 3/2004 | Birleson |
| 6,725,463 | B1 | 4/2004 | Birleson |
| 6,741,650 | B1 | 5/2004 | Painchaud et al. |
| 6,744,330 | B1 | 6/2004 | Jones et al. |
| 6,759,904 | B2 | 7/2004 | Behzad |
| 6,898,257 | B2 | 5/2005 | Fischer et al. |
| 6,915,121 | B2 | 7/2005 | Python et al. |
| 6,985,710 | B1 | 1/2006 | Margairaz et al. |
| 7,075,585 | B2 | 7/2006 | Favrat et al. |
| 7,079,195 | B1 | 7/2006 | Birleson et al. |
| 7,295,634 | B2 * | 11/2007 | Sadowsky ................ 375/346 |
| 7,937,053 | B2 | 5/2011 | Tsai et al. |
| 2001/0005164 | A1 | 6/2001 | Okamoto et al. |
| 2002/0047942 | A1 | 4/2002 | Vorenkamp et al. |
| 2002/0106018 | A1 * | 8/2002 | D'Luna et al. ........... 375/240.01 |
| 2002/0169603 | A1 | 11/2002 | Sculley |
| 2003/0026358 | A1 | 2/2003 | Kawai |
| 2003/0103163 | A1 | 6/2003 | Hutchinson et al. |
| 2003/0215032 | A1 | 11/2003 | Langlais et al. |
| 2004/0061804 | A1 | 4/2004 | Favrat et al. |
| 2004/0063415 | A1 | 4/2004 | Python et al. |
| 2004/0125240 | A1 | 7/2004 | Stikvoort et al. |
| 2004/0161062 | A1 | 8/2004 | Richey et al. |
| 2004/0207476 | A1 | 10/2004 | Itaya |
| 2004/0254488 | A1 | 12/2004 | Nelson et al. |
| 2005/0007498 | A1 | 1/2005 | Eswein et al. |
| 2005/0147178 | A1 | 7/2005 | Kikuchi |
| 2005/0157818 | A1 | 7/2005 | Dauphinee |
| 2005/0177860 | A1 | 8/2005 | Goyal et al. |
| 2005/0195336 | A1 | 9/2005 | Waight et al. |
| 2005/0221784 | A1 | 10/2005 | Gomez et al. |
| 2005/0253659 | A1 | 11/2005 | Favrat et al. |
| 2005/0260961 | A1 | 11/2005 | Cowley et al. |
| 2005/0264359 | A1 | 12/2005 | Juang et al. |
| 2005/0265486 | A1 | 12/2005 | Crawley |
| 2005/0280742 | A1 | 12/2005 | Jaffe |
| 2006/0001779 | A1 | 1/2006 | Favrat et al. |
| 2006/0026661 | A1 * | 2/2006 | McMullin et al. ............ 725/127 |
| 2006/0040628 | A1 | 2/2006 | Porret et al. |
| 2006/0055824 | A1 | 3/2006 | Zhu et al. |
| 2006/0055832 | A1 * | 3/2006 | Lee .................... 348/735 |
| 2006/0056327 | A1 * | 3/2006 | Coersmeier ............... 370/315 |
| 2006/0071841 | A1 | 4/2006 | Yang et al. |
| 2006/0072686 | A1 | 4/2006 | Steinbach et al. |
| 2006/0195883 | A1 | 8/2006 | Proctor et al. |
| 2007/0058739 | A1 | 3/2007 | Aytur et al. |
| 2007/0098085 | A1 | 5/2007 | Shih |
| 2007/0146553 | A1 | 6/2007 | Mori et al. |
| 2007/0183546 | A1 | 8/2007 | Ray |
| 2007/0184794 | A1 | 8/2007 | Drogi et al. |
| 2007/0241821 | A1 | 10/2007 | Dally et al. |
| 2008/0032660 | A1 | 2/2008 | Clark et al. |
| 2008/0062324 | A1 | 3/2008 | Wu |
| 2008/0225170 | A1 | 9/2008 | Silver et al. |
| 2008/0225174 | A1 | 9/2008 | Greggain et al. |
| 2008/0225175 | A1 | 9/2008 | Shyshkin et al. |
| 2008/0225176 | A1 | 9/2008 | Selby et al. |
| 2008/0225182 | A1 | 9/2008 | Silver et al. |

FOREIGN PATENT DOCUMENTS

| | | |
|---|---|---|
| EP | 1 296 456 A2 | 3/2003 |
| EP | 1 416 642 A2 | 5/2004 |
| EP | 1 562 372 A2 | 8/2005 |
| WO | WO 2004/068731 | 11/1996 |
| WO | WO 99/49582 | 9/1999 |
| WO | WO 01/20792 A1 | 3/2001 |
| WO | WO 2004/070940 A1 | 8/2004 |
| WO | WO 2005/096623 A1 | 10/2005 |
| WO | 2006007073 A1 | 1/2006 |

OTHER PUBLICATIONS

Xceive, "RF to baseband transceivers", Company presentation, Oct. 25, Santa Clara, CA, U.S.A.

Chinese Office Action, as issued in corresponding CN Patent Application No. 200880015924.1; dated Mar. 30, 2011 (English version as translated by CCPIT Patent & Trademark Law Office).

International Search Report as issued in corresponding PCT Application No. PCT/CA2008/000482; dated Jul. 24, 2008.

Written Opinion of the International Searching Authority as issued in corresponding PCT Application No. PCT/CA2008/000482; dated Jul. 24, 2008.

Non-Final Office Action mailed Jul. 10, 2012 for U.S. Appl. No. 12/041,685, 25 pages.

Final Office Action mailed Jun. 26, 2012 for U.S. Appl. No. 12/041,695, 10 pages.

Notice of Allowance mailed Aug. 13, 2012 for U.S. Appl. No. 12/041,926, 15 pages.

Non-final Office Action mailed Oct. 25, 2011 for U. S. Appl. No. 12/041,695, 21 pages.

Final Office Action mailed Jun. 6, 2012 for U. S. Appl. No. 12/041,704, 22 pages.

Non-Final Office Action mailed Oct. 13, 2011 for U.S. Appl. No. 12/041,704, 25 pages.

Final Office Action mailed May 22, 2012 for U. S. Appl. No. 12/038,781, 21 pages.

Non-Final Office Action mailed Nov. 9, 2011 for U.S. Appl. No. 12/038,781, 22 pages.

Non-Final Office Action mailed Dec. 20, 2011 for U.S. Appl. No. 12/041,926, 13 pages.

* cited by examiner

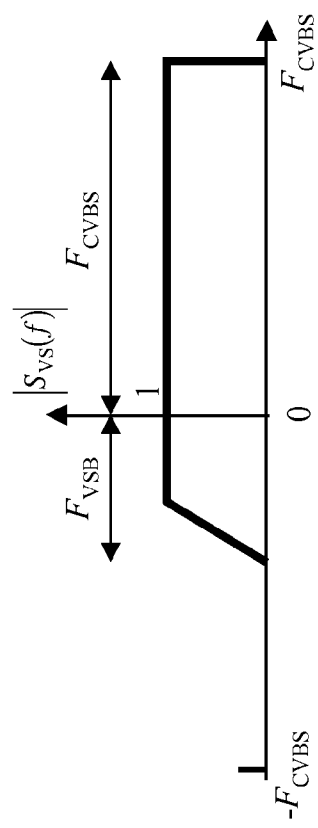
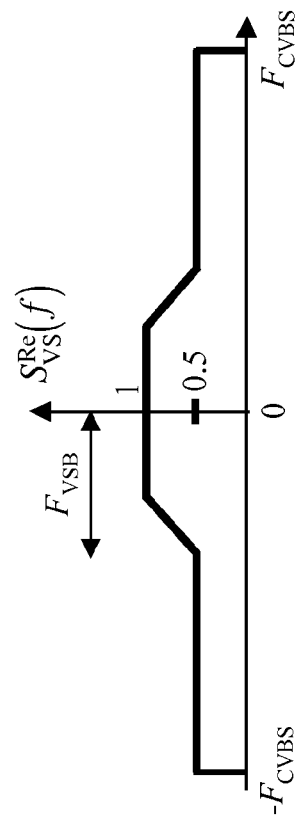
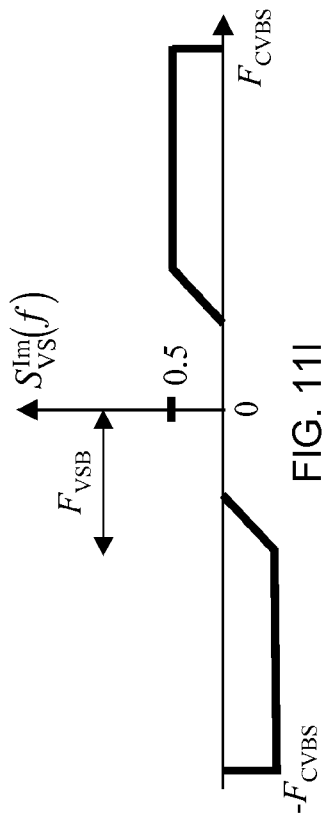
FIG. 11G
FIG. 11H
FIG. 11I

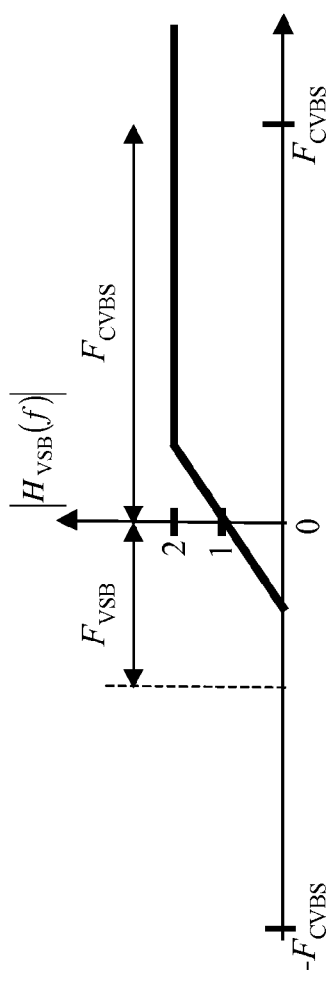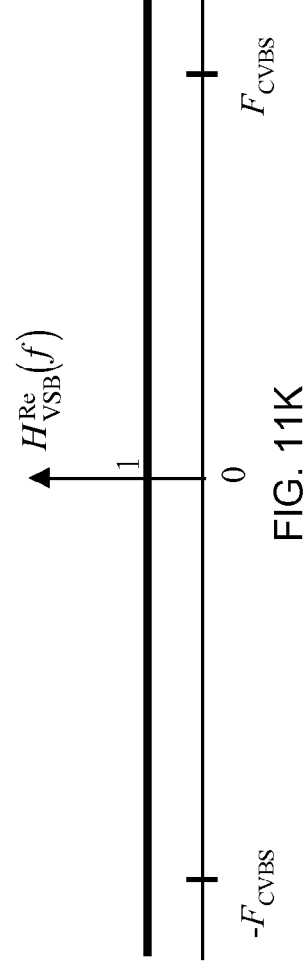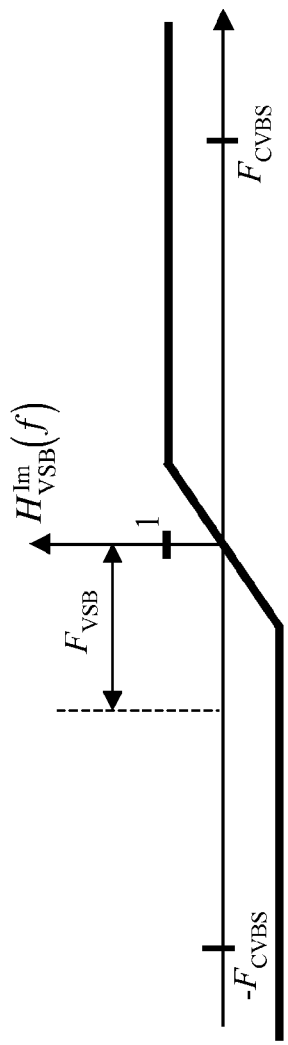

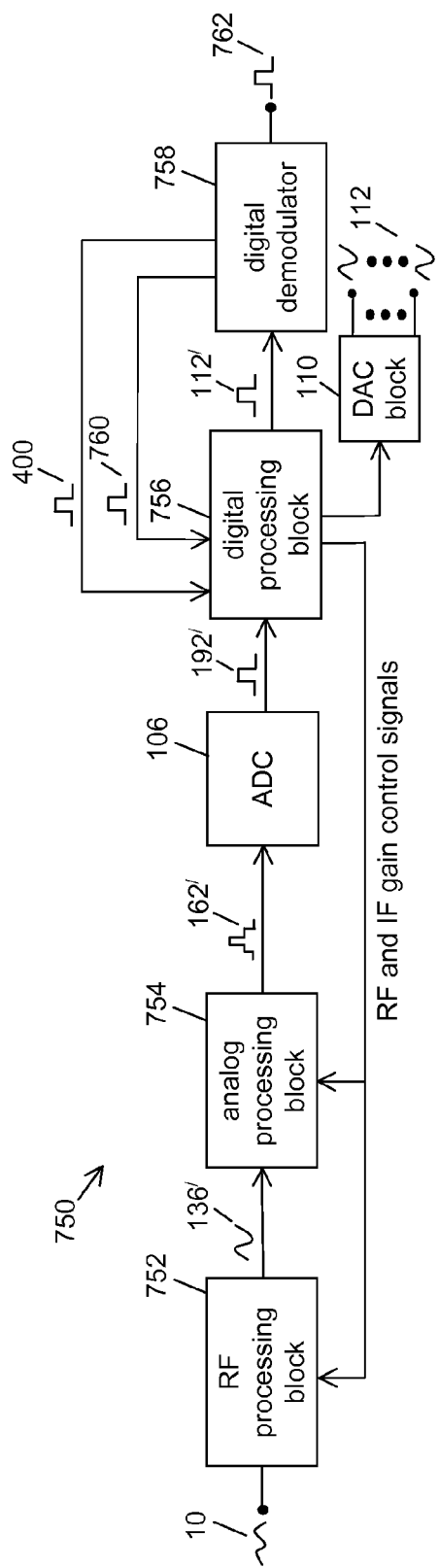
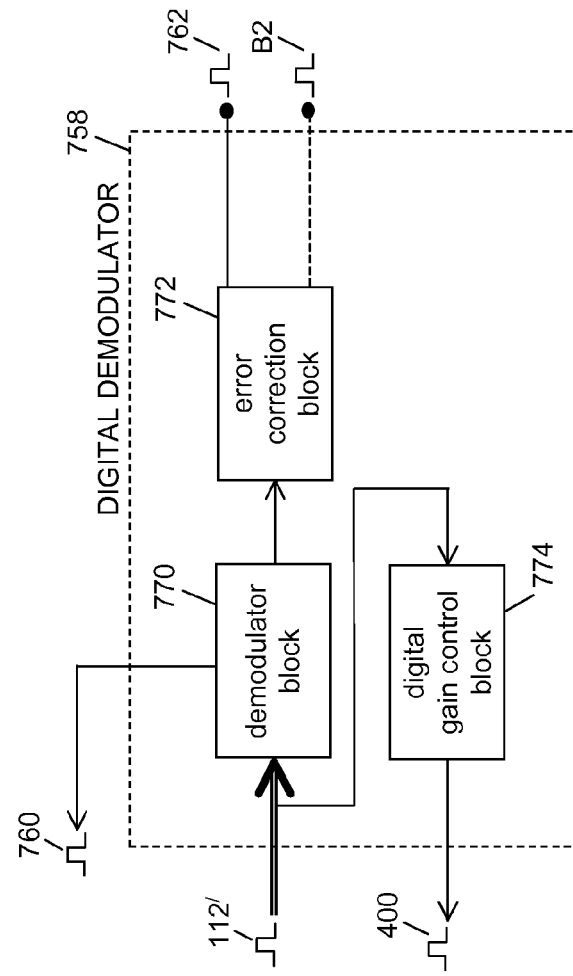
FIG. 17A
FIG. 17B

METHOD AND APPARATUS FOR PROCESSING A SIGNAL WITH A COARSELY POSITIONED IF FREQUENCY

REFERENCE TO RELATED APPLICATION

This application is a continuation-in-part of U.S. application Ser. No. 12/038,781 filed on Feb. 27, 2008, which claims the benefit of U.S. Provisional Application No. 60/894,832 filed on Mar. 14, 2007.

FIELD

Various embodiments of systems, system blocks and corresponding methods are described herein that relate to a universal television receiver that can process television signals that are broadcast according to different television broadcast standards.

BACKGROUND

Television signals are broadcast according to several different types of television broadcast standards. These television broadcast standards include variations of NTSC, SECAM and PAL for analog signals, and ATSC, DVB-T and ISDB-T for digital signals. These television broadcast standards have different characteristics such as bandwidth, modulation type and the location of audio in the case of analog signals. Accordingly, traditional television receivers have been specifically built to process certain television signals based on a particular television broadcast standard. Traditional television receivers typically use a SAW filter that has a very sharp frequency response with a passband that corresponds to the bandwidth of the television signal that is being received. The SAW filter is a relatively expensive component that cannot be integrated onto a chip, and does not readily allow a television receiver to receive television signals that are transmitted according to different television broadcast standards, without further specialized processing.

SUMMARY

In one aspect of the invention, at least one of the embodiments described herein provides a television receiver for processing received television signals to provide video and audio information for a desired television channel signal. The television receiver comprises an analog processing block for providing coarse filtering and amplification to a multi-channel television signal to produce a first signal, the coarse filtering being configured to use pass bands that are wide enough to accommodate frequency shifts in the desired television channel signal and analog circuitry variability; an analog to digital converter coupled to the analog processing stage for digitizing the first signal to produce a second signal; and a digital processing block coupled to the analog to digital converter for processing the second signal to obtain the video and audio information for the desired television channel signal. The receiver is configured to track a carrier frequency of the desired television channel signal and generate and apply a frequency shift feedback signal to compensate for frequency shifts in the carrier frequency.

In another aspect of the invention, at least one of the embodiments described herein provides a method of processing received television signals in a television receiver to provide video and audio information for a desired television channel signal. The method comprises:

providing coarse filtering and amplification to a multi-channel television signal to produce a first signal, the coarse filtering being configured to use pass bands that are wide enough to accommodate frequency shifts in the desired television channel signal and analog circuitry variability in the television receiver;

digitizing the first signal to produce a second signal, and processing the second signal to obtain the video and audio information for the desired television channel signal by tracking a carrier frequency of the desired television channel signal and generating and applying a frequency shift feedback signal to compensate for frequency shifts in the carrier frequency.

BRIEF DESCRIPTION OF THE DRAWINGS

For a better understanding of the various embodiments described herein and to show more clearly how they may be carried into effect, reference will now be made, by way of example only, to the accompanying drawings in which:

FIGS. 11G, 11H and 11I show the magnitude, real and imaginary parts of a signal that is processed by a VSB filter of the video processing block;

FIGS. 11J, 11K and 11L show the magnitude, real and imaginary parts of the frequency response of the VSB filter of the video processing block;

FIG. 17A is a block diagram of another exemplary embodiment of a universal television receiver;

FIG. 17B is a block diagram of an exemplary embodiment of a digital television demodulator;

DETAILED DESCRIPTION

Figure 1A:
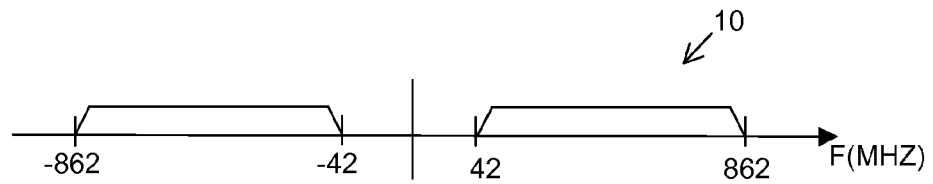
FIG. 1A is a spectral diagram of the entire television band.

It will be appreciated that for simplicity and clarity of illustration, elements shown in the figures have not necessarily been drawn to scale. Further, where considered appropriate, reference numerals may be repeated among the figures to indicate corresponding or analogous elements. In addition, numerous specific details are set forth in order to provide an adequate understanding for practicing the various embodiments described herein. However, it will be understood by those of ordinary skill in the art that the various embodiments described herein may be practiced without these specific details. In other instances, some methods, procedures and components have not been described in detail since they are well known to those skilled in the art. Furthermore, it should be understood that the word "exemplary" is used herein to denote an example embodiment of a device or method and not necessarily indicate a preferred implementation of a device or method.

Referring now to FIG. 1A, shown therein are the spectral characteristics of a wideband television signal 10. The wideband television signal 10 is essentially continuous with a positive component ranging from 42 to 862 MHz and a corresponding negative component ranging from −42 to −862 MHz. An individual television signal has a bandwidth in the range of 6-8 MHz depending on the television broadcast standard with which the television signal corresponds. For instance, NTSC television signals that are used in North America have a bandwidth of 6 MHz, while television signals that are used elsewhere may have a bandwidth of 7 or 8 MHz. In some countries, different bandwidths can be used in different parts of the television band. Other parameters will also vary for different television broadcast standards as is commonly known to those skilled in the art.

Television signal quality can be dictated by differences in the power of the television signals that are received at the television receiver. The difference in power depends on the local geography and the location of the transmitters with respect to the television receiver. A measure of good television signal quality can be specified in terms of SNR which depends on the television broadcast standard. For instance, analog NTSC television signals may benefit from greater than 45 dB SNR for good signal quality for a Composite Video Baseband Signal (CVBS) output. Meanwhile, digital television signals may require as little as 15 dB carrier-to-noise ratio for good signal quality in the case of ATSC, since processing of digital television signals uses error detection and correction.

Figure 1B:
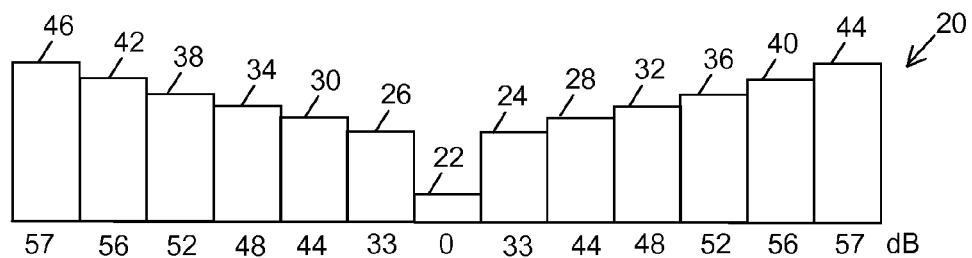
FIG. 1B is a diagram of a blocking profile showing an exemplary range of signal strength for received television signals.

Referring now to FIG. 1B, shown therein is a television signal blocking profile 20, based on the US ATSC A/74 Receiver Performance Guidelines, which is expected to be a widely accepted standard. FIG. 1B shows that there can be a wide range in terms of the strength of a desired television channel signal 22, relative to the strength of other channels at nearby frequencies. For instance, according to the ATSC performance guidelines for digital receivers, the weakest signal strength for the desired television channel signal 22 that should be correctly received is −83 dBm, while the strongest signal strength is −4 dBm. Furthermore, the desired television channel signal 22 may have strong undesired television channel signals 24 and 26 directly adjacent with a relative power of 33 dB. Subsequent adjacent television channels 28 to 46 can increase in power by 4 dB for each additional channel separation until 57 dB is reached, at which point reception should still be possible. Conventional television receivers deal with this technical challenge in part by filtering a major portion of the received television signal by using a tracking filter right at the input of the tuning stage of the television receiver.

Figure 2:
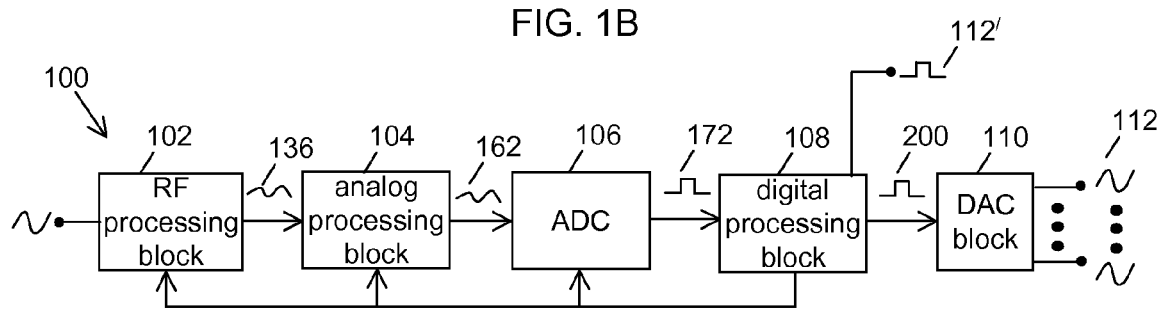
FIG. 2 is a high-level block diagram of an exemplary embodiment of a universal television receiver.

Referring now to FIG. 2, shown therein is a high-level block diagram of an exemplary embodiment of a universal television receiver 100 that can receive and process digital and analog television signals that are transmitted according to a variety of broadcast signals, and therefore have different television channel signal bandwidths. The universal television receiver 100 comprises an RF processing block 102, an analog processing block 104, an analog to digital converter (ADC) 106, a digital processing block 108, and a digital to analog converter (DAC) block 110. The universal television receiver 100 receives the wideband television signal 10 and provides a processed version of the desired television channel signal 112. The digital processing block 108 provides control signals to the RF and analog processing blocks 102 and 104 and the ADC 106 as is described in further detail below. Furthermore, depending on the television broadcast standard for the desired television channel signal 22, the digital processing block 108 can output a modulated digital signal 112'. The DAC block 110 can contain several digital to analog converters depending on the type of output that is required. For instance, there can be one DAC for a CVBS output and there can be at least one more DAC for a sound IF output. Alternatively, in other embodiments, some output signals provided by the universal television receiver 100 may be provided to a direct digital connection on a downstream component in which case there is no need for a DAC for these output signals.

The RF processing block 102, analog processing block 104 and digital processing block 108 are custom blocks. However, in an alternative embodiment, an off-the-shelf RF processing block can be used with corresponding changes in some operating parameters and processing in the analog and digital processing blocks 104 and 108 and the ADC 106. This alternative embodiment is described in further detail below with respect to FIGS. 17A and 17B. The ADC 106 can have 12 bits of SNR and −72 dBc of linearity for full-scale signals.

The universal television receiver 100 does not include a SAW filter. Rather, the universal television receiver 100 uses distributed filtering, in both the analog and digital domains, to isolate a desired television channel signal 22. This approach allows for the complete realization of the universal television receiver 100 on a single Integrated Circuit (IC) as well as being able to implement the television receiver 100 using reduced performance constraints for various processing components when a SAW filter is not used. Accordingly, filters can be implemented with reduced order and reduced Q, thereby requiring less area when realized on an IC. Furthermore, such a design is less sensitive to process variations and operating conditions that vary, such as temperature and voltage. However, in some alternative embodiments a SAW filter can also be used.

Figure 3:
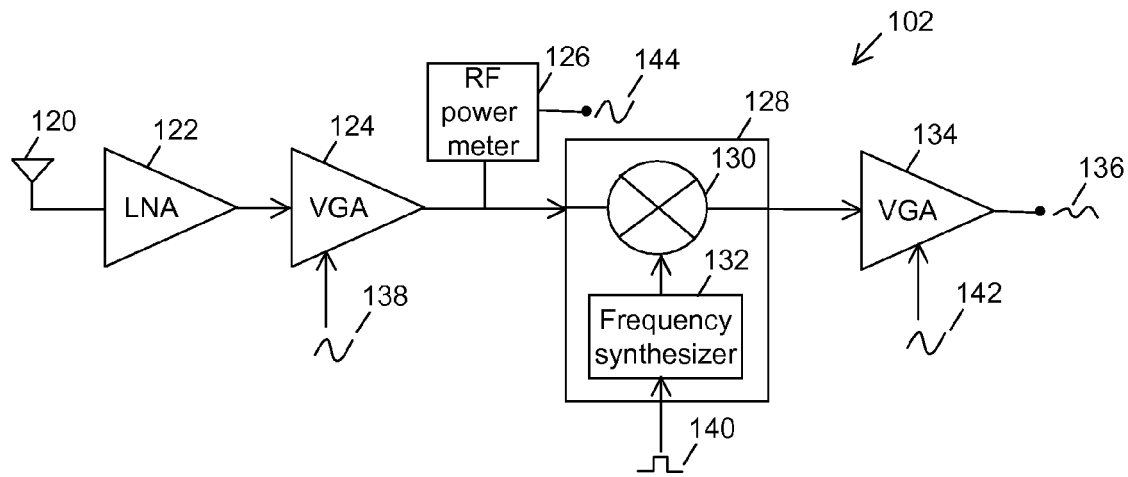
FIG. 3 is a block diagram of an exemplary embodiment of an RF processing block that can be used in the universal television receiver.

Referring now to FIG. 3, shown therein is a block diagram of an exemplary embodiment of the RF processing block 102. The RF processing block 102 includes an antenna 120, a low noise amplifier (LNA) 122, a first variable gain amplifier (VGA) 124, a power meter 126, a mixing stage 128 having a mixer 130 and a frequency synthesizer 132, and a second variable gain amplifier (VGA) 134. The power meter 126 is optional depending on the automatic gain control method that is employed which is described in further detail below. The RF processing block 102 receives and processes the wideband television signal 10 to provide a multi-channel television signal 136 that can include on the order of tens of television channel signals including the desired television channel signal 22. Accordingly, the RF processing block 102 provides a first level of filtering, as well as gain or attenuation, as the case may be. In alternative embodiments, a cable connection, a satellite dish or other wireless connection can be used instead of the antenna 120.

The wideband television signal 10 is received by the antenna 120 and then amplified by the LNA 122 and the VGA 124. The amount of gain that is provided by the LNA 122 and the VGA 124 is variable based on certain properties of the wideband television signal 10, and the desired television channel signal 22, which can vary widely. However, in some cases the received wideband television signal 10 may have to be attenuated. In general, the combined amount of gain provided by the LNA 122 and the VGA 124 can vary from −20 dB to 50 dB. Accordingly, both of the amplifiers 122 and 124 have a wide dynamic amplitude range. The amount of gain provided by the VGA 124 is controlled by AGC control signal 138. Although signal 138 is shown as analog, it can be either analog or digital.

The frequency response of the LNA 122 and the VGA 124 can extend up to about 1 GHz to pass the received television signal along with some harmonics without significant distortion. However, in alternative embodiments, at least one additional filter (i.e. a switchable filter, a tracking filter, an FM notch filter, or an FM band filter for improved FM performance) can be inserted before the LNA 122 to remove unwanted signals such as cell phone and short-wave radio signals. Furthermore, FM radio signals can also be filtered out. Alternatively, FM radio signals can be included if radio functionality is also desired. In alternative embodiments, the LNA 122 and the VGA 124 can be combined and implemented in one variable gain stage.

Figure 5A:
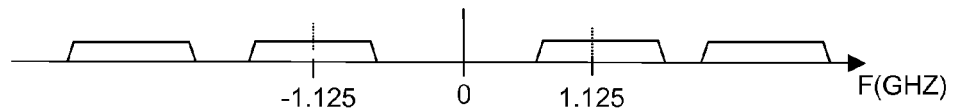
FIGS. 5A-5C are spectral plots of signals at various locations in the analog processing block of FIG. 4.

The mixing stage 128 mixes the output of the VGA 124 to a much higher frequency range on the order of GHz. At this higher frequency range, it is easier to implement the components of the analog processing block 104. In addition, harmonics of the mixing stage 128 are at very high frequencies thus avoiding any potential overlap with the television band that could result in any interfering images. Also, in this frequency range interference from other television signals can be minimized due to various signal processing techniques used in the analog processing block 104. For example, the mixing stage 128 can provide a high-side mix to mix the output of the VGA 124 so that the desired television channel signal 22 is centered near 1.125 GHz (see FIG. 5A). To achieve this, the frequency synthesizer 132 is tunable and, in some cases, can provide a tunable signal with a frequency in the range of 1.16 GHz to 1.9 GHz. For example, with an oscillation frequency of 1.167 GHz, the low end of the television band (i.e. −42 MHz) appears at 1.125 GHz, and with an oscillation frequency of 1.987 GHz, the high end of the television band (i.e. −862 MHz) appears at 1.125 GHz. The frequency synthesizer 132 receives a tuning control signal 140 from the digital processing block 108 based on the frequency of the desired television channel signal 22 and the frequency at which the frequency content of the desired television channel signal 22 is to be placed for processing by the analog processing block 104.

The frequency synthesizer 132 acts as a Local Oscillator (LO) and can be based on a PLL design and the oscillation signal can be derived from a crystal oscillator having a frequency of 4 MHz or 16 MHz for example. The frequency synthesizer 132 will have a certain amount of offset error that will need to be resolved by the digital processing block 108 to locate the desired television channel signal 22. However, due to coarse filtering that is provided in the analog processing block 104 and the signal processing provided by the digital processing block 108, the frequency synthesizer 132 can be realized with a coarser or larger step size such that there is a larger amount of offset in the exact location of the desired television channel signal 22 after mixing (i.e. a larger shift from being centered at 1.125 GHz). Generally, the universal television receiver 100 can tolerate offsets of 1 MHz or more, particularly when the offset is due to the use of a coarse synthesizer step size, since the offset in this case is known and can be compensated further downstream in the processing chain. This is discussed in further detail below.

The mixing stage 128 can also provide some gain, and filtering. In some implementations, the mixer 130 can include a differential gain stage that can provide about 10-20 dB of gain, and can include a reactive load, such as a pair of LC tank filters, to provide filtering around 1.125 GHz. The filtering is not sharp since the inductors are realized on an IC, and the Q of the LC tank filters can range from 6 to 12 at certain frequencies. Accordingly, the bandwidth of the filtering provided in the mixing stage 128 can be on the order of one hundred MHz, and the output of the mixing stage 128 can include over ten television channels. Alternatively, bondwires can be used for the inductors to achieve Q-values of up to 10 or greater. In at least some cases, external inductors can also be used for greater selectivity.

The output of the mixing stage 128 is then amplified by the VGA 134, which can be a standard VGA. The VGA 134 can generally be used to provide about 10 to 30 dB of gain. The amount of gain provided by the VGA 134 is selected based on the gain provided by the VGA 124, as well as the amount of gain and filtering that is provided by the mixing stage 128. Gain control for the VGAs 124 and 134 is described in further detail below. In alternative embodiments, if there is no filtering after the VGA 124 or if no additional gain is necessary, then the VGA 134 is optional and can be excluded.

Figure 4:
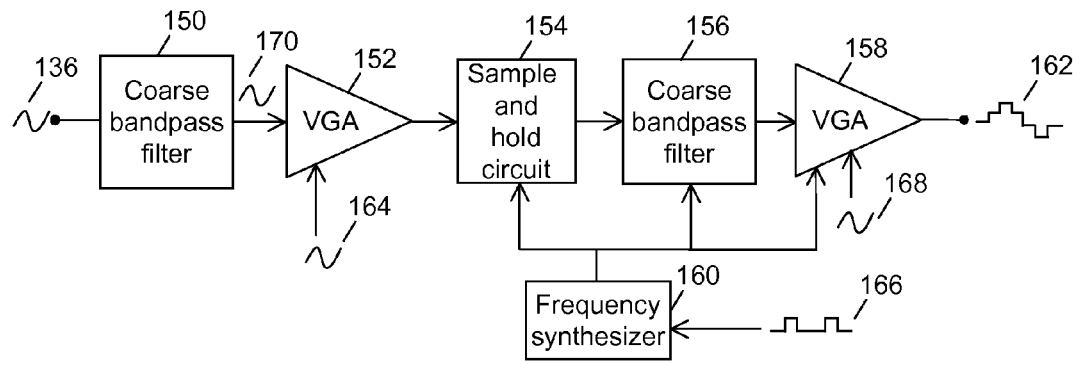
FIG. 4 is a block diagram of an exemplary embodiment of an analog processing block that can be used in the universal television receiver.

Referring now to FIG. 4, shown therein is a block diagram for an exemplary embodiment of the analog processing block 104. The analog processing block 104 generally filters and amplifies a multi-channel television signal 136 to produce a coarse channel signal 162. The filtering is referred to as coarse filtering in that bandwidths are used for the filters that are large enough to accommodate different bandwidths for the desired television channel signal 22 due to the various different types of analog and digital broadcast standards that are used. The bandwidths are also selected to be wide or large enough to accommodate any frequency shifts or offsets in the desired television channel signal 22 as well as any variability due to analog circuitry. This variability includes component tolerances, temperature and voltage variations (which can result in a variation in absolute frequency and the bandwidth of the signal path), irregularities which occur near the band edges of the filters (using a wide band minimizes the effects when not pushing the edges) and easing the difficulty of precise analog design (more specifically, the tuning required to set and keep the bandpass of the filters precise). These variations in frequency can also be tolerated by tracking the carrier frequency of the desired television channel signal 22 for both analog and digital broadcast standards. For analog broadcast standards, the carrier tracking is akin to tracking the picture carrier and audio carrier for the desired television channel (although in some embodiments audio carrier tracking can be slaved to picture carrier tracking as discussed below with regards to FIG. 13B). For digital broadcast standards, the carrier tracking is optional but when performed is akin to tracking a specified frequency such as a center frequency. For instance, even though DVB-T signals can be considered to have as many as 8192 carriers, tuning can be done by specifying a center frequency for the 8192 carrier frequencies and tracking the middle carrier frequency. The carrier frequency tracking is discussed further with regards to FIGS. 10, 12A, 13A, 13B, 17A and 17B. When performed, the carrier tracking is used to introduce a frequency shift feedback signal to ensure that the desired television channel signal 22 remains in the bandwidth of the filtering components in the digital processing block 108. This is described in more detail with regards to FIG. 10.

The analog processing block 104 includes a first coarse bandpass filter 150, a third VGA 152, a sample and hold circuit 154, a discrete-time coarse bandpass filter 156 (which can be based on a switched-capacitor implementation), a discrete-time VGA 158 and a frequency synthesizer 160. Gain control for the VGAs 152 and 158 is discussed in more detail further below. In some cases, one of the VGAs 152 and 158 is optional and can be excluded in alternative embodiments. If the coarse bandpass filter 150 is not present, then the VGA 152 is not required. If the discrete-time coarse bandpass filter 156 is not required, then the VGA 158 will not be necessary. In addition, the coarse bandpass filter 150 can be implemented in a discrete or integrated fashion. In an alternative embodiment of the analog processing block 104, if a continuous-time bandpass sigma-delta ADC is used, then the sample and hold circuit 154 is not required and the ADC has inherent anti-alias filtering potentially precluding the need for other filters. Also the discrete-time coarse bandpass filter 156 is a continuous-time filter and the VGA 158 is a continuous time variable gain amplifier.

Figure 5B:
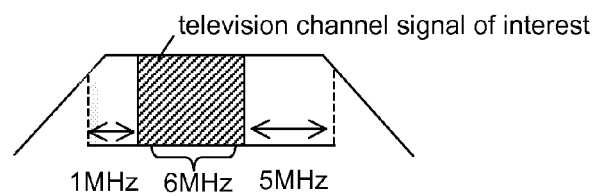

Generally, the analog processing block 104 processes the multi-channel television signal 136 to provide a coarse channel signal 162 that includes the frequency content of the desired television channel signal 22 as well as portions, or the entirety, of one or more adjacent television channel signals. In some implementations, the coarse channel signal 162 can have a bandwidth in the range of 10-20 MHz and in some cases can be approximately 10 MHz, and therefore, for some television broadcast standards can include one full channel and two partial channels (see FIG. 5B for example) or two full television channel signals. The analog processing block 104 utilizes distributed, coarse filtering to provide the coarse channel signal 162 with enough bandwidth to address the various issues mentioned previously. This is described in further detail below.

The coarse bandpass filter 150 provides another level of filtering to remove unwanted television channel signals as well as to prevent aliasing due to subsequent discrete time sampling. The coarse bandpass filter 150 is also approximately centered at the frequency to which the mixing stage 128 mixes the desired television channel signal 22. The size of the passband of the coarse bandpass filter 150 is large enough to pass a coarse frequency region of interest 170c (see FIG. 5C), which includes the desired television channel signal 22 and at least portions of at least one or more adjacent television channel signals.

The sampling rate of the sample and hold circuit 154 and the bandwidth of the coarse bandpass filter 150 can be selected to employ sub-sampling so that another mixer is not needed to shift the coarse frequency region of interest 170c to IF. The sampling rate is selected to be more than twice the bandwidth of the coarse frequency region of interest 170c, which can generally be about 10-20 MHz wide. However, it is not practical for the coarse bandpass filter 150 to have a bandwidth of 10-20 MHz with a center frequency in the Gigahertz range. Rather, the sampling rate of the sample and hold circuit 154 can be set much higher than twice the bandwidth of the coarse frequency region of interest 170c, which allows the passband, transition band, and stopband requirements of the coarse bandpass filter 150 to be relaxed. Further, the amplitude response of the coarse bandpass filter 150 in the passband also does not have to be flat since it can be corrected digitally as is further described below with relation to FIG. 9. However, in other embodiments other types of sampling can be used such as direct sampling or over-sampling rather than sub-sampling.

Figure 5C:
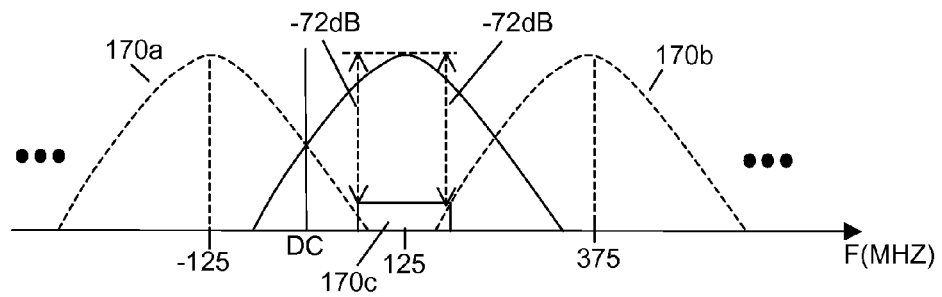

The amount of attenuation provided by the coarse bandpass filter 150 is chosen in relation to the sampling frequency used by the sample and hold circuit 154, the bandwidth of the coarse frequency region of interest 170c, and the amount of resolution required for the ADC 106. For example, assume that the sample and hold circuit 154 uses a sampling rate of 500 MHz, the passband of the coarse bandpass filter 150 is about 500 MHz, and the mixing stage 128 mixes the desired television channel signal 22 to 1.125 GHz. This sub-sampling, otherwise known as undersampling, places an image of the desired television channel signal 22 that was originally in the 1.125 GHz region at 125 MHz, and other images 170a and 170b of the output signal 170 of the coarse bandpass filter 150 centered at multiples of 250 MHz away from 125 MHz as shown in FIG. 5C. As can be seen, the attenuation provided by the coarse bandpass filter 150 is such that the sub-sampled version of its output 170 overlaps with images 170a and 170b. However, the attenuation provided by the coarse bandpass filter 150 is selected such that at the region of overlap between the sub-sampled version of the coarse frequency region of interest 170c and the skirts of the images 170a and 170b, the skirts of the images 170a and 170b are sufficiently attenuated to provide an adequate amount of resolution without aliasing when the ADC 106 samples the coarse frequency region of interest 170c. For example, in at least some cases, the amount of attenuation can be at least −74 dB at +/−BW/2 from 125 MHz to ensure that the ADC 106 will have 12-bit resolution where BW/2 is half of the bandwidth of the coarse bandpass filter 150. It should be noted that a smaller bandwidth can be selected for the coarse bandpass filter 150 if inductors with a higher Q are employed. For example, Q-enhanced inductors, bond-wires, and the like can be used to increase the Q to 5 and reduce the bandwidth to about 250 MHz or so.

Figure 6A:
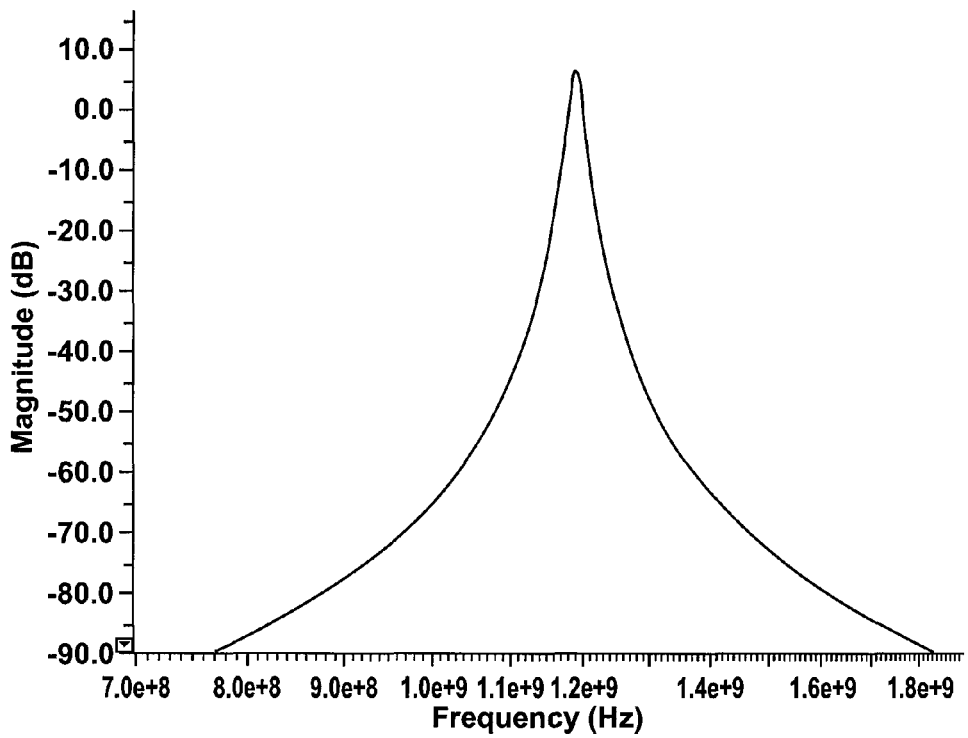
FIGS. 6A-6B are spectral plots of exemplary filter transfer functions that can be used for filters in the analog processing block.

In some implementations, the coarse bandpass filter 150 can be realized as a $6^{th}$ order filter (see FIG. 6A) which can be implemented using a cascade of three $2^{nd}$ order LC tank filter stages, similar to the LC tank filters used in the mixing stage 128. Each tank filter stage can be separated by a buffer to avoid interaction with one another. Furthermore, each buffer can be used as a distributed source of gain control to help maintain a reasonable signal level as the signal power decreases with each subsequent LC tank filter stage. The overall Q of the coarse bandpass filter 150 can be about 12. The coarse bandpass filter 150 can be implemented in other ways, as is commonly known by those skilled in the art.

The sample and hold circuit 154 is provided with a timing signal by the frequency synthesizer 160 to perform sub-sampling. The frequency synthesizer 160 receives a timing control signal 166 from the digital processing block 108 so that the rate of sub-sampling can be varied if needed. An aperture window is associated with the sample and hold circuit 154, and the length of the aperture window can be selected such that the multi-channel television signal 136 can be resolved to the least significant bit of the ADC 106. It should be understood that all blocks following the sample and hold circuit 154 are implemented with discrete-time components.

Figure 6B:
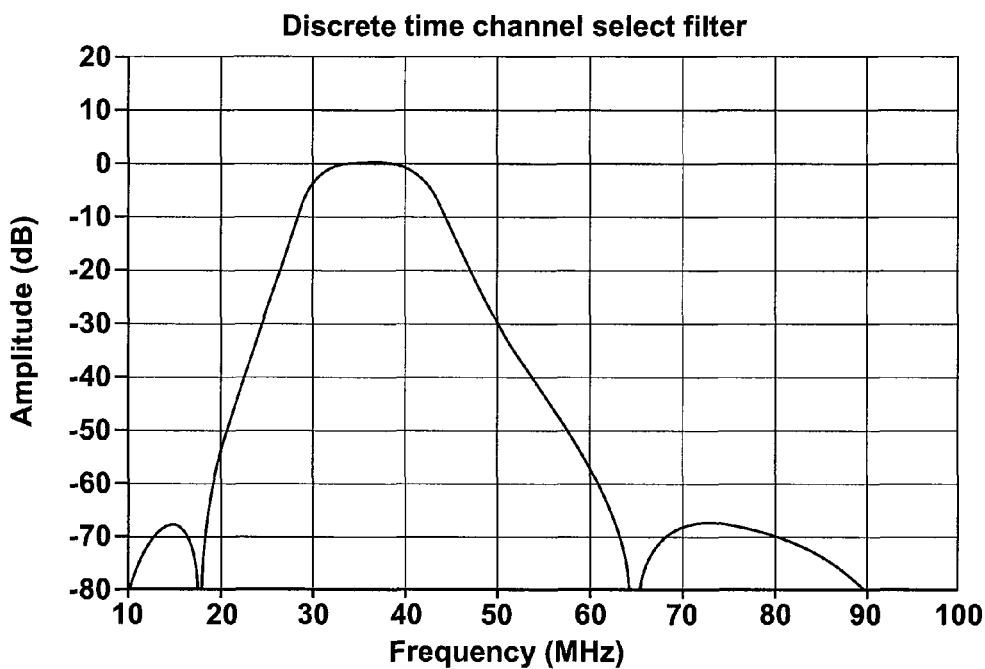

The discrete-time coarse bandpass filter 156 can be used to provide another level of filtering. The discrete-time coarse bandpass filter 156 can be realized as a switched capacitor filter with a passband centered at 125 MHz, for this example. The discrete-time coarse bandpass filter 156 similarly provides a coarse channel signal output that includes the desired television channel signal 22. However, the discrete-time coarse bandpass filter 156 has a sharper transfer function than the coarse bandpass filter 150 in that it provides a larger amount of attenuation (i.e. the rolloff is larger) to deal with the more extreme blocking profiles in which the adjacent television channel signal may be 35 to 40 dB larger than the desired television channel signal 22 (this depends on the television broadcast standard). In some implementations, the discrete-time coarse bandpass filter 156 can be realized as an $8^{th}$ order filter (see FIG. 6B) with a much steeper rolloff than that of the coarse bandpass filter 150 to further improve the signal-to-noise ratio (SNR) for the desired television channel signal 22.

In some cases, the discrete-time coarse bandpass filter 156 can also be used to limit the power of the coarse channel signal 162 such that the resolution of the ADC 106 is sufficient to digitize this signal and to resolve the desired television channel signal 22 to the necessary accuracy.

The VGAs 152 and 158 can provide an appropriate amount of gain to the output of the coarse bandpass filters 150 and 156, respectively, based on the amount of filtering that was done by these filters and the level of the received signal. Furthermore, due to the diverse RF signal blocking profiles (one of which is shown in FIG. 1B for example), various gain combinations can be selected to yield improved performance. Accordingly, the VGAs 124, 134, 152 and 158 receive gain control signals 138, 142, 164 and 168 from the digital processing block 108 to more effectively apply a distributed amount of gain or attenuation.

The digital processing block 108 determines the optimal distribution and the amount of gain/attenuation. The digital processing block 108 can determine gain distribution in a number of ways. For instance, the digital processing block 108 can determine gain distribution based on measurements that are made by the power meter 126. In this case, the power meter 126 provides analog signal information 144 to the digital processing block 108 (this can be provided in a digital manner). Alternatively, the digital processing block 108 can use other methods for controlling the gain of the RF and analog processing blocks 102 and 104 in which case the power meter 126 can be optional.

Generally, the amount of gain provided by the RF processing block 102 and the analog processing block 104 can be adjusted to affect sensitivity and distortion of signals at various locations in the RF and analog processing blocks 102 and 104. The amount of gain provided by the analog processing block 104 can be adjusted such that the input range of the ADC 106 is fully utilized while controlling the amount of distortion in blocks 102 and 104. In some cases, the entire amount of gain provided by the RF and analog processing blocks 102 and 104 can be on the order of 100 dB. Gain control techniques that can be used are described in more detail below with reference to FIGS. 15, and 16A-16C.

The ADC 106 digitizes the output of the analog processing block 104 to provide a digitized coarse channel signal 172. The digitized coarse channel signal 172 includes the desired television channel signal 22, and portions of one or more adjacent television channel signals depending on the television broadcast standard. The coarse filtering provided by the various components in the RF processing block 102 and the analog processing block 104 dictate the number of bits that are required for the ADC 106. If the mixing stage 128 and the coarse bandpass filters 150 and 156 provide more filtering, then the ADC 106 can be implemented with a smaller number of bits. Accordingly, selecting the filtering characteristics of these components represents a balance between the complexity of providing greater selectivity in filtering versus the need to provide higher resolution in the ADC 106.

The ADC 106 can be realized with a bandpass delta sigma (BDS) ADC that can provide 11 or 12 effective bits (1 bit provides about 6 dB of resolution/gain for the sampled signal). The BDS ADC oversamples at a very high rate with 3-4 actual bits to produce 11 or 12 effective bits for digitization. The BDS ADC outputs the data at an IF frequency. However, in other implementations it may be possible to realize the ADC 106 with a 12-bit Nyquist rate ADC.

In alternative embodiments, the sample and hold circuit 154 and the coarse bandpass filter 156 can be realized with a continuous-time filter and the VGA 158 with a traditional continuous-time VGA if a continuous-time bandpass sigma-delta converter is used for the ADC 106. In some cases, a lowpass ADC can be used provided that the appropriate filtering in the analog processing block 104 precedes the lowpass ADC. The input intermediate frequency can also be altered.

Also, in alternative embodiments, depending on the frequency range of the desired television channel signal 22 as well as any mixing or other frequency shifting that is employed by the RF and analog processing blocks 102 and 104, it is possible to replace at least some of the coarse bandpass filters 150 and 156 described for the analog processing block 104 with coarse lowpass filters.

Figure 7:
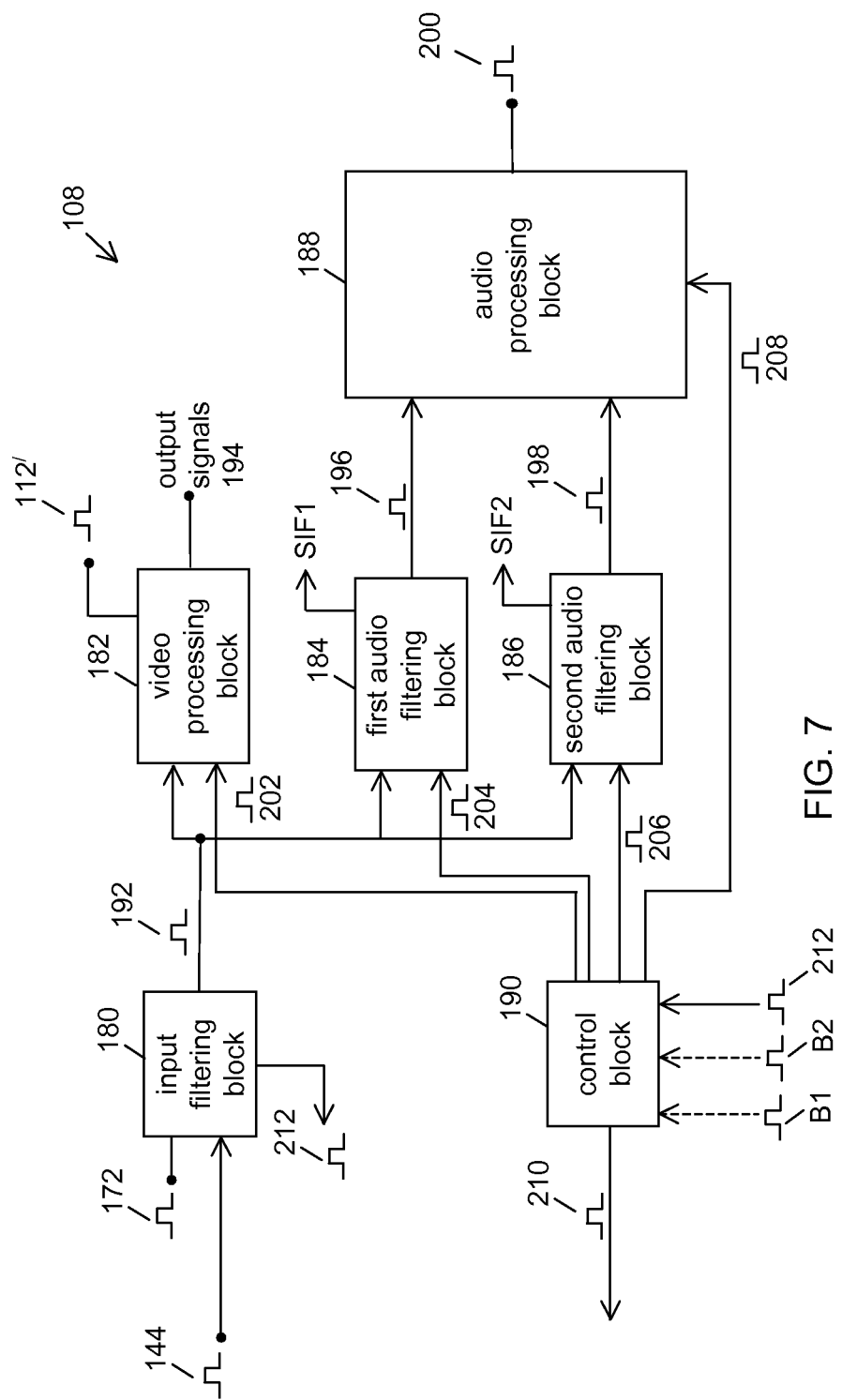
FIG. 7 is a block diagram of an exemplary embodiment of a digital processing block that can be used in the universal television receiver.

Referring now to FIG. 7, shown therein is a block diagram of an exemplary embodiment of the digital processing block 108. The digital processing block 108 includes an input filtering block 180, a video processing block 182, first and second audio filtering blocks 184 and 186, and an audio processing block 188. The digital processing block 108 also includes a control block 190 for controlling various blocks in the digital processing block 108 as well as providing timing and control signals to various components in the RF and analog processing blocks 102 and 104. Certain portions of the digital processing block 108 operate according to the sampling rate used by the sample and hold circuit 154; however, other sampling rates are also used by employing downsampling or interpolation. The digital processing block 108 is generally configured to operate in an analog operation mode for processing signals transmitted according to an analog broadcast standard, or a digital processing mode for processing signals transmitted according to a digital broadcast standard.

The digital processing block 108 generally processes the digitized coarse channel signal 172 to recover the video and audio information for the desired television channel signal 22. The processing takes into account the television broadcast standard used to transmit the desired television channel signal 22. The digital processing block 108 can produce various outputs, depending on the particular implementation. These outputs generally include, in different embodiments, various combinations of: digitized versions of a CVBS (Composite Video Baseband Signal) output for PAL/SECAM/NTSC formats, left and right channel audio outputs, a sound IF output that can be further processed by an audio decoder (not shown), and a digital video output, which can be further processed by a digital television demodulator to provide a digital transport stream that can then be processed by another element such as an MPEG-2 decoder, for example. The digital transport stream includes compressed digital data representing the audio and video information of one or more television programs. Additionally, a digital IF output may be provided to an external digital demodulator. The digitized versions of the CVBS, baseband audio, sound IF and digital IF outputs may be converted to analog form using the DAC block 110. In alternative embodiments, these signals may be conveyed in digital form to subsequent processing stages without need for further conversion.

More particularly, the digitized coarse channel signal 172 is processed by the input filtering block 180 to provide a processed digitized coarse channel signal 192. The input filtering block 180 generally provides a combination of down conversion, pre-filtering and downsampling. The input filtering block 180 also includes components for setting the gain of various variable gain amplifiers in the RF and analog processing blocks 102 and 104. However, in alternative embodiments this functionality can be provided by the control block 190. The processed digitized coarse channel signal 192 is then processed by the video processing block 182, which provides output signals 194 according to a desired output format. The output signals 194 include only video information if the television broadcast standard is analog. However, if the television broadcast standard is digital, then the output signals 194 include video and audio content in a format that is modulated according to the broadcast standard. Further, the video processing block 182 has two modes of operation: an analog operation mode to process the desired television channel signal 22 when it is transmitted according to an analog broadcast standard, and a digital operation mode to process the desired television channel signal 22 when it is transmitted according to a digital broadcast standard. This is described in further detail below.

If the desired television channel signal 22 is transmitted according to an analog broadcast standard, then the processed digitized coarse channel signal 192 is also processed by at least one of the first and second audio filtering blocks 184 and 186 which provide at least one of intermediate audio signals 196 and 198. In alternative embodiments, as explained in further detail below with relation to FIG. 13B, instead of receiving the processed digitized coarse channel signal 192, the first and second audio filtering blocks 184 and 186 can receive a processed version of this signal provided by the video processing block 182. The first and second audio filtering blocks 184 and 186 can also provide sound IF signals SIF1 and SIF2. The intermediate audio signals 196 and 198, and the sound IF signals SIF1 and SIF2 are then processed by the audio processing block 188 to provide an audio output signal 200 according to a desired output format. The first and second audio filtering blocks 184 and 186 may both be used for situations in which the analog television broadcast standard dictates the use of two audio carriers. Alternatively, in this case, a single audio separation block can be used to separate both carriers at the same time and to provide them via a single SIF connection to a downstream audio device for further processing. For analog broadcast standards that utilize a single audio carrier, only one of the first and second audio filtering blocks 184 and 186 are enabled by the control block 190.

In at least some cases, the control block 190 can also receive signals B1 and B2 from the video processing block 182 and a digital demodulator respectively to determine whether the television broadcast standard used for the desired television channel signal 22 is analog or digital. For instance, the video processing block 182 can be first operated in the analog operation mode and if a lock to the picture carrier is achieved in a reasonable amount of time then this lock is identified via the signal B1 (see FIG. 12A) so that the control block 190 can configure the various components of the digital processing block 108 for analog operation mode. If a lock is not obtained, then the control block 190 can configure the video processing block 182 for operation in the digital operation mode and determine if the desired television channel signal 22 is properly demodulated. In this regard, a component of a digital demodulator (see FIG. 17B) can indicate successful demodulation in the signal B2.

The control block 190 also determines the particular type of analog or digital television broadcast standard. One way to determine the television broadcast standard is to detect the type of audio information that is included in the processed digitized coarse channel signal 192. Alternatively, the universal television receiver 100 can be configured for a particular broadcast standard. In this respect, the architecture of the universal television receiver 100 allows the universal television receiver 100 to be mass-produced and then configured, by setting certain parameters, for processing television signals transmitted according to a certain broadcast standard.

Figure 8:
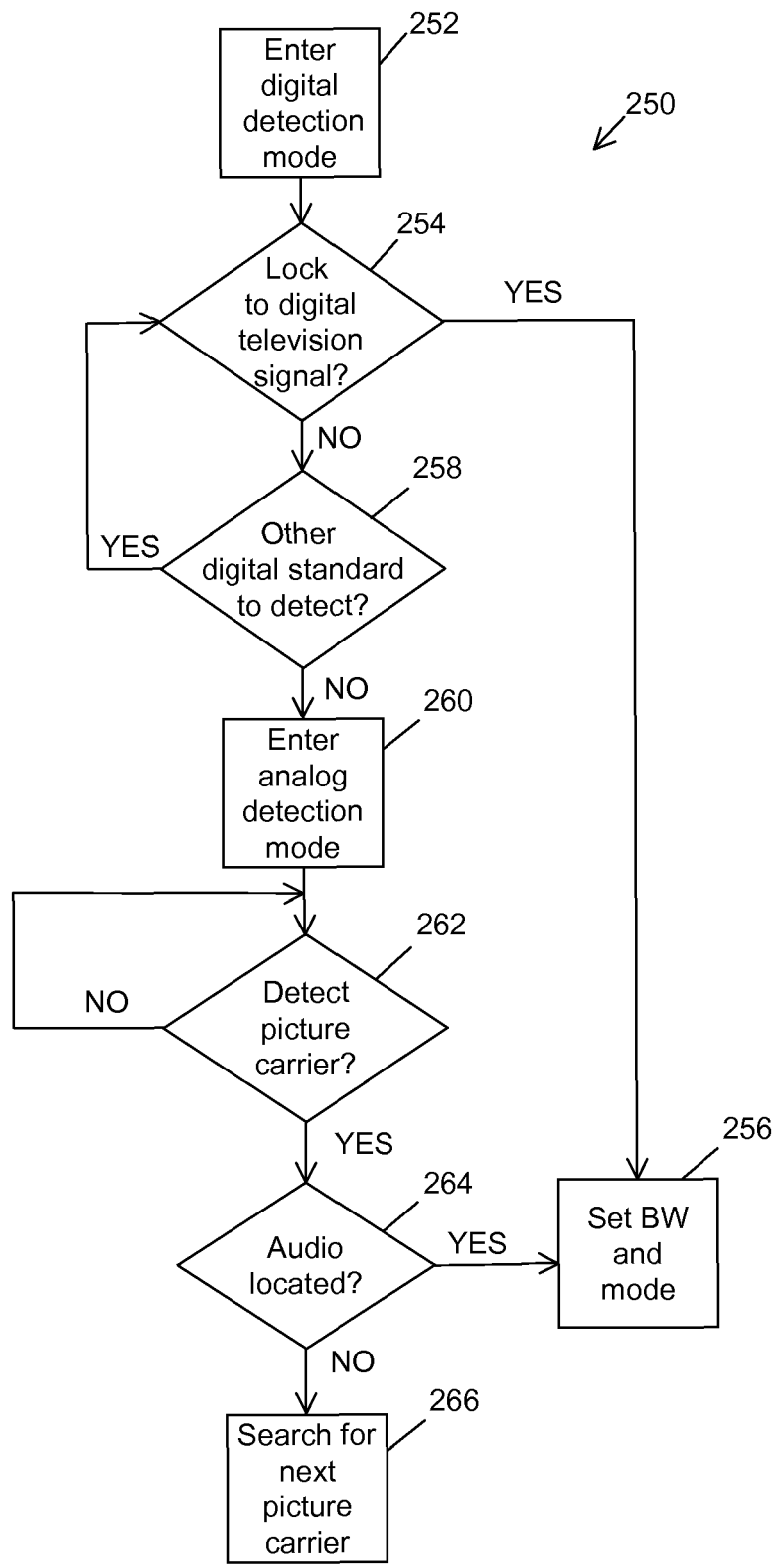
FIG. 8 is a flow chart diagram of an exemplary embodiment of a standards detection method for detecting television transmission broadcast standards.

Referring now to FIG. 8, shown therein is a flow chart diagram of an exemplary embodiment of a standards detection method 250 which can be used for detecting the television transmission broadcast standard that was used to transmit the wideband television signal 10. The standards detection method 250 includes a digital detection mode for detecting whether the desired television channel signal 22 is a digital television signal and an analog detection mode for detecting whether the desired television channel signal 22 is an analog television signal. This includes receiving feedback from the video and audio processing blocks 182-188. Once the bandwidth of the desired television channel signal 22 is found, the control block 190 sets the bandwidth (BW) and the mode of operation for the digital processing block 108.

At step 252, the standards detection method 250 enters digital detection mode to determine whether the desired television channel signal 22 was transmitted with a digital broadcast standard. A first digital broadcast standard is selected and the method 250 attempts to demodulate and decode the desired television channel signal 22 according to the selected digital broadcast standard using methods known by those skilled in the art. If a lock is obtained, then the method 250 moves to step 256 and sets the bandwidth used in various blocks in the video processing block 182 during digital reception mode. If a lock is not obtained, the method 250 moves to step 258 to determine whether there are any other digital broadcast standards to check. If so, another digital broadcast standard is checked and the method 250 moves back to step 254. If there are no more digital broadcast standards to check, the method 250 moves to step 260.

At step 260, the method 250 enters analog detection mode. At step 262, the method 250 attempts to lock to a carrier frequency. If a carrier frequency is locked, the method 250 must confirm that the carrier frequency is a picture carrier frequency and not an audio carrier. Several techniques can be used to lock to a carrier frequency and confirm that it is a picture carrier. One technique includes using a coarse version of sync decoding to determine if sync information is associated with the locked carrier frequency. If a lock has been made to a picture carrier frequency, the method 250 then moves to 264 otherwise the method 250 continues to attempt to lock to a picture carrier frequency. The coarse sync detection method involves counting the lines per field to verify that the locked carrier is a picture carrier.

At step 264, the method 250 attempts to locate the audio carrier. To accomplish this, a look-up table may be consulted which includes the possible positions of the audio carrier based on the analog broadcast transmission standard. The method 250 can start with the audio carrier that is positioned furthest away from the picture carrier frequency to determine if an audio carrier exists at that position. If a signal is found at the audio carrier frequency then it is assumed to be an audio signal but can be checked to make sure that it is not another picture carrier by performing the coarse sync decoding. If an audio carrier is not located, then the method 250 looks at the audio carrier that is second furthest from the located picture carrier and repeats this process iteratively until detecting the audio carrier. If the audio carrier is detected, the method 250 can search for a second audio carrier since some analog broadcast standards employ two audio carriers. Once the single or dual audio carriers are detected, the method 250 moves to step 256 to set the BW and the mode of operation for the digital processing block 108. The BW can be set to be the difference between the picture carrier frequency and the audio carrier frequency minus a few hundred KHz, so as to ensure that the audio signal is adequately attenuated in the video path.

If the audio carrier is not located at step 264, then the method 250 moves to step 266 to search for the next picture carrier signal. The search range for the next picture carrier signal can be the widest bandwidth and guard band that is used in analog broadcast transmission standards. If no picture carrier signal is located, then the BW can be set to the maximum bandwidth for analog broadcast transmission standards. If another picture carrier is found, then the bandwidth can be determined based on the distance of the newly located picture carrier frequency compared to the initially located picture carrier frequency.

Based on the detected television broadcast standard for the desired television channel signal 22, the control block 190 provides a video control information signal 202 to the video processing block 182 to control the operation mode of the video processing block 182. The control block 190 also provides audio control information signals 204, 206 and 208 to the first and second audio filtering blocks 184 and 186, and the audio processing block 188. Generally, the audio control information signals 204, 206 and 208 enable blocks 184, 186 and 188 when the television broadcast standard used for the desired television channel signal 22 is analog. In this case, the audio control information signals 204 and 206 enable at least one of the audio filtering blocks 184 and 186 depending on the number of audio carriers in the processed digitized coarse channel signal 192. The audio control information signals 204, 206 and 208 can include other operational parameter values that are discussed in more detail below. The control block 190 also provides control and timing information signal 210 to the RF and analog processing blocks 102 and 104. This information is derived from input information 212 based on the television channel that a user of the television receiver 100 wishes to view. The control and timing information signal 210 is used to control the frequencies of various synthesizers as well as sampling rates.

Figure 9:
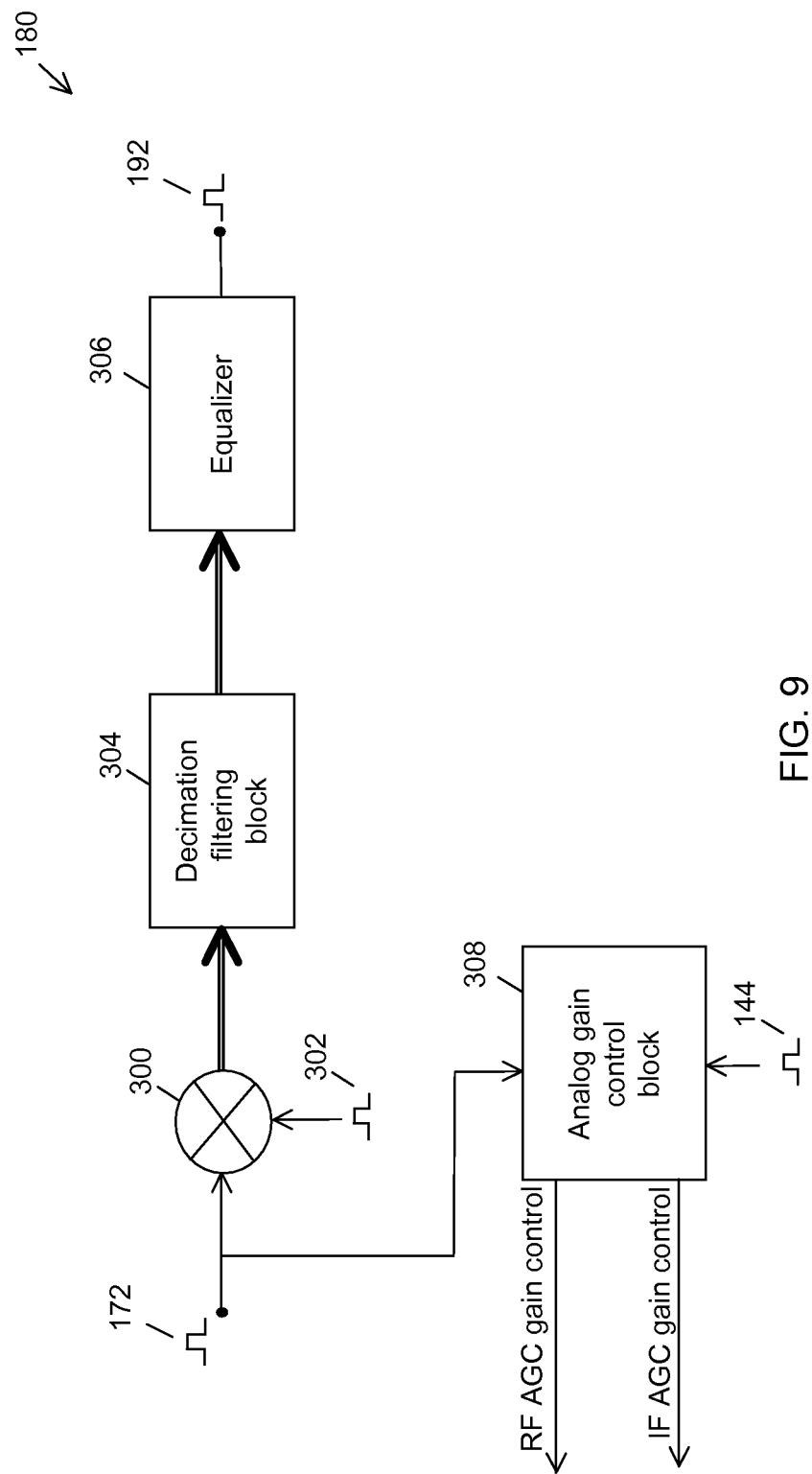
FIG. 9 is a block diagram of an exemplary embodiment of an input filtering block that can be used in the digital processing block.

Referring now to FIG. 9, shown therein is a block diagram of an exemplary embodiment of the input filtering block 180. The input filtering block 180 includes a frequency rotator (i.e. a down-converter or digital mixer) 300 which receives a rotation control signal 302, a decimation filtering block 304, an equalizer 306, and an analog gain control block 308. It should be noted that in alternative embodiments, the analog gain control block 308 can be located in a different block. Further in some alternative embodiments, the functionality of the analog gain control block 308 can be provided by the control block 190.

The frequency rotator 300 processes the digitized coarse channel signal 172 by performing down conversion to the baseband such that the coarse frequency region of interest 170c is now centered about DC. The amount of down conversion is controlled by the rotation control signal 302, which is provided by a free-running discrete time oscillator (not shown). The choice of a sampling rate that is 4 times the centre frequency of the range of interest allows the rotator 300 to be implemented without the need for multipliers, since rotation occurs in 90 degree increments. The frequency rotator 300 generates quadrature signals, i.e. in-phase (I) and quadrature (Q) signals for improved processing efficiency. The I and Q signals are then processed by separate I and Q signal paths as is commonly known by those skilled in the art. It should be noted that only one signal path with double/thicker lines are shown to denote the I and Q signal paths to simplify the description. However, it should be understood that blocks with two I and Q inputs and two I and Q outputs are actually implemented with two blocks; one block processes the I signal and the other block processes the Q signal. This nomenclature is used in other figures as well.

The decimation filtering block 304 provides some low pass filtering and downsampling to the output of the frequency rotator 300 to remove unwanted signal components and to reduce the sample rate in order to simplify subsequent processing stages. The filtering removes quantization noise that results from the digitization provided by the ADC 106. If a bandpass sigma delta converter is used for the ADC 106, then the filtering can be designed to attenuate the noise-shaped spectral regions of the I and Q output signals of the frequency rotator 300. The decimation filtering block 304 then performs downsampling so that the other blocks in the digital processing block 108 can operate more efficiently. For example, downsampling can be done so that the sampling rate associated with the processed digitized coarse channel signal 192 is at approximately 31.25 MHz. The amount of low pass filtering provided by the decimation filtering block 304 is also commensurate with the amount of downsampling as is commonly known by those skilled in the art.

The output of the decimation filtering block 304 is then processed by the equalizer 306. It should be noted that the equalizer 306 is optional and is not needed if the equalization functionality can be provided by another downstream element; for example, equalization can be provided by a digital demodulator (not shown) that receives the output signals 194 of the video processing block 182. The functionality of the equalizer 306 may also be optional when processing television signals that are transmitted according to an analog broadcast standard, depending on the level of performance required for the output signals 194. Accordingly, in some cases the equalizer 306 can be disabled or not included.

The equalizer 306 processes the I and Q output of the downsampler to compensate for the non-ideal filtering provided by the coarse bandpass filters 150 and 156 in the analog processing block 104. Accordingly, the equalizer 306 provides equalization to make it seem as if the coarse bandpass filters 150 and 156 have a flat inband response and improved group delay response. The equalizer 306 can combine the I and Q signals to provide a single-ended real output signal 192. Alternatively, in some alternative embodiments, the equalizer 306 can provide I and Q output signals that are then appropriately processed by the other blocks in the digital processing block 108.

The equalizer 306 can be implemented in a variety of fashions as is commonly known by those skilled in the art. For instance, the equalizer 306 can include a real or imaginary FIR filter to perform equalization, and can also include several cascaded filters as well as a frequency rotator to shift the signal by a certain fraction of the sampling rate so that the filters in the equalizer 306 can be implemented more efficiently. In this case, the blocks 182, 184 and 186 include a corresponding frequency rotator to shift the processed digitized coarse channel signal 192 back to the baseband.

The output of the ADC 106 is also provided to the analog gain control block 308. The purpose of the analog gain control block 308 is to adjust the gain settings at the RF and IF stages to adjust the level of the signal presented to the ADC 106 to ultimately increase the quality of the desired television channel signal 22. This may be performed using a feedback loop in which the level of the output from the ADC 106 is measured and compared to a preset reference level. If the measured level is less than the reference level then the gain is increased, while if the measured level is higher than the reference level then the gain is decreased. Therefore, the reference level may be thought of as a target level which the loop seeks to maintain, even when the level of the signal from the antenna 120 changes. The analog gain control block 308 can perform this gain control technique, which is described in more detail with regards to FIGS. 16A-16C.

The analog gain control block 308 is implemented digitally and provides RF gain control signals 138 and 142 to the VGAs 124 and 134, respectively, in the RF processing block 102. The analog gain control block 308 also provides IF gain control signals 164 and 168 to the VGAs 152 and 158, respectively, in the analog processing block 104 if these amplifiers exist (note they are optional). The analog gain control block 308 can perform the gain control method outlined in FIG. 15 or other methods described in further detail below. In alternative embodiments, a gain control system may be implemented which utilizes information provided by the power meter 126, in which case the analog gain control block 308 also receives the analog signal information 144.

Figure 10:
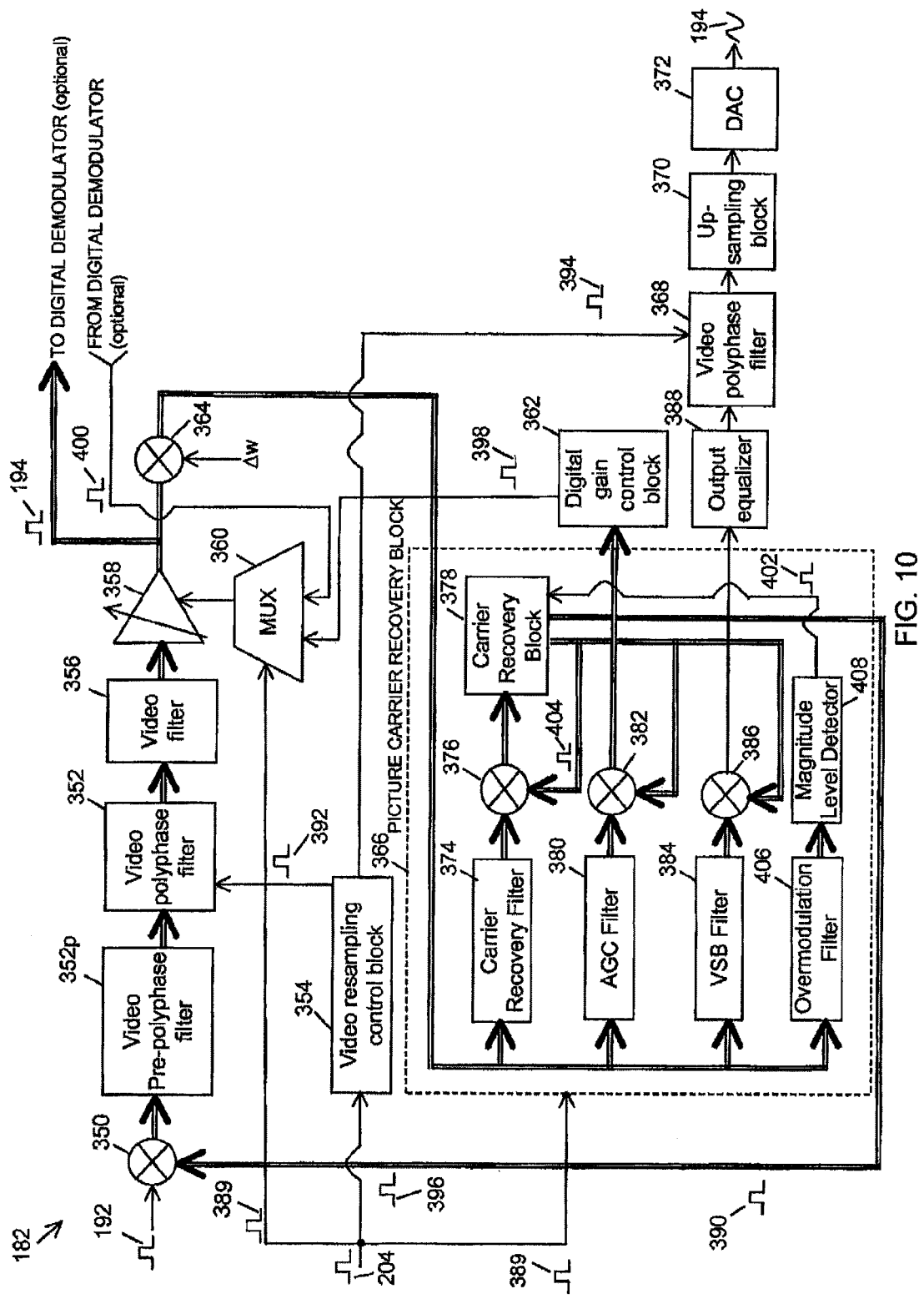
FIG. 10 is a block diagram of an exemplary embodiment of a video processing block that can be used in the digital processing block.

Referring now to FIG. 10, shown therein is a block diagram of an exemplary embodiment of the video processing block 182. The video processing block 182 processes the processed digitized coarse channel signal 192 by generally performing carrier frequency recovery, resampling and filtering. The video processing block 182 can also perform phase noise reduction by compensating for phase perturbations which includes both noise and systematic variation caused by spurs and the like. As mentioned, the video processing block 182 operates in a digital operation mode or an analog operation mode depending on whether the desired television channel signal 22 is transmitted according to a digital or analog television broadcast standard.

The video processing block 182 includes a first frequency rotator 350, a video pre-polyphase filter 352p, a first video polyphase filter 352, a video resampling control block 354, a video filter 356, a digital VGA 358, a multiplexer 360, a digital gain control block 362, a second frequency rotator 364, a picture carrier recovery block 366, an output equalizer 388, a second video polyphase filter 368, an up-sampling block 370 and a Digital to Analog Converter (DAC) 372. The video pre-polyphase filter 352p, first video polyphase filter 352, video resampling control block 354, and the video filter 356 can be considered to be a video filter stage. The picture carrier recovery block 366 includes a carrier recovery filter 374, a first phase rotator 376, a carrier recovery block 378, an AGC filter 380, a second phase rotator 382, a Vestigial Side Band (VSB) filter 384, a third phase rotator 386, an over-modulation filter 406, and an overmodulation magnitude detector 408.

The control block 190 provides a mode control signal 389 to control whether the video processing block 182 operates in the analog or digital operation mode. The mode control signal 389 is provided to the multiplexer 360 as a selection input to select which gain control signal is applied to the digital VGA 358. This is described in further detail below. The mode control signal 389 is also provided to the picture carrier recovery block 366 to enable this block during the analog operation mode or to disable this block during the digital operation mode.

Figure 11A:
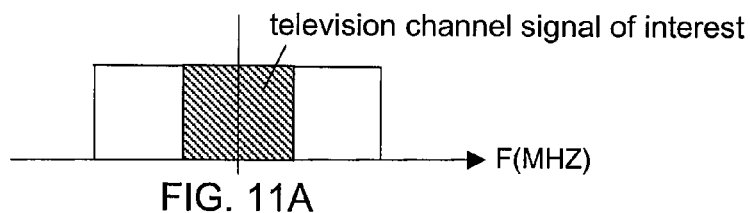
FIGS. 11A, 11B and 11C are spectral diagrams of a general desired television channel signal, a desired television channel signal according to an analog television broadcast standard and a desired television channel signal according to a digital television broadcast standard respectively.

In both digital and analog operation modes, the frequency rotator 350 generally shifts the frequency content of the processed digitized coarse channel signal 192 so that the desired television channel is centered about DC. In the case of analog reception, the video information including the vestigial sideband of the desired channel is centered about DC. In the case of digital reception, the entire channel is similarly centered. Both of these cases are generally shown in FIG. 11A. The frequency rotator 350 also produces in-phase I and quadrature Q signals, and the majority of the video processing block 182 includes two signal paths for processing the I and Q signals. However, there is a degree of offset in the location of the frequency content of the desired television channel due to both known and unknown elements. The degree of offset can be larger for the analog operation mode compared to the digital operation mode for some situations. A portion of the offset results from coarse positioning of the frequency content of the desired television channel signal 22 due to using a coarse step size or a fine step size in the frequency synthesizer 132 and this amount of offset is known. However, an additional offset arises from frequency tolerances in the frequency synthesizer 132, and the transmitter, or other hardware, that transmitted the desired television channel signal 22 to the universal television receiver 100. These offsets are unknown and must also be corrected.

In the digital operation mode, the offset correction can be performed at a later stage by another component such as a digital demodulator (not shown). Those skilled in the art are familiar with techniques that can be employed in the digital demodulator for correcting the offset for television channel signals that are broadcast according to a digital broadcast standard. Accordingly, in some embodiments, there is no feedback signal that is provided to the frequency rotator 350 during digital operation mode. Rather, the video processing block 182 can operate in an open-loop or free-running fashion where a fixed or known frequency shift is applied to the processed digitized coarse channel signal 192 to shift the signal to the baseband to attempt to center the coarse frequency region of interest 170c about DC in spite of the offset. Accordingly, known frequency offset errors in the carrier frequency, such as errors due to the use of a coarse step size or fine step size in the oscillator used in the RF processing block 102 or due to any other known frequency offset errors, may be compensated in this way by applying a corresponding known frequency shift via the frequency rotator 350. The correction of other offsets that may be unknown can be performed by a downstream digital demodulator (not shown). Alternatively, in other embodiments that include a digital demodulator (see FIGS. 17A and 17B for example), the digital demodulator can provide a feedback signal to the frequency rotator 350 to adjust the shift that is applied to the processed digitized coarse channel signal 192 so that it is centered about DC regardless of the offset.

Figure 11B:
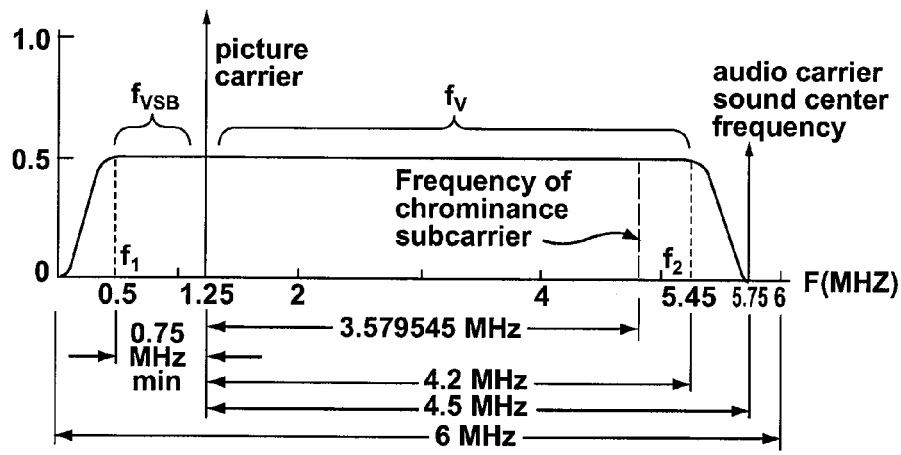

In the analog operation mode, the portion of the analog broadcast television signal from frequency $f_1$ to $f_2$ should be centered about DC by the frequency rotator 350. For example, FIG. 11B shows the location of frequencies $f_1$ and $f_2$ for an NTSC analog television channel signal as is used in North America. This is achieved by using a feedback loop, which includes the first and second frequency rotators 350 and 364 and the picture carrier recovery block 366. The frequency rotator 350 applies a variable frequency shift to the processed digitized coarse channel signal 192 to attempt to center the frequency content of the video information of the desired television channel signal 22 about DC. Upon initial operation, the frequency rotator 350 applies an initial frequency shift. The selection of the initial frequency shift is discussed in more detail with reference to FIG. 12A. The frequency rotator 364 applies a fixed frequency shift of $\Delta\omega$ such that the picture carrier is shifted to DC when the frequency range $f_1$ to $f_2$ is centered about DC at the output of frequency rotator 350. Note that initially the picture carrier may not be shifted exactly to DC due to the offset error. The picture carrier recovery block 366 then tracks the frequency offset error by detecting the actual location of the picture carrier signal and generates an analog mode frequency shift feedback signal 390, which is provided to the frequency rotator 350 to adjust the amount of frequency shift that it provides. Over time, this adjustment in frequency shift is such that the fixed frequency shift provided by the frequency rotator 364 moves the picture carrier signal to DC. The operation of the picture carrier recovery block 366 is described in further detail below.

The output of the frequency rotator 350 is processed by the video pre-polyphase filter 352p which provides low pass filtering to remove unwanted spectral components. The output of the video pre-polyphase filter 352p is processed by the video polyphase filter 352 which provides interpolation to change the number of data samples for the output of the video pre-polyphase filter 352p. The interpolation operation performed by the video polyphase filter 352 provides a different sampled version of the output of the video pre-polyphase filter 352p in that the data samples of the output of the video polyphase filter 352 are at different temporal locations and have a different temporal spacing compared to the output of the video pre-polyphase filter 352p. The end effect of the video polyphase filter 352 is to change the sampling rate at the output of the video polyphase filter 352 such that the bandwidth of the desired television channel signal 22 normalized with respect to the new sampling rate is transformed to match the bandwidth of the video filter 356. Accordingly, the video polyphase filters 352 and 368 act as resampling elements. The amount of interpolation (i.e. the amount of resampling) is dictated by the video resampling control block 354, which provides resampling control signals 392 and 394 to the video polyphase filters 352 and 368 respectively. The degree of interpolation that is required is related to the broadcast transmission standard that was determined by the control block 190, which is indicated by a broadcast information signal that is derived from the video control information 202 that is provided by the control block 190. In alternative embodiments, the functionality of the video resampling control block 354 can be provided by the control block 190.

Consider the parameter $W_{null} = f_{null}/f_S^{(polyphase\ output)}$ which is the fixed cut-off frequency of the video filter 356 normalized with respect to the new sampling rate $f_S^{(polyphase\ output)}$. The video resampling control block 354 configures the value for the new sampling rate $f_S^{(polyphase\ output)}$ such that $f_{null}$ corresponds to half of the bandwidth of the desired television channel signal 22, since it is a complex signal centered about DC. The value for the parameter $f_{null}$ varies based on the television broadcast standard. For analog television broadcast standards, the desired television channel signal 22 includes the video information $f_v$ above the picture carrier frequency as defined by the particular broadcast standard, as well as the vestigial sideband portion $f_{VSB}$ located below the picture carrier frequency both in MHz and shown in FIG. 11B. Accordingly, $f_{null}$ can be given by the following formula.

$$f_{null} = (f_v + f_{VSB})/2 \text{ MHz}$$

The value of $f_{VSB}$ is assumed to be 0.75 MHz in the following examples, though other values may also be possible. The value of $W_{null}$ can be set to 0.31 by design, for example, as a filter with this characteristic represents a practical trade-off in design considerations. Some examples are shown below for various analog television broadcast standards.

$$f_{null} = (4.2+0.75)/2 \text{ MHz}(NTSC)$$

$$f_{null} = (5.0+0.75)/2 \text{ MHz}(PAL\ B,G)$$

$$f_{null} = (5.5+0.75)/2 \text{ MHz}(PAL\ I)$$

$$f_{null} = (5.7+0.75)/2 \text{ MHz}(PAL\ D,K)$$

For digital television broadcast standards including DVB-T, the bandwidth of the desired television channel signal 22 is the entire channel width as illustrated by the following examples ($f_{VSB}$ is not applicable). As in the previous examples, $f_{null}$ is taken as half of this bandwidth since the signal is complex in nature.

$$f_{null} \sim (6.0)/2 \text{ MHz}(6 \text{ MHz } DVB\text{-}T)$$

$$f_{null} \sim (7.0)/2 \text{ MHz}(7 \text{ MHz } DVB\text{-}T)$$

$$f_{null} \sim (8.0)/2 \text{ MHz}(8 \text{ MHz } DVB\text{-}T)$$

$$f_{null} \sim (6.0)/2 \text{ MHz}(6 \text{ MHz } ATSC)$$

Accordingly, rather than implementing the video filter 356 as a variable bandpass filter, the video processing block 182 employs a fixed bandwidth for the video filter 356 and changes the effective sampling rate of the data provided to the video filter 356. The output of the video polyphase filter 352 is at the same physical clock rate but at a new effective sampling rate to adjust the spectrum or bandwidth of the desired television channel signal 22 to match the passband of the video filter 356. This processing allows a sharp, fixed filtering block to be used as if it has a variable passband size. This results in a more efficient implementation since coefficients for a variety of different filter transfer functions to match each of the television broadcast standards is not needed. Rather just one set of coefficients for the video filter 356 are stored. This "resampling processing" allows the video processing block 182 to filter television channel signals having different bandwidths, such as 6, 7 or 8 MHz, with the same fixed filter. Further, it should be noted that the filtering provided by the video filter 356, the equalizer 306, and the analog filters 150 and 156 approximate the filtering provided by the SAW filter that is conventionally used in traditional television receivers. Decimation filtering can also be used prior to the video filter 356 to reduce the number of data samples, and accordingly the number of coefficients used for the video filter 356.

Figure 11C:
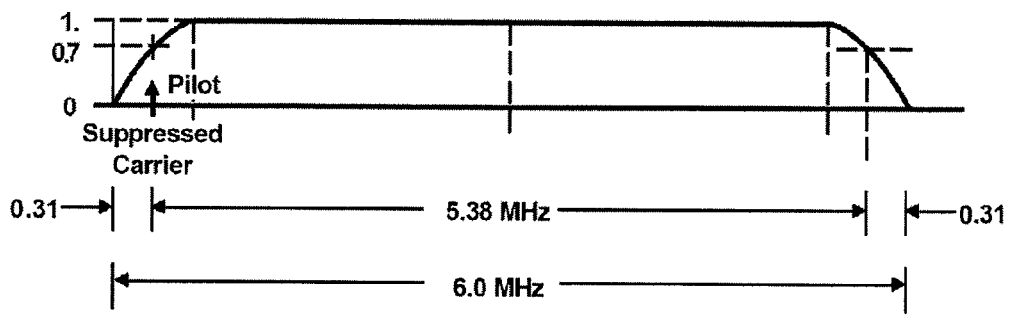

The same filter coefficients may be used by the video filter 356 in the digital and analog operation modes. In the analog reception mode, the sample rate is adjusted such that the video filter 356 separates the video information of the desired television channel signal 22 including the vestigial sideband portion, as described earlier. In the digital reception mode, the sample rate is adjusted such that the video filter 356 passes the entire digital channel, since the video and audio information are transmitted together as a multiplexed data stream. FIG. 11C shows an exemplary diagram for a desired television channel conforming to the ATSC digital broadcast standard as is used in North America. In this case, the effective bandwidth may be set slightly wider than the bandwidth of the desired television channel, in order that some offset in the actual frequency of the received desired television channel may be tolerated without the video filter 356 impinging on the band edges of the desired television channel. Although a slightly wider filter bandwidth may help in some cases, it may harm performance if a strong adjacent channel is present. The narrow filter option may be used without undesired effects in at least some embodiments by applying frequency offset feedback from the digital demodulator to the frequency rotator 350 in order to keep the effective bandwidth of the video filter 356 aligned with the desired television channel. The video filter 356 can be implemented with a pipeline of smaller filters to make the filtering process more efficient, as is commonly known by those skilled in the art.

Figures 11D, 11E, 11F:
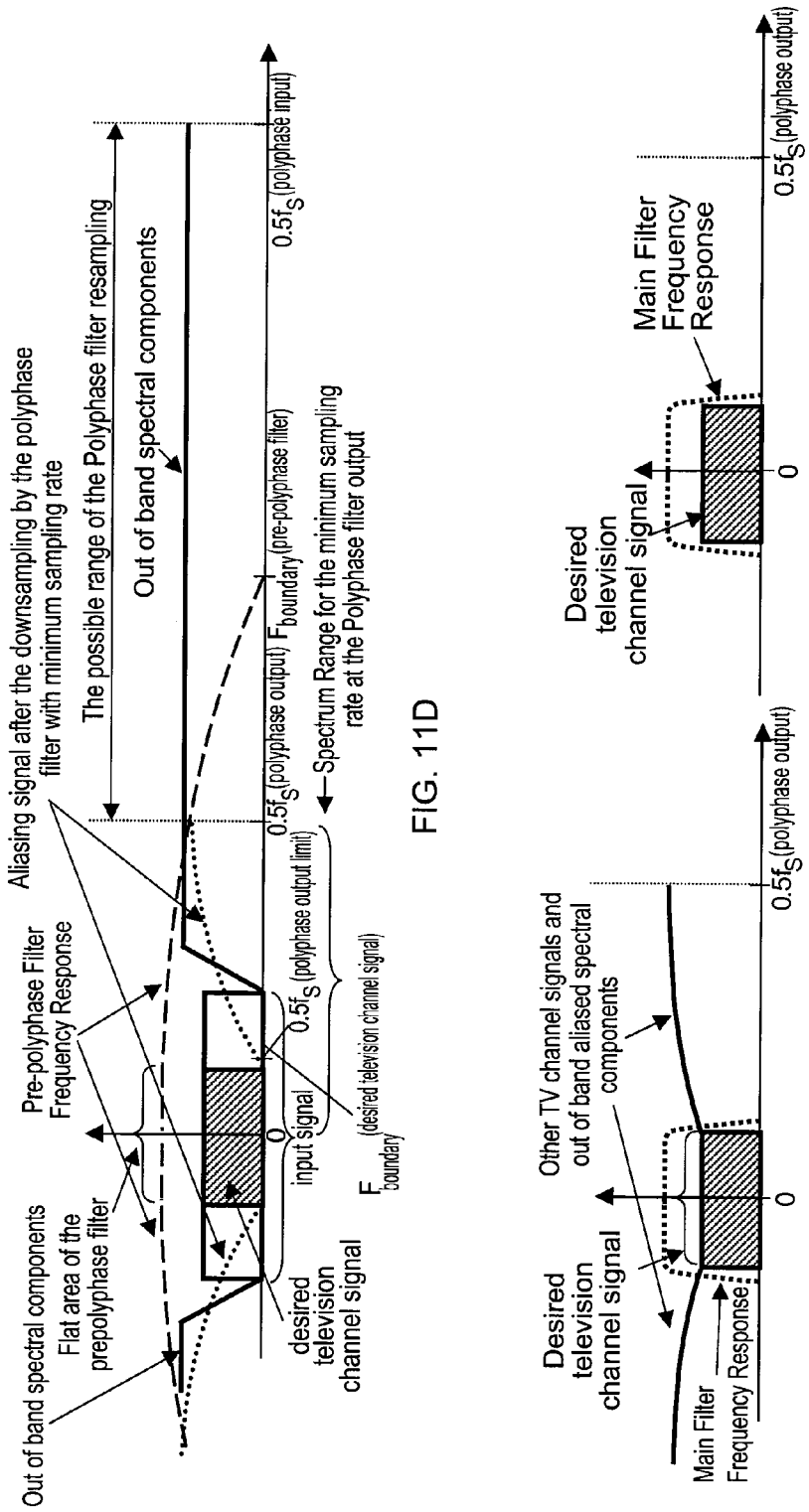
FIGS. 11D, 11E and 11F show spectral plots illustrating the operation of a video pre-polyphase filter, a video polyphase filter and a main video filter that are used in the video processing block.

The operation of the video pre-polyphase filter 352p, video polyphase filter 352 and the video filter 356 will now be described in greater detail with reference to FIGS. 11D-11L (the frequency domain is represented in actual frequencies (Hz) not in normalized frequencies in these figures). The output of the frequency rotator 350 is first processed by the video pre-polyphase filter 352p. As shown in FIG. 11D, the output of the frequency rotator 350 includes the desired television channel signal 22 and out of band components. The video pre-polyphase filter 352p removes substantially all of the out-of-band and out-of-interest spectral components that would otherwise alias to the desired television channel signal band after resampling by the video polyphase filter 352. Accordingly, the video pre-polyphase filter 352p attenuates the high frequency components of the output of the frequency rotator 350. The frequency response of the pre-polyphase filter 352p is shown in FIG. 11D by the dashed line. The response is flat within the band of the desired television channel signal 22. The stopband of the pre-polyphase filter 352p specifies the subsampling ratio of the video polyphase filter 352. When the spectral components at the input of the video pre-polyphase filter 352p are greater than half of the sampling rate at the output of the video polyphase filter 352, those components are aliased into the output of the video polyphase filter 352. Accordingly, the minimum possible sampling rate at the output of the video polyphase filter 352 is limited by the need to avoid this aliasing. These possible aliased components are shown by the dotted lines for the boundary case (i.e. the minimum possible sampling rate after polyphase sampling $f_S^{(polyphase\ output\ min)}$).

The video polyphase filter 352 reduces the rate $f_S^{(polyphase\ input)}$ of the input data samples to the output sampling rate $f_S^{(polyphase\ output)}$. The resampling ratio is $f_S^{(polyphase\ output)}/f_S^{(polyphase\ input)}$. The video polyphase filter 352 is able to change the sampling rate within a particular range as limited by a stopband boundary frequency $F_{boundary}^{(pre-polyphase\ filter)}$ of the video pre-polyphase filter 352p and an upper boundary frequency of the desired television channel signal $F_{boundary}^{(desired\ television\ channel\ signal)}$ as follows.

$$f_S^{(polyphase\ output)} - F_{boundary}^{(pre-polyphase\ filter)} > F_{boundary}^{(desired\ television\ channel\ signal)}$$

The spectrum after the video polyphase filter 352 in actual frequencies (Hz) is shown in FIG. 11E. Now the bandwidth of the desired television channel signal 22 matches the bandwidth of the main video filter 356 and the desired television channel signal 22 is not damaged by any aliased signals. Other television channel signals and out of band aliased spectral components are at least partially attenuated by the video pre-polyphase filter 352p.

The output of the video polyphase filter 352 is processed by the video filter 356. The purpose of this arrangement is that by changing the sampling rate, the effective bandwidth of the video filter 356 may be changed even though the filter itself remains fixed. Video filter 356 is a non-variable low pass filter with a nearly rectangular frequency response that has a very sharp transition between the passband and the stopband. The frequency response and bandwidth are constant in the normalized frequency domain $f/f_S$, but in the absolute frequency domain they are effectively varied by changing the sampling rate. The output sampling rate $f_S^{(polyphase\ output)}$ is chosen such that the effective passband of the video filter 356 matches the bandwidth of the desired television channel signal 22 and such that any undesired spectral components are removed. For different television broadcast standards the desired television channel signal 22 may have a different bandwidth. The operation of the frequency rotator 350 centers the desired television channel signal 22 about DC and by controlling the output sampling rate $f_S^{(polyphase\ output)}$, the effective bandwidth of video filter 356 is modified to match the bandwidth of the desired television channel signal 22.

The video filter 356 filters the output of the video polyphase filter 352 to pass the frequency content of the desired television channel signal 22 while rejecting the portions of the adjacent television signals that were in the coarse frequency region of interest 170c. The video filter 356 extracts the desired television channel signal 22 with high precision. The video filter 356 is a steep rectangular filter that is constant in a normalized frequency domain with respect to sampling rate. The frequency response of the video filter 356 is shown in FIGS. 11E and 11F and the output of the video filter 356 is shown in FIG. 11F.

The digital VGA 358 then amplifies the output of the video filter 356. In the analog operation mode, the amount of digital gain provided by the digital VGA 358 is dictated by the digital gain control block 362, which provides a digital gain control signal 398 to the digital VGA 358. In the digital operation mode, the amount of gain provided by the digital VGA 358 is dictated by a downstream digital demodulator block (see FIGS. 19A and 19B for an example), which provides a digital gain control signal 400 to the digital VGA 358. The mode control signal 389 is provided to the multiplexer 360 to select the digital gain control signal 398 if the operation mode is the analog operation mode, and the digital gain control signal 400 if the operation mode is the digital operation mode. The generation of these signals is described in further detail below.

In the digital operation mode, the I and Q output signals from the digital VGA 358 are provided as the output signals 194 of the video processing block 182. These I and Q signals can then be further processed as desired, for instance, by a downstream digital demodulator, or by other processing elements as is well known by those skilled in the art. The digital demodulator would provide a digital transport stream that can then be operated on by another element such as an MPEG-2 decoder to produce video.

In the analog operation mode, the I and Q outputs of the digital VGA 358 are provided to the frequency rotator 364, which provides a frequency shift so that the picture carrier signal for the video component of the desired television channel signal 22 is shifted to DC. To accomplish this, the frequency rotator 364 provides a fixed frequency shift $\Delta\omega$ that is equal to the difference between the center frequency of the video filter 356 and the expected location of the picture carrier frequency.

The I and Q output signals of the frequency rotator 364 are provided to the picture carrier recovery block 366 to determine a value for the analog mode frequency shift feedback signal 390 so that the frequency rotator 350 can center the frequency content of the desired television channel signal 22 about DC. The control block 190 enables the picture carrier recovery block 366 to operate in the analog operation mode via the mode control signal 389. The picture carrier recovery block 366 uses the picture carrier frequency to demodulate the analog video information in the output of the frequency rotator 364 to provide a CVBS output as the output signals 194.

More particularly, the output of the frequency rotator 364 is provided to the carrier recovery filter 374, the AGC filter 380, the VSB filter 384, and the overmodulation filter 406. In alternative embodiments, these blocks can be implemented in one block for improved efficiency by reusing elements required for filtering such as registers. Furthermore, in some cases, some of the filters 374, 380 and 406 can be implemented using the same filter coefficients as described below.

The carrier recovery filter 374 is a narrowband filter centered at DC with a bandwidth that is wide enough to pass only the picture carrier signal 22 in order to separate it from the rest of the desired television channel signal 22 (see FIG. 11B). The carrier recovery filter 374 filters its input to produce a filtered picture carrier signal. The phase of the filtered picture carrier signal is then rotated by the phase rotator 376 to compensate for phase noise in the output of the frequency rotator 364. The phase rotator 376 applies a phase adjustment to produce a phase-adjusted filtered picture carrier signal that is then provided to the carrier recovery block 378. Phase noise and the operation of the carrier recovery block 378 is described in more detail with relation to FIG. 12A. In alternative embodiments, the control block 190 can provide a bandwidth control signal (not shown) to control the bandwidth of this narrowband filter. The bandwidth can be controlled during different stages of the picture carrier recovery process such as the acquisition stage versus the lock stage; this is discussed in more detail with reference to FIG. 12A.

The AGC filter 380 is employed to precondition the output of the frequency rotator 364 which is a frequency-shifted version of the desired television channel signal 22. The AGC filter 380 performs preconditioning to remove noise and spurious signals. In some cases, the AGC filter 380 can have the same filter coefficients as the carrier recovery filter 374. The AGC filter 380 filters its input to produce another filtered picture carrier signal, the phase of which is then rotated by the phase rotator 382 to compensate for phase noise in the output of the frequency rotator 364. Accordingly, the phase rotator 382 applies a phase adjustment to produce another phase-adjusted filtered picture carrier signal, which is provided to the digital gain control block 362. Thus, during the sync pulses, when the desired television channel signal 22 is at a peak level, the digital gain control block 362 can react to the peak level of the desired television channel signal 22 rather than noise or signal spikes so that the digital gain control block 362 can properly adjust the amount of gain applied to the digital VGA 358 via the digital gain control signal 398. Accordingly, the digital gain control block 362 can include a sync detector to detect the sync pulses and adjust the value of the digital gain control signal 398. In other embodiments, the phase rotator 382 can be eliminated when the digital gain control block 362 computes the magnitude of the output of the AGC filter 380 since the magnitude function is phase insensitive.

In addition, the gain provided by the digital gain control block 362 can be adjusted on a line-by-line basis by detecting the magnitude of each sync pulse. Furthermore, to determine the amount of gain that should be applied by the digital VGA 358, a desired target level can be set. The difference between the desired target level and the detected peak level of the desired television channel signal 22 can be used to determine the value of the digital gain control signal 398 so that the difference tends to zero.

The overmodulation filter 406 is employed to remove noise and spurious signals at the output of the frequency rotator 364. The overmodulation magnitude detector 408 then detects the magnitude of the I and Q components of the output of the overmodulation filter 406 and provides a magnitude level signal 402 to the carrier recovery block 378, the purpose of which is described further below in relation to FIG. 12A.

The video signal from the output of the frequency rotator 364 is processed by the VSB filter 384. The VSB filter 384 filters the output of the frequency rotator 364 (i.e. the frequency-shifted version of the desired television channel signal 22) to produce filtered video information, i.e. the video information of the desired television channel signal 22. The output of the VSB filter 384 is processed by the phase rotator 386 and the applied phase correction value is calculated by carrier recovery block 378. The VSB filter 384 and the phase rotator 386 together convert the input complex vestigial sideband signal to a real CVBS video signal. Under the condition that carrier recovery lock has been acquired, i.e. at the output of the phase rotator 386, the picture carrier is shifted to DC and its phase is 0 so that it is completely a real signal, the CVBS signal can be obtained by inverting the sign of the imaginary part spectral components that have negative frequencies, leaving the positive frequency components unchanged and adding both to the real part of the complex input signal. The spectrum of the complex input signal is shown in FIGS. 11G to 11I while the frequency response of the VSB filter 384 is shown in FIGS. 11J to 11L. Since the final phase rotation by the phase rotator 386 is done after the complex VSB filter 384, the VSB filter 384 has to generate real and imaginary parts that are provided as an input to the phase rotator 386. The CVBS signal is the real output of the phase rotator 386. To generate the real output, the VSB filter 384 multiplies the imaginary part of the input signal spectrum $S_{VS}^{Im}(f)$ by the imaginary part of the frequency response $H_{VSB}^{Im}(f)$ of the VSB filter 384, the product of which is added to the product of the real part of the input signal $S_{VS}^{Re}(f)$ and the real part of the frequency response $H_{VSB}^{Re}(f)$ of the VSB filter 384. It should be noted that the real part of the frequency response $H_{VSB}^{Re}(f)$ of the VSB filter 384 is unity at all frequencies. To generate the imaginary output, the VSB filter 384 multiplies the real part of the input signal spectrum $S_{VS}^{Re}(f)$ by the imaginary part of the frequency response $H_{VSB}^{Im}(f)$ of the VSB filter 384, the product of which is added to the product of the imaginary part of the input signal $S_{VS}^{Im}(f)$ and the real part of the frequency response $H_{VSB}^{Re}(f)$ of the VSB filter 384. The phase rotator 386 then applies a phase adjustment to the phase of the output of the VSB filter 384 to produce phase-adjusted video information which has been compensated for the phase noise in the output of the frequency rotator 364. The "real-only" output of the phase rotator 386 is then provided to the output equalizer 388, which applies group delay correction according to television broadcast standards for the desired television channel signal 22. The output of the output equalizer 388 is then provided to the video polyphase filter 368 so that the signal can be re-interpolated to correspond with the original sampling rate. The output of the video polyphase filter 368 is then up-sampled by the up-sampling block 370 and converted into an analog form by the DAC 372 and provided as the output signals 194 which in this case is an analog CVBS TV output signal.

The carrier recovery block 378 provides the analog mode frequency shift feedback signal 390 to adjust the amount of frequency rotation provided by the frequency rotator 350. The adjustment is such that the frequency shift provided by the frequency rotator 364 aligns the picture carrier at DC. The carrier recovery block 378 is similar to a phase-locked loop and is discussed further in relation to FIG. 12A. However, in this exemplary embodiment, the carrier recovery block 378 also provides a phase control signal 404 to the phase rotators 376, 382 and 386 to control the amount of phase rotation that is applied. A phase rotator is a complex mixer that adjusts the phase of its input to correct for phase errors. However, in some cases, these phase rotators can be optional. Accordingly, in alternative embodiments, the picture carrier recovery block 366 does not include phase rotators 376, 382 and 386 and the carrier recovery block 378 does not provide the phase control signal 404.

In this exemplary embodiment, the picture carrier recovery block 366 performs frequency correction to account for frequency offset errors in the processed digitized coarse channel signal 192 and phase noise compensation to compensate for phase perturbations to reduce phase noise in the processed digitized coarse channel signal 192. The phase noise reduction includes compensating for phase perturbations which includes phase noise and systematic variations caused by spurs and the like. Typically, a television tuner imparts phase noise onto the incoming wideband television signal 10. The phase noise typically appears as white noise in the processed television signal. If the phase noise is less than 200 kHz or so, the phase noise can be tracked and attenuated. Conventional television receivers do not track or compensate for phase noise. It should be understood that the phase noise reduction provided by the picture carrier recovery block 366 can be used with other television receivers that employ a different technique for filtering an input signal that must then be demodulated to obtain the desired television channel signal 22. In these cases, the picture carrier recovery block 366 can be applied to the filtered input signal and the picture carrier recovery block 366 does not have to generate the analog mode frequency shift feedback signal 390.

Accordingly, when operating in analog operation mode, there are actually two processing loops in the video processing block 182. There is an outer loop including the frequency rotator 350, video pre-polyphase filter 352p, video polyphase filter 352, video filter 356, digital VGA 358, frequency rotator 364, and the picture carrier recovery block 366 that acts like a frequency tracking loop. There is also an inner loop including the phase rotators 376, 382 and 386, and the carrier recovery block 378 that acts as a phase tracking loop. The frequency tracking loop tracks the carrier frequency of the desired television channel signal 22 and corrects for frequency offset errors to lock onto the picture carrier frequency of the desired television channel signal 22. The phase tracking loop tracks and reduces the phase noise in the desired television channel signal 22. The phase tracking loop requires a high bandwidth in order to react quickly to the phase noise. Accordingly, filters employed in the phase tracking loop have a reduced number of filter taps and other delays in this loop are kept at a minimum. The frequency lock loop cannot track the phase noise since it has too much delay due to the amount, and sharpness, of the filtering that is done.

The first frequency rotator 350, video pre-polyphase filter 352p, first video polyphase filter 352, video resampling control block 354, video filter 356, digital VGA 358, and the second frequency rotator 364 can be considered to be elements of a signal processing pathway that cumulatively provide frequency shifting and filtering to remove extraneous signal components and output down-shifted frequency components of the desired television channel signal 22 component including the picture carrier signal frequency. Also the video pre-polyphase filter 352p and the first video polyphase filter 352 can be considered to be a video polyphase filter stage for resampling a signal at a new sampling rate. The picture carrier recovery block 266 then generally receives the down-shifted frequency components of the television channel signal component, locks onto the picture carrier signal frequency, and provides a demodulated television channel signal. In at least some embodiments, during the locking process, the operation of the picture carrier recovery block 366 can be modified when operating in an overmodulation handling mode to deal with the presence of overmodulation when locking onto the picture carrier.

Figure 12A:
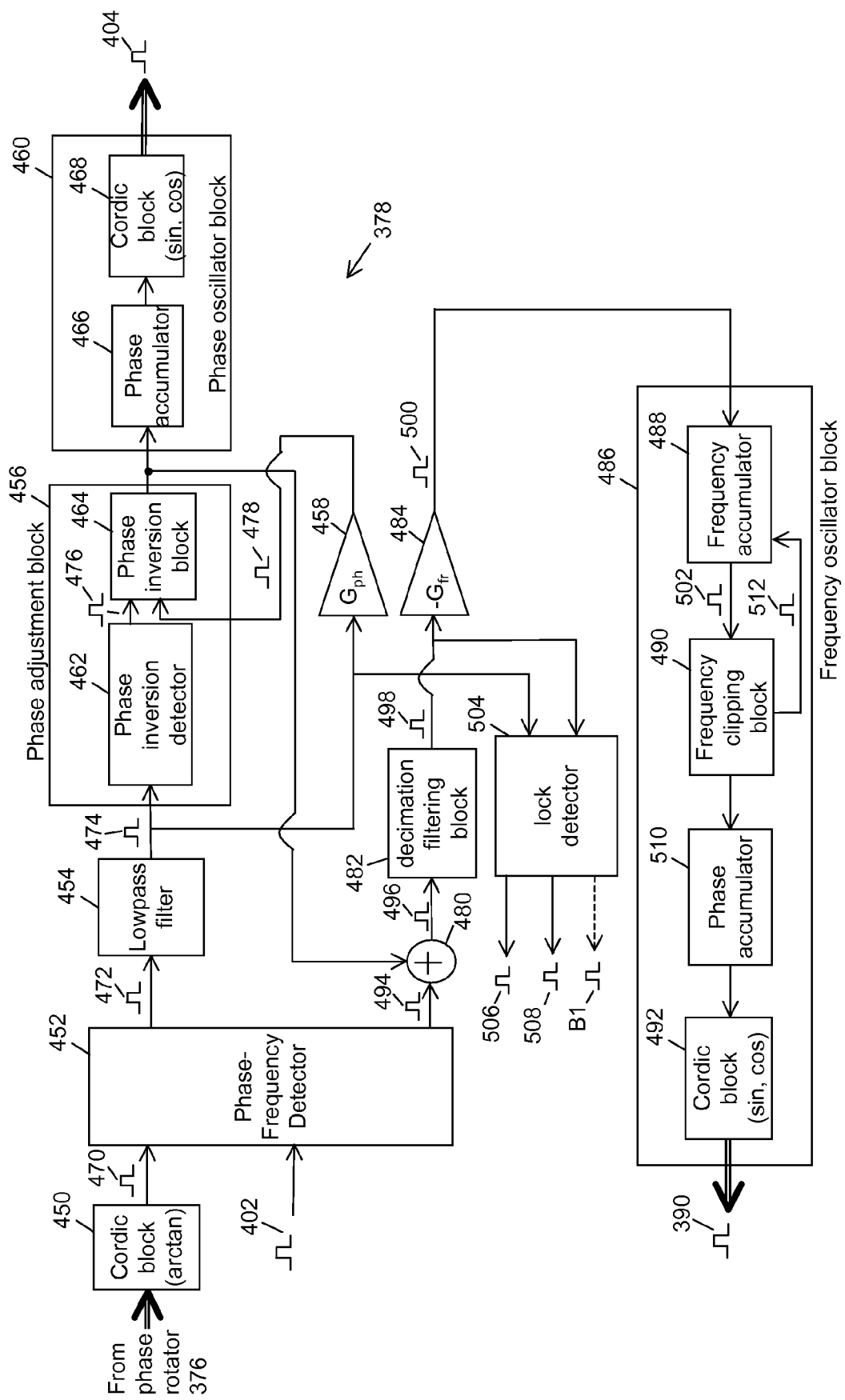
FIG. 12A is a block diagram of an exemplary embodiment of a carrier recovery block that can be used in the video processing block.

The picture carrier recovery block 366 modifies its operation in the presence of overmodulation in the filtered picture carrier signal when tracking at least one of a frequency error signal and a phase error signal by applying a weight to at least one of the frequency error signal and the phase error signal or by using a previous correction value. The phase error signal is produced by comparing a phase of the filtered picture carrier signal with a phase reference signal. There can be embodiments in which only frequency tracking is employed by tracking the frequency error signal, only phase noise reduction is employed by tracking the phase error signal as well as embodiments in which both frequency and phase tracking is employed as shown in FIG. 12A. Accordingly, there can be embodiments in which the operation of the picture carrier recovery block 366 is modified in the presence of overmodulation while generating the analog mode frequency shift feedback signal 390 that is provided to the signal processing pathway. There can also be embodiments in which the operation of the picture carrier recovery block 366 is modified in the presence of overmodulation during the production of the phase control signal 404 to reduce phase noise. There can also be embodiments in which the operation of the picture carrier recovery block 366 can be modified during overmodulation while producing both the analog mode frequency shift feedback signal 390 and the phase control signal 404. The description that follows is for the embodiment in which overmodulation handling is used for both the generation of the phase control signal 404 and the analog mode frequency shift feedback signal 390, but it can be modified by applying overmodulation handling to the production of only one of these two signals as mentioned.

Referring now to FIG. 12A, shown therein is a block diagram of an exemplary embodiment of the carrier recovery block 378 which generally includes a phase correction stage, a frequency correction stage and a status stage. The phase correction stage processes the phase rotated output of the carrier recovery filter 374 and the magnitude level signal 402 to produce the phase control signal 404. The frequency correction stage also processes the phase rotated output of the carrier recovery filter 374 and the magnitude level signal 402 to produce the analog mode frequency shift feedback signal 390. The status stage receives phase and frequency error signals from the phase and frequency correction stages, respectively, to determine if there is phase lock and/or frequency lock. Each of these stages are now discussed in more detail.

The phase correction stage includes a cordic block 450, a phase-frequency detector 452, a lowpass filter 454, a phase adjustment block 456, a phase loop amplifier 458, and a phase oscillator block 460. The phase adjustment block 456 includes a phase inversion detector 462, and a phase inversion block 464. The phase oscillator block 460 includes a phase accumulator 466 and a cordic block 468.

The cordic block 450 receives the I and Q signals of the phase rotated output of the carrier recovery filter 374 and produces a corresponding phase signal 470. The phase-frequency detector 452 then processes the phase signal 470 to produce a phase error signal 472 by comparing the phase signal 470 with a phase reference signal expected for zero phase noise. The phase reference signal is typically a phase vector that lies along the I axis.

The phase-frequency detector 452 can operate in different phase tracking modes including a full phase tracking mode, and an overmodulation handling mode. The overmodulation handling mode can be a first overmodulation handling mode or a second overmodulation handling mode. The use of the overmodulation handling mode provides protection against overmodulation of the picture carrier signal for analog broadcast television signals. For instance, for NTSC television signals, negative modulation is used and an NTSC television signal has its highest signal level during the sync interval. However, in some cases, such as when very white television components are transmitted, due to overmodulation, the amplitude of the picture carrier signal can tend towards zero, be very small and less than the noise level, or can even undergo 180 degrees phase reversal. It then becomes difficult to track the phase and if one is not careful then noise can be tracked instead of the picture carrier. When the level of the real picture carrier then becomes larger and is detected, it can be out of phase with the phase that is currently being tracked. This overmodulation situation can be reflected in the magnitude level signal 402, which can be used to obtain accurate results without phase synchronization.

Figure 12B:
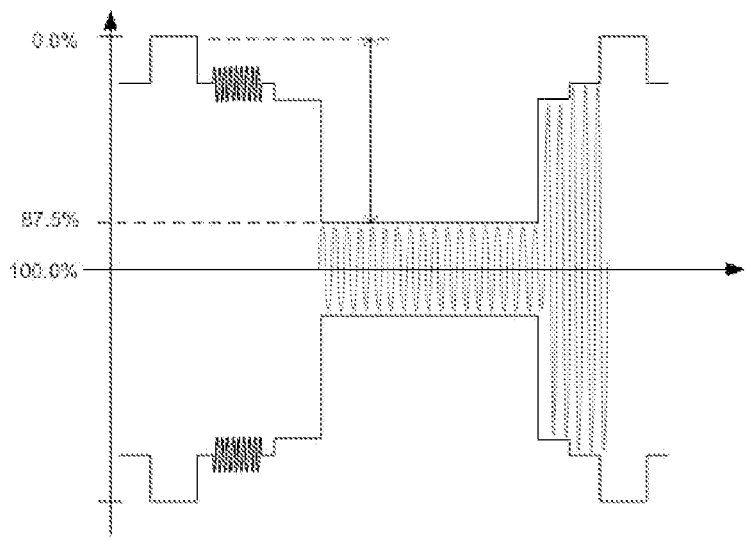
FIG. 12B is a diagram illustrating the phenomenon of overmodulation.

FIG. 12B shows an exemplary signal and defines the percentage of video modulation. Most specifications define overmodulation as more than 87.5% of modulation as shown in FIG. 12B. However, some television signals are transmitted with an amount of modulation that is larger than 87.5% and in some cases can even have over 100% modulation. During portions of television signals in which the modulation is greater than 100%, the phase of the picture carrier is reversed.

The phase-frequency detector 452 can operate in the first overmodulation mode or the second overmodulation mode to compensate for overmodulation. Both of these modes are a non-coherent way to detect and handle overmodulation. Both of these modes employ a magnitude level, provided by the magnitude level signal 402, which is the level of the filtered picture carrier signal to determine when overmodulation has occurred and to gate off unreliable phase information. Accordingly, the overmodulation filter 406 is a lowpass filter in which the cutoff frequency is set to remove rapid transitions and spurious switches in the picture carrier signal. The phase of the filtered picture carrier signal is not used in either overmodulation mode. Further, the input to the picture carrier recovery block 366 is used to detect overmodulation rather than the demodulated output (i.e. the output of the VSB filter 384).

Figure 12C:
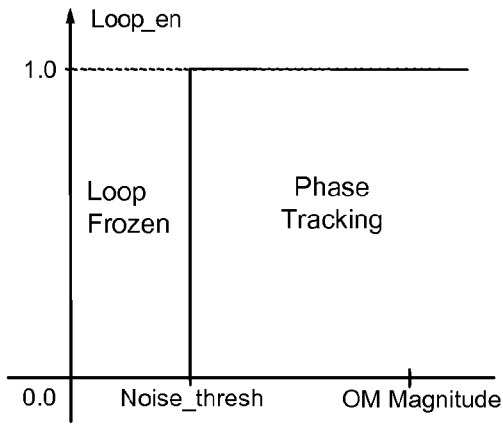
FIG. 12C is a diagram illustrating a first technique for dealing with overmodulation.

Referring to FIG. 12C, shown therein is a graphical representation of the first overmodulation handling mode. The value of the magnitude level signal 402 is compared against a threshold, Noise_thresh, to determine if overmodulation is occurring. When the magnitude level signal 402 falls below the threshold, the carrier recovery block 378 enters into a loop frozen mode and essentially holds the phase control signal 404 and the analog mode frequency shift feedback signal 390 constant by using the last or previous phase correction and frequency correction values prior to entering the loop frozen mode. This can also be referred to as free-running phase tracking. Accordingly, in this case, unreliable phase information measured by the phase-frequency detector 452 is prevented from being further processed by the phase and frequency correction stages when the magnitude of the filtered picture carrier signal is small and unreliable. When the magnitude level signal 402 is greater than the threshold, the frequency-phase detector 452 exits overmodulation handling mode, and the phase control signal 404 and the analog mode frequency shift feedback signal 390 become active again to actively track the phase and frequency errors. The full value of the phase and frequency errors are used and so it can be considered that a weight having a value of 1 is applied to these errors in this case.

The value of the threshold Noise_thresh can be selected to be the value that is expected for the white level of the magnitude level signal 402 when overmodulation is at about 90%; i.e. the magnitude level corresponding to a white level is 10% for 90% overmodulated video on a normalized basis, and the threshold Noise_thresh can be set to 0.1 in terms of normalized magnitude, i.e. the threshold Noise_thresh is at a magnitude level equivalent to a normalized magnitude level of about 10%. This normalization can be done by the overmodulation magnitude detector 408 or another suitable element.

This threshold can also be changed depending on whether the phase and frequency correction stages (i.e. phase and frequency correction loops) are operating in an acquisition state and are attempting to determine coarse phase and frequency settings, or if they are operating in a lock state and have determined the current phase and frequency operating points. For instance, the threshold Noise_thresh can be set to a lower value during the acquisition state than during the lock state so that the carrier recovery tracks more often during the acquisition state. Alternatively, in other embodiments, the threshold Noise_thresh can have the same value during both acquisition and lock states.

In addition, the timing for applying the weights or using a previous phase or frequency correction value with respect to the detection of overmodulation can be skewed (i.e. advanced or retarded), or stretched. Accordingly, the carrier recovery block 378 can apply a guard band, which is a block of time, that can be skewed or stretched with respect to the onset and termination of overmodulation detection so that during the guard band the phase and frequency errors are not being actively tracked. The amount of skewing or stretching can be based on the severity of the noise at the output of the frequency rotator 364. This will provide robustness under more severe phase noise conditions, such as under multipath scenarios. In some embodiments, the timing of the guard band for compensating for overmodulation earlier (in terms of the number of samples) with respect to the onset of overmodulation and to continue compensating for overmodulation for some time afterwards (once again in terms of the number of samples) with respect to the termination of overmodulation can be the same. The number of samples to advance or delay entry into or exit out of overmodulation compensation with respect to the onset or termination of overmodulation detection can be in the range of 8 to 15 samples. The guard band can also be used in the second overmodulation handling mode which is now discussed.

Figure 12D:
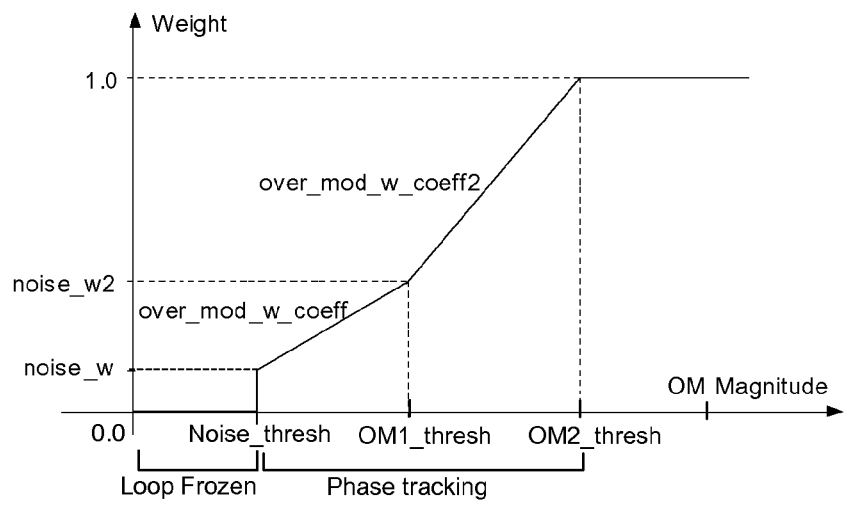
FIG. 12D is a diagram illustrating a second technique for dealing with overmodulation.

Referring to FIG. 12D, shown therein is a graphical representation of the second overmodulation handling mode. The second overmodulation handling mode uses a soft approach to gate off unreliable phase information which would otherwise be measured by the phase-frequency detector 452 during overmodulation. The second overmodulation handling mode applies a weight to the phase error signal 472 and the frequency error signal 494 before these signals are used in the remainder of the phase and frequency correction stages.

In some embodiments, the weighting is a piece-wise linear function based on the value of the magnitude level signal 402 as shown in FIG. 12D. The maximum weight is 1, which is similar to the full phase tracking mode when the measured phase and frequency errors are used to actively track phase and frequency in the frequency and phase correction stages. Below the threshold Noise_thresh, operation is somewhat similar to the loop frozen operation for the first overmodulation handling mode in which the phase control signal 404 and the analog mode frequency shift feedback signal 390 are held constant by applying a weight of zero to the phase error signal 472 and the frequency error signal 494. In this case, the output of the lowpass filter 454 decays to zero depending on the duration of the loop frozen operation. Generally, a large weight is applied to the phase error signal 472 and the frequency error signal 494 when the magnitude level signal 402 is large, and a small weight is applied to the phase error signal 472 and the frequency error signal 494 when the magnitude level signal 402 is small. Operation in the sloped regions can be referred to as soft phase tracking.

The shape of the piece-wise weighting function can be changed by setting different values for the thresholds Noise_thresh OM1_thresh, and OM2_thresh the first weight, the second weight, and by using different values for the two slopes. In alternative embodiments, more than three threshold values can be used, and the additional thresholds are used to determine the amount of soft phase tracking in finer granularities. Also, different values can be selected for these parameters if the phase and frequency correction stages (i.e. phase and frequency correction loops) are operating in an acquisition state and are attempting to determine coarse phase and frequency settings, as compared to when these stages are operating in a lock state and have determined the current phase and frequency operating points.

In this exemplary embodiment, the slope of the weighting curve increases with magnitude until the maximum weighting is reached. The first weight is set at noise_w, and the threshold Noise_thresh is in the range of a magnitude level that is equivalent to a normalized magnitude level of about 5% to 10%. The threshold OM1_thresh is chosen to be greater than the threshold Noise_thresh and is generally less than a magnitude level that is equivalent to a normalized magnitude level of 0.3. The second weight is chosen to be greater than the first weight and generally less than a magnitude level that is equivalent to a normalized magnitude level of 0.2. The threshold OM2_thresh is chosen to be greater than the second threshold and is less than a magnitude level that is equivalent to a normalized magnitude level of 1.0. The slopes are chosen so that the weighting curve is a piece-wise linear function that connects the different threshold/weighting pairs together. In general, the weighting function can be the same during the acquisition and lock states. However, for more phase tracking during the acquisition state, the thresholds can be set lower and the weights can be set higher than the settings for the thresholds and weights used in the lock state. Timing changes, similar to those discussed in the first overmodulation handling mode may or may not be used in the second overmodulation handling mode.

In all of the phase tracking modes, the phase correction loop operates with the gain value $G_{ph}$ being selected for the phase loop amplifier 458 (which can be implemented as a multiplier) to provide a compromise between the bandwidth of the phase tracking stage and hence the speed with which the phase tracking stage can lock onto the phase reference signal and respond to changes in the phase error signal 472. The amount of filtering provided by the lowpass filter 454 can also be adjusted to obtain a desired speed and bandwidth for the phase tracking stage. Also, the gain value $G_{ph}$ is selected to provide an acceptable amount of phase error while the phase tracking stage still remains in lock. The value of $G_{ph}$ can also be modified during operation depending on whether phase or frequency lock has occurred to improve the operation of the phase tracking stage. As a rule of thumb, the gain and loop bandwidth are selected so that under a step response condition, the residual phase error does not result in multiple oscillations before settling to zero.

In the linear regions of the second overmodulation handling mode, the phase-frequency detector 452 generally operates by multiplying the phase error with a positive non-zero weight that is less than 1, so that the effective gain value $G_{ph}$ of the phase correction loop is set to a smaller value than that used in the full phase tracking mode. This allows the phase tracking stage to react more slowly to changes in the phase error signal 472 since the phase error signal 472 is more likely to be affected by noise due to the lower value of the magnitude level signal 402.

In each of the phase tracking modes, the phase error signal 472 is filtered by the lowpass filter 454 to obtain a filtered phase error signal 474. The filtered phase error signal 474 is amplified by the loop gain and passed into the phase adjustment block 456. The filtered phase error signal 474 is processed by the phase adjustment block 456 which compensates for 180 degrees phase synchronization that may occur in the filtered phase error signal 474. The 180 degrees phase synchronization may occur during system initialization under very high signal to noise conditions, where the picture carrier recovery block 366 can lock onto the 180 degrees operating point. In this exemplary embodiment, the phase adjustment block 456 can also be disabled or enabled.

The phase inversion detector 462 checks the filtered phase error signal 474 to determine if there is a +/−180 degrees phase shift in the phase error. The phase inversion detector 462 checks for how long the filtered phase error signal 474 is in the region of +/−180 degrees (this can be done using a counter). If the filtered phase error signal 474 is in the region of +/−180 degrees for a certain period of time, the phase loop is running at an operating point that is off by 180 degrees. The phase inversion detector 462 then produces a 180 degrees phase inversion detection signal 476 to indicate whether this 180 degrees phase synchronization has occurred. The filtered phase error signal 474 is also amplified by the phase loop amplifier 458 to produce an amplified phase error signal 478. The phase inversion block 464 receives both the 180 degrees phase inversion detection signal 476 and the amplified phase error signal 478. If 180 degrees phase synchronization has not been detected, then the output of the phase adjustment block 456 is the amplified phase error signal 478; i.e. no correction is applied by the phase inversion block 464. If 180 degrees phase synchronization has been detected, then the output of the phase adjustment block 456 is a 180 degrees phase adjusted signal; i.e. a 180 degree phase correction is provided by the phase inversion block 464.

The phase oscillator block 460 produces the phase control signal 404 based on the output of the phase adjustment block 456. The phase accumulator 466 accumulates the values of the amplified phase error signal 478, which has been corrected for 180 degrees phase synchronization, to obtain an integrated phase value. This accumulation, or integration, which can be weighted in some implementations, allows the phase tracking stage to respond a bit slower to instantaneous changes in the phase error signal 472 and therefore operate in a more stable fashion. The integrated phase value is then converted to I and Q signals by the cordic block 468 which are outputted as the phase control signal 404 and provided to the phase rotators 376, 382 and 386. When the integrated phase error tends towards zero, the phase tracking stage is locked and the phase noise in the desired television channel signal 22 is compensated.

The frequency correction stage also includes the cordic block 450, the phase-frequency detector 452, a summer 480, a decimation filtering block 482, a frequency loop amplifier 484, and a frequency oscillator block 486. The frequency oscillator block 486 includes a frequency accumulator 488, a frequency clipping block 490, a phase accumulator 510, and a cordic block 492. The frequency correction stage can also operate in a full frequency tracking mode, and employ soft frequency tracking and free running frequency tracking, as in the case of the phase correction stage. The frequency correction stage is a slower loop than the phase correction stage. Accordingly, the value for the frequency loop gain $-G_{fr}$ and the bandwidth of the frequency loop is selected so that the step response for this loop is dampened with little overshoot. The frequency correction stage should be able to track within 500 kHz of the actual picture carrier frequency taking into account the frequency offset error.

The phase-frequency detector 452 generates a frequency error signal 494. The frequency error signal 494 is derived from the phase error signal 472 in that the values in the frequency error signal 494 are a series of delta-phase errors since frequency is the derivative of phase. The frequency error signal 494 indicates the offset of the picture carrier frequency from DC at the output of the frequency rotator 364. The phase rotators 376, 382 and 386 can correct for some amount of frequency error before the signal enters into the carrier recovery block 378. As a result, the amount of frequency correction that is required by the frequency loop takes into account the amount of frequency error to be corrected by the phase rotators 376, 382 and 386. This information is considered by adding the frequency error signal 494 to the output of the phase adjustment block 456 via the summer 480 to produce an adjusted frequency error signal 496.

The adjusted frequency error signal 496 is then filtered and decimated by the decimation filtering block 482 to produce a filtered frequency error signal 498. The decimation filtering block 482 provides lowpass filtering to smooth out the values in the adjusted frequency error signal 496. Decimation, which is optional, is used in this exemplary embodiment for increasing implementation efficiency. The filtered frequency error signal 498 is then amplified by the frequency loop amplifier 484, which can also be implemented as a multiplier, to produce an amplified frequency error signal 500. The amount of filtering provided by the decimation filtering block 482 and the amount of amplification provided by the frequency loop amplifier 484 can be adjusted to control the bandwidth and hence the speed of the frequency tracking stage.

The amplified frequency error signal 500 is then provided to the frequency oscillator block 486, which generates the analog mode frequency shift feedback signal 390 based on the amplified frequency error signal 500. The amplified frequency error signal 500 is first processed by the frequency accumulator 488, which keeps track of the current frequency and updates it with the current value in the amplified frequency error signal 500 to produce a frequency adjusted signal 502. In some implementations, the frequency accumulator 488 can average consecutive values in the amplified frequency error signal 500 prior to adjusting the current frequency value. In some cases, weighted averaging can be used. The amplified frequency error signal 500 allows for compensating for the frequency offset error that was discussed previously. The frequency accumulator 488 is provided with an initial frequency value, which is the amount of frequency shift that is expected to be applied to the processed digitized coarse channel signal 192 to center it about DC. At initial operation, the current frequency value is set based on the initial frequency value and thereafter updated based on the values in the amplified frequency error signal 500.

The frequency clipping block 490 specifies upper and lower limits for the frequency adjusted signal 502 to define a range of frequencies over which frequency tracking operates for picture carrier recovery. The amplified frequency error signal 500 is added to the current frequency in the frequency accumulator 488, and the result is compared to a maximum and minimum frequency in the frequency clipping block 490. If the resulting frequency is greater than the maximum or less than the minimum clipper frequencies, the frequency accumulator value is clipped (i.e. limited) to the maximum value limit or the minimum value limit, respectively; hence the feedback signal 512 from the frequency clipping block 490 to the frequency accumulator 488. In alternative embodiments, the clipping function can be replaced by a wrapping function in which, when one frequency limit is reached without the picture carrier being locked, the current frequency used by the frequency accumulator 488 is set to the opposite limit via the feedback connection. The output of the frequency clipping block 490 is provided to the phase accumulator 510 which in turn provides an input to the cordic block 492 which then generates the analog mode frequency shift feedback signal 390. The phase accumulator 510 keeps track of the current phase. The frequency accumulator 488 provides the value by which the phase accumulator 510 is incremented on each cycle after processing by the frequency clipping block 490. The higher the frequency, the more rapidly the phase will accumulate.

The status stage includes a lock detector 504. The lock detector 504 receives the filtered phase error signal 474 and the filtered frequency error signal 498 and determines whether lock has occurred for phase and frequency tracking. The lock detector 504 provides a phase lock status signal 506 and a frequency lock status signal 508. These values can be stored in status registers associated with the video processing block 182. The values can then be used to modify some parameters in the phase and frequency tracking stages, as well as some parameters of the blocks in the picture carrier recovery block 366 such as the bandwidth of the carrier recovery filter 374 and the AGC filter 380. The video processing block 182 can adopt a different set of parameters during phase or frequency acquisition versus phase or frequency lock (i.e. for implementing coarser or tighter search ranges as well as faster or slower response). In at least some embodiments, the lock detector 504 can also generate signal B1, which is used to indicate that a lock has been made to the picture carrier, and communicate signal B1 to the control block 190 as explained previously with respect to FIG. 7.

As mentioned previously, various audio standards are used for the audio information that is present in analog television signals. For instance in North America, there is only one audio carrier that is used with a television signal, however, the audio carrier may carry stereo audio information. In Europe, a NICAM standard can be used which is a digitally encoded audio signal that is included with an analog television signal. However, other standards use two analog audio carrier signals to encode "right-sided" audio information and "left-sided" audio information. Each of these scenarios can be handled by the first and second audio filtering blocks 184 and 186, and the audio processing block 188. If only one audio carrier signal is used, then just the first audio filtering block 184 is enabled. Digital broadcast standard television signals include multiplexed audio and video information. In this exemplary embodiment, such television signals are processed by the video processing block 182, which provides a digital output containing the video and audio information as the output signal. The video and audio information can then be further processed by another element, such as a downstream digital demodulator (not shown), for example. The processing provided by the first and second audio filtering blocks 184 and 186, and the audio processing block 188 can provide SIF (a Sound Intermediate Frequency signal) or baseband sound outputs. With an SIF signal output, another audio decoder can be connected to the receiver 100 to process the audio information.

The structure of the first and second audio filtering blocks 184 and 186 are similar. Accordingly, only the first audio filtering block 184 will be discussed in greater detail with reference to a first embodiment shown in FIG. 13A and an alternative embodiment shown in FIG. 13B. The sound carrier signal is a narrowband signal that is separated from the accompanying video information (refer to FIG. 11B for an example). The first audio filtering block 184 is provided with the same processed digitized coarse channel signal 192 as the video processing block 182 or with another signal as explained below in relation to FIG. 13B. Audio signals can have a wide variation in bandwidth; the audio bandwidth range extends from about 50 kHz to 700 kHz. Accordingly, the first audio filtering block 184 employs a somewhat similar processing methodology as the video processing block 182 in that a fixed filter is used along with resampling to make it appear as if the fixed filter has a variable bandwidth. In addition, the first audio filtering block 184 generally employs a second frequency tracking loop that is configured to extract the audio carrier frequency of the desired television channel signal 22 for analog television broadcast standards and the first audio filtering block 184 is configured to apply a second known frequency shift to compensate for a known frequency offset in the audio carrier frequency. However, in alternative embodiments, the frequency tracking in the first audio filtering block 184 can be slaved to the frequency tracking employed by the video processing block 182 as described with relation to FIG. 13B.

Figure 13A:
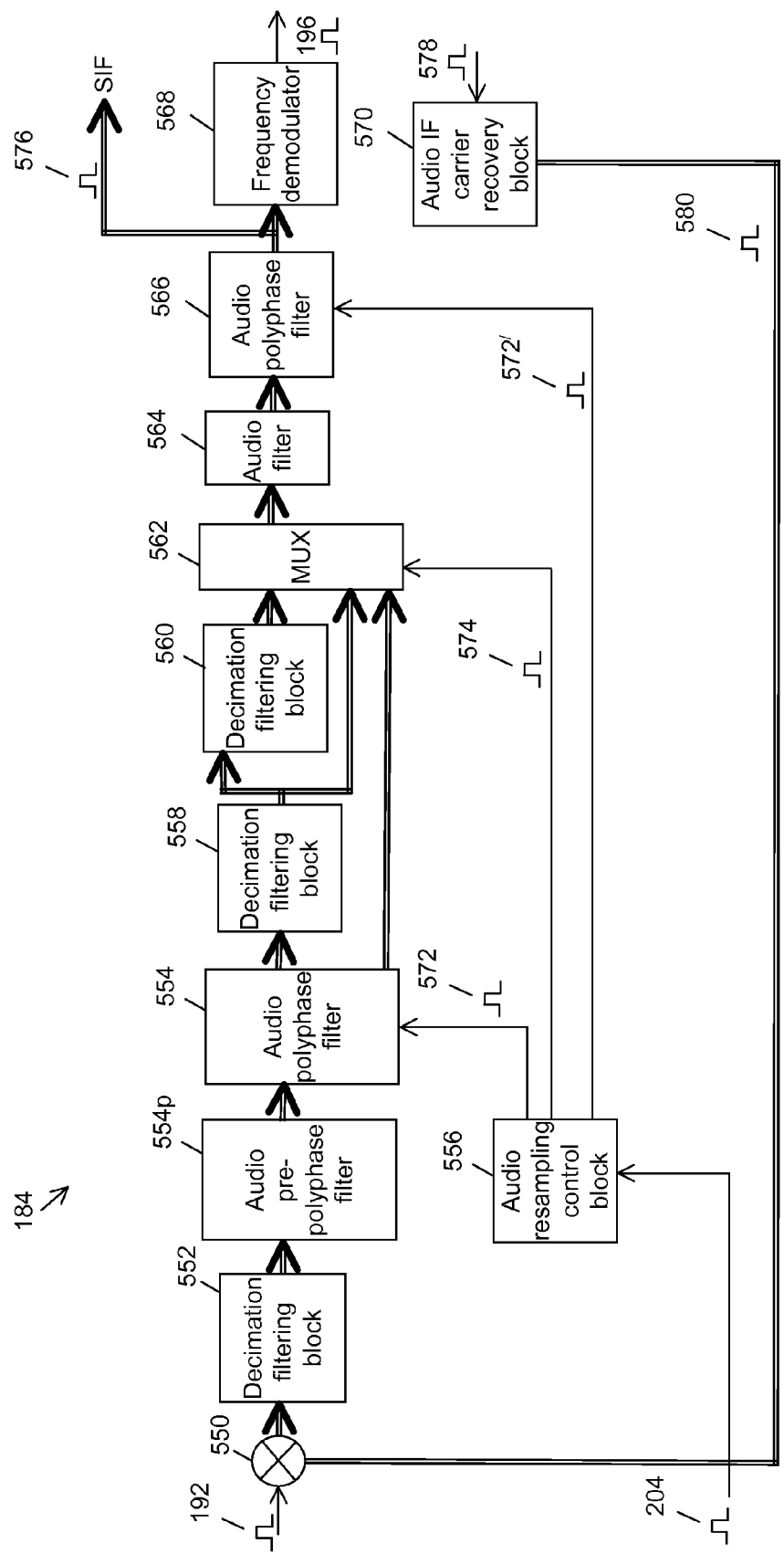
FIG. 13A is a block diagram of an exemplary embodiment of an audio filtering block that can be used in the digital processing block.

Referring now to FIG. 13A, shown therein is an exemplary embodiment of the first audio filtering block 184. The first audio filtering block 184 includes a frequency rotator 550, a first decimation filtering block 552, an audio pre-polyphase filter 554*p*, a first audio polyphase filter 554, an audio resampling phase control block 556, a second decimation filtering block 558, a third decimation filtering block 560, a multiplexer 562, an audio filter 564, an audio polyphase filter 566, a frequency demodulator 568 and an audio IF carrier recovery block 570. The audio pre-polyphase filter 554*p* and the first audio polyphase filter 554 can be considered to be an audio polyphase filter stage for resampling a signal at a new sampling rate. The decimation filtering block 552, audio pre-polyphase filter 554*p*, first audio polyphase filter 554, audio resampling phase control block 556, second decimation filtering block 558, third decimation filtering block 560, multiplexer 562, audio filter 564, and audio polyphase filter 566 can be referred to as an audio filter stage. Also, the second frequency tracking loop includes the frequency rotator 550, the audio filter stage, the frequency demodulator 568 and the audio IF carrier recovery block 570.

The frequency rotator 550 receives the processed digitized coarse channel signal 192 and shifts the frequency content of this signal such that the frequency content of the audio of the desired television channel signal 22 is approximately centered about DC. However, due to the frequency offset uncertainty, exact centering about DC is likely not achieved. The output of the frequency rotator 550 is then filtered and downsampled by the decimation filtering block 552. The output of the decimation filtering block 552 is filtered by the audio pre-polyphase filter 554*p*, and subsequently resampled by the audio polyphase filter 554 based on a first resampling control signal 572. The audio pre-polyphase filter 554*p* is configured and used in a similar manner as the video pre-polyphase filter 352*p*. It should be noted that the function of the decimation filtering block 552 can optionally be included into the functionality of the audio pre-polyphase filter 554*p* and/or the audio polyphase filter 554. The audio resampling phase control block 556 provides the value for the first resampling control signal 572 based on the audio broadcast standard that corresponds with the television broadcast transmission standard for the desired television channel signal 22. The audio polyphase filter 554 then resamples the output of the audio pre-polyphase filter 554*p* so that its bandwidth is transformed to match the bandwidth of the desired audio signal with the bandwidth of the fixed audio filter 564; this operation is analogous to that in the video processing block 182 and therefore does not need to be further discussed. In alternative embodiments, the functionality of the audio resampling phase control block 556 can be provided by the control block 190.

However, since the bandwidth of the desired audio signal ranges from 50 kHz to 700 kHz, and a relatively large sampling rate is being used, the first audio filtering block 184 employs the decimation filtering blocks 558 and 560 and the multiplexer 562 for more efficient processing. These blocks are used to extend the range of bandwidth control by an additional 2 octaves. The blocks 558 to 562 are not required if the audio polyphase filter 554 is configured to deal with these different frequency ranges for the audio.

In this exemplary embodiment, there are three audio signal pathways from the audio polyphase filter 554 to the audio filter 564 via the multiplexer 562. The audio resampling phase control block 556 provides an audio pathway selection control signal 574 to the multiplexer 562 to select one of the three audio pathways. A first audio pathway exists from the output of the audio polyphase filter 554 to the audio filter 564. A second audio pathway exists from the output of the audio polyphase filter 554 through the decimation filtering block 558 to the audio filter 564. A third audio pathway exists from the output of the audio polyphase filter 554 through the decimation filtering blocks 558 and 560 to the audio filter 564.

The first audio pathway does not provide any downsampling, while the second audio pathway provides a first amount of downsampling and the third audio pathway provides a second amount of downsampling that is larger than the first amount of downsampling. Accordingly, the first audio pathway can be selected when the desired audio signal has a high bandwidth at the upper end of the audio bandwidth range. The second audio pathway can be selected when the desired audio signal has a medium bandwidth that is somewhere between the lower and upper limits of the audio bandwidth range. The third audio pathway can be selected when the desired audio signal has a small bandwidth that is at the lower end of the audio bandwidth range. In general, a greater or lesser number of decimation stages may be configured depending on the desired range of audio bandwidths to be supported.

The audio filter 564 operates in a similar manner as the video filter 356 and therefore does not need to be described in detail. The output of the audio filter 564 is provided to the audio polyphase filter 566 which upsamples the audio signal to generate a sound IF (SIF) signal 576. The SIF signal 576 can be further processed by the audio processing block 188. The output of the audio polyphase filter 566 can also be sent to the frequency demodulator 568 which demodulates this output to produce the intermediate audio signal 196. The frequency demodulator 568 is typically an FM demodulator which is well known to those skilled in the art. If the desired audio signal is a mono audio signal, then the intermediate audio signal 196 is a baseband audio signal. For other audio broadcast standards, the intermediate audio signal 196 is another modulated audio signal. The sampling rate associated with the SIF signal 576 and the intermediate audio signal 196 can be on the order of 1.536 MHz to improve noise performance.

The audio IF carrier recovery block 570 receives a sound IF carrier recovery signal 578 from the audio processing block 188 (discussed with relation to FIG. 14), which is used to track the audio carrier signal. In alternative embodiments, the audio IF carrier recovery block 570 can receive the output signal of the frequency demodulator 568. However, the sound IF carrier recovery signal 578 is a better quality signal with less noise. The audio IF carrier recovery block 570 tracks an audio carrier signal that corresponds to the desired television channel signal 22 and provides an audio frequency shift feedback signal 580 to the frequency rotator 550 for shifting the audio carrier frequency to DC when doing baseband demodulation and for shifting frequency content of the audio information to DC for SIF only processing. In an alternative embodiment, the audio IF carrier recovery block 570 is not dependent on the sound IF carrier recovery signal 578 but rather is configured to operate in a free running mode such that frequency rotator 550 provides a fixed frequency shift. In this case, audio carrier recovery may be performed at a later stage without feedback to frequency rotator 550 or to audio IF carrier recovery block 570. The implementation of the audio IF carrier recovery block 570 is known to those skilled in the art.

Figure 13B:
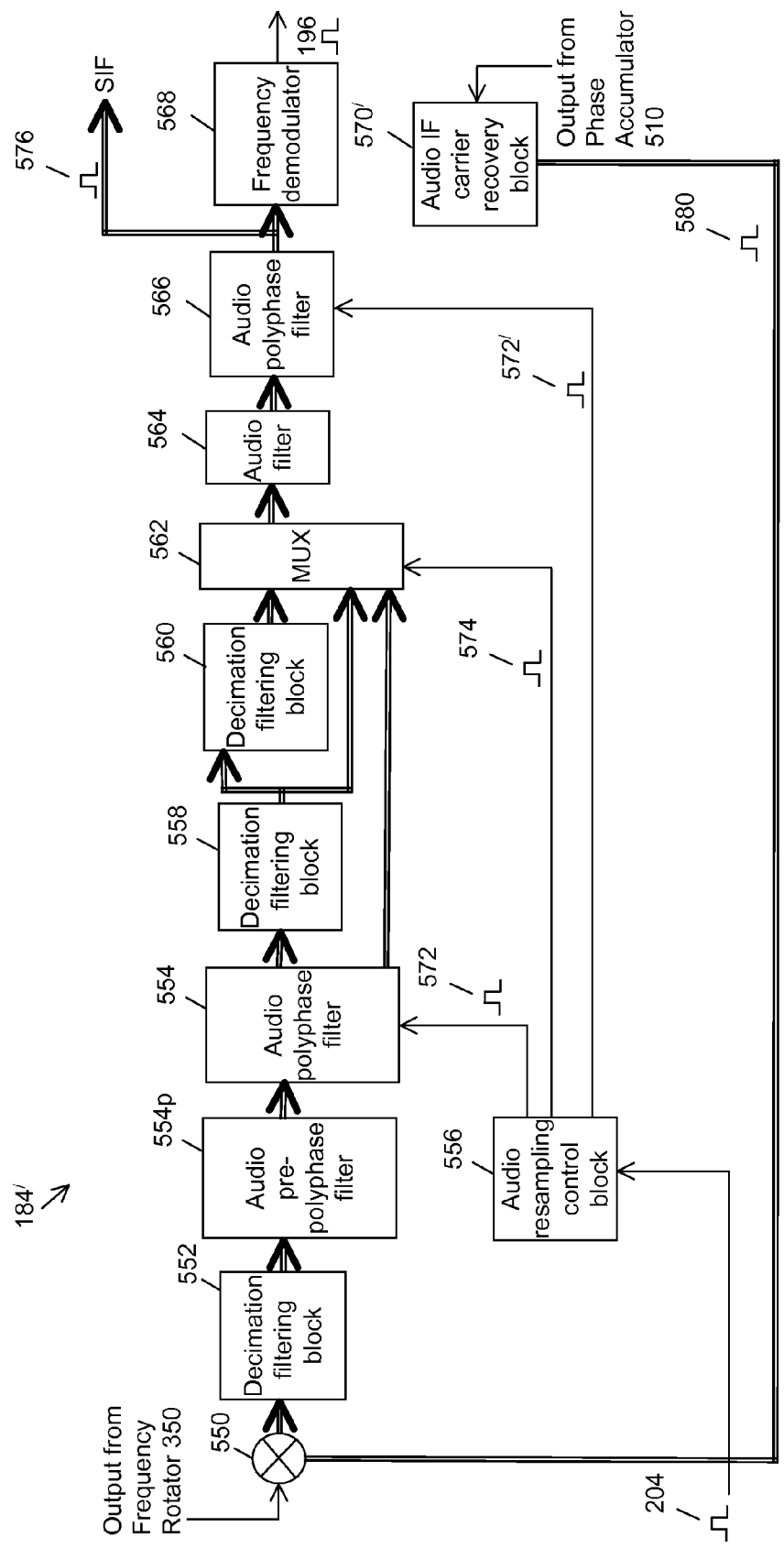
FIG. 13B is a block diagram of an alternative exemplary embodiment of an audio filtering block that can be used in the digital processing block.

In an alternative embodiment, the audio filtering blocks 184 and 186 have a different configuration as shown by audio filtering block 184' in FIG. 13B. The input to the audio filtering block 184' is the output of the frequency rotator 350 in the video processing block 182 instead of the processed digitized coarse channel signal 192. The operation of the audio IF carrier recovery block 570 is also modified to compensate for the frequency shift provided in the output of the frequency rotator 350. Furthermore, in order that the audio signal may benefit from the phase error tracking provided by the carrier recovery block 378 of the video processing block 182, the output of the phase accumulator 510 is used to produce the audio frequency shift signal 580' which controls the frequency shift applied by the frequency rotator 550 to its input signal: the output of the frequency rotator 350. This can be achieved by adding the output of the phase accumulator 510 in the carrier recovery block 378 to the output of a similar phase accumulator (not shown) in the audio IF carrier recovery block 570. Accordingly, the audio IF carrier recovery block 570 still generates the free running frequency that is applied to the frequency rotator 550 in terms of frequency, but with phase correction provided by the output of the phase accumulator 510 to generate the audio frequency shift signal 580'. The end result is that the output of the frequency rotator 550 is shifted to DC in the same way that it would have been if the input to the frequency rotator 550 had not come from the output of the frequency rotator 350 (i.e. as currently described in FIG. 13A). In this way, audio carrier recovery is effectively slaved to picture carrier recovery. Note that considerable processing delay may exist in the video path between the output of the frequency rotator 350 and the output of the phase accumulator 510. Additional benefit to the reduction of phase noise in the audio path may be achieved if a similar amount of delay is inserted between the output of the frequency rotator 350 and the input to the frequency rotator 550. In this way the frequency correction provided by the frequency rotator 350 and the phase correction provided by the phase accumulator 510 are effectively synchronized.

Figure 14:
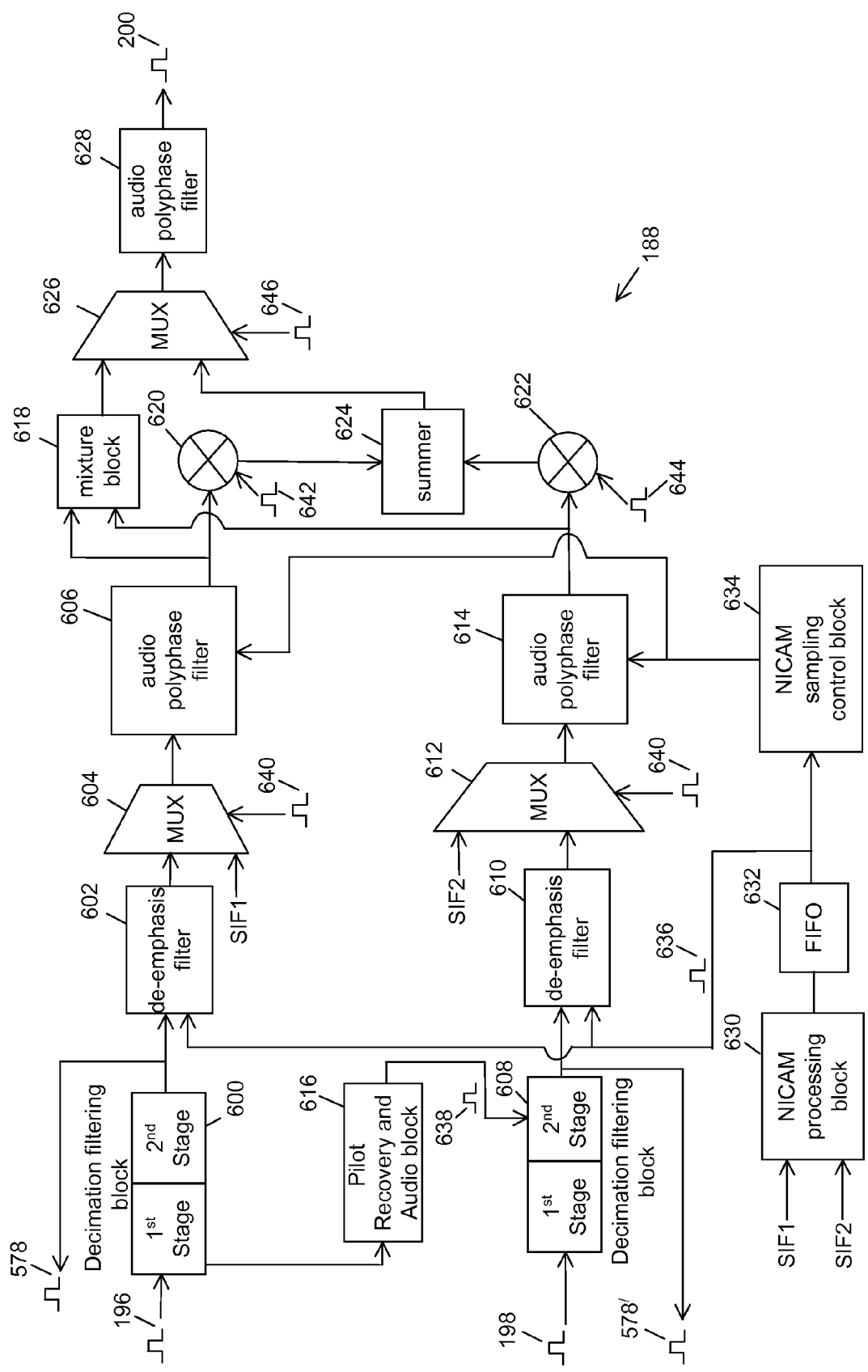
FIG. 14 is a block diagram of an exemplary embodiment of an audio processing block that can be used in the digital processing block.

Referring now to FIG. 14, shown therein is a block diagram of an exemplary embodiment of the audio processing block 188. The audio processing block 188 has a first processing pathway including a first decimation filtering block 600, a de-emphasis filter 602, a first multiplexer 604, and a first audio polyphase filter 606. The audio processing block 188 also includes a second processing pathway including a second decimation filtering block 608, a de-emphasis filter 610, a second multiplexer 612 and a second audio polyphase filter 614.

The first and second decimation filtering blocks 600 and 608 each have first and second stages that perform decimation filtering. The output of the first stage of the first decimation filtering block 600 is connected to a pilot recovery and audio extraction block 616. The output of the pilot recovery and audio extraction black 616 is connected to the input of the second stage of the second decimation filtering block 608.

The outputs of the first and second audio polyphase filters 606 and 614 are connected to a mixture block 618. The outputs of the first and second audio polyphase filters 606 and 614 are also connected to frequency rotators 620 and 622, respectively, which are both connected to a summer 624. The output of the mixture block 618 and the summer block 624 are provided to a third multiplexer 626. The third multiplexer 626 is connected to a third audio polyphase filter 628. The audio processing block 188 also includes a NICAM processing block 630, a FIFO 632 and a NICAM sampling control block 634. The NICAM processing block 630 is a combination of a NICAM demodulator and decoder.

In operation, the audio processing block 188 can be provided with a variety of input signals depending on the audio broadcast standard that is used for providing the audio information of the desired television channel signal 22. For instance, if one audio carrier is used for the desired television channel signal 22, the first decimation filtering block 600 is provided with the first audio intermediate audio signal 196. Alternatively, if two audio carriers are used for the desired television channel signal 22, the first and second decimation filtering blocks 600 and 608 are provided with the first and second intermediate audio signals 196 and 198 respectively. The first and second de-emphasis filters 602 and 610 can also be provided with NICAM data which is further described below.

The first stage of each decimation filtering block 600 and 608 provides a first amount of filtering and downsampling to a first sampling rate such that secondary audio program (SAP) and L-R (Left-Right) audio information is retained. The SAP and L-R audio information exists from about 15 KHz up to about 90 KHz. The second stage of each decimation filtering block 600 and 608 provides a second amount of filtering and downsampling to a second sampling rate such that the SAP and L-R audio information is removed. The second sampling rate is a quarter of the first sampling rate. The output of the second stages of the decimation filtering blocks 600 and 608 is an FM demodulated audio baseband signal. The output of the second stage of the first decimation filtering stage 600 provides the sound IF carrier recovery signal 578 to the first audio filtering block 184. Likewise, the output of the second stage of the first second decimation filtering stage 608 provides a sound IF carrier shift signal 578' to the second audio filtering block 186.

Any DC level in the sound IF carrier recovery signal 578, which is an FM demodulated audio baseband signal, indicates that the mixing frequency of the frequency rotator 550 isn't exactly set to the carrier frequency. This can be understood since FM modulation changes the carrier frequency based on the instantaneous level of the modulating signal. If the modulating signal (at the transmitter) was at a DC level, this would be indistinguishable from a non-modulated carrier signal at a slightly different frequency. Accordingly, any DC that is present in the sound IF carrier recovery signal 578 must be due to the mixing frequency of the frequency rotator 550 being different from the actual transmitted carrier frequency and the audio carrier IF recovery block 570 accounts for this difference in the audio frequency shift feedback signal 580.

The pilot recovery and audio extraction block 616 receives the SAP and L-R audio information from the first stage of the decimation filtering block 600 and locks to the pilot tone to demodulate the L-R audio information. The pilot recovery and audio extraction block 616 can also provide a locked carrier for SAP demodulation. The demodulated L-R audio information (i.e. BTSC L-R audio signal 638) enters the second stage of the decimation filtering block 608, and gets filtered and downsampled to 48 KHz, with content up to only about 15 KHz. Those skilled in the art are familiar with the implementation of the pilot recovery and audio extraction block 616.

SAP and L-R audio information are present in North American BTSC signals (this audio standard somewhat corresponds to the NTSC video standard). Broadcasters in North America don't have to transmit SAP or stereo information. With other standards in other countries, the FM signal may contain other information, or have that information in another format. For example, in Japan, the L-R audio information sits in the FM demodulated signal just above the L+R audio information, similar to the BTSC signal, but is FM modulated instead of AM modulated. Some standards also transmit a "mode tone" within the FM demodulated signal, just above the audio portion. This can be used to indicate if a stereo signal is present, or that perhaps a second language is being transmitted.

FM audio signals are broadcast with pre-emphasis which boosts the high frequency content of the FM audio signals above high frequency noise which is inherent in FM transmission. Accordingly, the de-emphasis filters 602 and 610 are used to perform the opposite operation, de-emphasis or an attenuation of high frequencies, to restore the frequency content of the FM audio signal to its original levels. The L-R audio information is broadcast using a more complicated pre-emphasis function, requiring a corresponding de-emphasis function (wDBX) that removes the pre-emphasis. The de-emphasis functions performed by the de-emphasis filters 602 and 610 are known to those skilled in the art.

The output of the pilot recovery and audio extraction block 616 can provide SAP and EIAJ (the Japanese standard) L-R audio information. The EIAJ audio signal is FM modulated within the FM demodulated spectrum, above the baseband audio information. The second audio filtering block 186 can be used to FM demodulate this signal. For example, in EIAJ, the first audio filtering block 184 demodulates the broadcast FM signal which contains audio information from 0-15 KHz, FM modulated audio information centered at ~31 KHz, and additional audio information. This signal gets routed to the second audio filtering block 186 to be FM-demodulated in order to extract the additional audio information.

The inputs of the multiplexer 604 are the output of the de-emphasis filter 602 and the SIF1 signal provided by the first audio filtering block 184. Likewise, the inputs of the multiplexer 612 are the output of the de-emphasis filter 610 and the SIF2 signal provided by the second audio filtering block 186. Either the SIF1 and SIF2 signals are selected as the outputs of the multiplexers 604 and 612 or the outputs of the de-emphasis filters 602 and 610 are selected according to a selection control input 640 that can be pre-defined or user defined.

The outputs of the multiplexers 604 and 612 are then provided to the audio polyphase filters 606 and 614 which restore the sampling rate to a power of 2 division of the clock rate of the ADC 106. However, when NICAM audio signals accompany the desired television channel signal 22, the re-sampling rate of the audio polyphase filters 606 and 614 is selected in a different manner as is described in further detail below.

The outputs of the audio polyphase filters 606 and 614 are provided to the mixture block 618. The mixture block 618 merges the 2 audio channel signals appropriately to generate a 2 channel output (i.e. a left and right output).

Alternatively, when the audio processing block 188 provides an SIF audio output, the SIF1 and SIF2 audio signals are selected by the multiplexers 604 and 612 respectively, resampled by the audio polyphase filters 606 and 614 respectively and provided to frequency rotators 620 and 622. The SIF1 and SIF2 audio signals are then shifted in frequency according to the IF frequency shift signals 642 and 644, and are then summed by the summer 624. Both frequency rotators 620 and 622 are enabled when two sound carriers are broadcast with the desired television channel signal 22.

The multiplexer 626 selects between the output of the mixture block 618 and the output of the summer block 624 based on a selection control signal 646 which can be predefined or user-programmed depending on the mode of operation of the universal television receiver 100 which dictates the type of audio information that it should be providing. Alternatively, in at least some cases, the control signals can be provided by the control block 190 when the broadcast transmission standard has been detected. The multiplexer 626 selects the output of the mixture block 618 when the audio processing block 188 is configured to output an audio baseband signal. The multiplexer 626 selects the output of the summer 624 when the audio processing block 188 is configured to output an SIF audio signal. In both cases, the output of the multiplexer 626 is provided to the audio polyphase filter 628, which resamples the audio information to correspond with the clock rate of the ADC 106 and produces the output audio signal 200. Accordingly, the output of the audio polyphase filter 628 is either a baseband audio signal, which can be mono or stereo determined by the mixture block 618, or an SIF signal which can consist of up to two FM carriers, at some programmable frequencies.

NICAM is a digital audio transmission standard. The NICAM processing block 630 processes one of the SIF1 and SIF2 signals and locks to the symbol rate and extracts and decodes the transmitted digital data to produce the decoded NICAM audio signal 636. Those skilled in the art are familiar with NICAM demodulation and decoding. However, the symbol timing/period for the symbol rate is defined at the transmitter, which sent the desired television channel signal 22, and is unrelated to the sampling rates used in the receiver 100. Nevertheless, the decoded NICAM audio signal 636 must be correctly output by the DAC block 110, which is asynchronous to the transmitter, at the same rate.

The correct output rate can be determined by the NICAM sampling control block 634 via the FIFO 632. The output of the FIFO 632 is then provided to the de-emphasis filters 602 and 610. The FIFO 632 is a data structure and in alternative embodiments can be replaced with a memory element such as the on-chip memory (not shown) of the digital processing block 108. The correct output rate can be determined by observing the "fullness" of the FIFO 632. For instance, if the FIFO 632 is more than half-full with decoded NICAM audio data, then the output rate of the decoded NICAM audio data is too slow. In this case, the NICAM sampling control block 634 can increase the sample rate that is applied by the audio polyphase filters 606 and 614 to output the decoded NICAM audio data at a faster rate. Alternatively, if the FIFO 632 is less than half-full with decoded NICAM audio data, then the output rate of the decoded NICAM audio data is too fast. In this case, the NICAM sampling control block 634 can decrease the sample rate applied by the audio polyphase filters 606 and 614 to output the decoded NICAM audio data at a slower rate.

To initialize the operation of the NICAM processing, the length of time required for the FIFO 632 to reach "half-fullness" is measured. This time is then used to set the initial, nominal rate of resampling that is used in the audio polyphase filter blocks 606 and 614. The measurement of the "half-fullness" time and setting of the resampling rate is performed by the NICAM sampling control block 634. In other words, the rate at which the NICAM data is produced is measured so that the rate at which this data needs to be output can be determined. With respect to NICAM processing, the audio polyphase filter 628 has a fixed upsampling rate, and the adjustable audio polyphase filters 606 and 614 are configured to have a fixed output rate. Accordingly, changing the resampling rate of the audio polyphase filters 606 and 614 changes only the rate of their consumption of input data from the FIFO 632 in order to maintain the "half-fullness" of the FIFO 632.

It should be noted that in alternative embodiments of the universal television receiver 100, depending on the type of output signal 112 that is desired, such as just a single SIF output signal, only one input audio filtering block is needed as well as only a portion of the audio processing block 188. Specifically, if the SIF output is all that is needed, then only the multiplexer 604 (with the SIF1 always selected as the input), audio polyphase filter 606, frequency rotator 620, summer 624 (though now the input from the frequency rotator 622 is not present so the summer 624 becomes a simple pass-through block), the multiplexer 626 (with the output of the summer 624 always being the selected input) and the audio polyphase filter 628 are required. In such embodiments, the sound IF carrier shift recovery signal 578 will not be provided. In this case, the audio carrier recovery can be a slave to the video carrier recovery that is performed in the video processing block 182, as explained previously, so that once a lock is made to the video carrier signal, a similar lock can be made for the picture carrier signal. Alternatively, the first audio filtering block 184 can operate in a free running mode in which case the frequency relationship between the picture carrier signal and the audio carrier signal, which is defined by the television broadcast standard for the desired television channel signal 22, is used to determine appropriate values for the audio frequency shift feedback signal 580 once a lock has been made for the video carrier signal.

The universal television receiver 100 implements a two-stage gain control technique that provides variable gain in both the analog domain (i.e. in the RF and analog processing blocks 102 and 104 (as described below)) and the digital domain (i.e. in the video processing block 108 and the audio filtering blocks 184 and 186). The analog gain control block and the digital gain control block of the universal television receiver 100 can be considered to be the components of a gain control system that is used to control the level of analog and digital gain amplification. Conventionally, variable gain is applied only in the RF and analog processing blocks 102 and 104. However, the universal television receiver 100 provides variable gain in both the analog and digital domains to provide another level of flexibility in gain control that results in improved signal quality in the desired television channel signal 22.

The analog gain control block 308 provides at least one analog gain control signal to control an amount of analog amplification applied by at least one analog VGA in the receiver. A digital gain control block provides at least one digital gain control signal to control an amount of digital amplification applied by at least one digital VGA in the receiver. The digital gain control block can set a gain coefficient for at least one digital VGA based on a metric of the desired television channel signal 22. The metric can be one of Signal to Noise ratio, Signal to Noise plus distortion ratio and Bit Error Rate. The metric is selected in part depending on whether the desired television channel signal 22 is transmitted according to an analog or digital broadcast standard. The digital gain control block can be block 362 or a gain control block in a digital demodulator (see FIG. 17). In some embodiments, the analog gain control block 308 is operable in first and second modes. In the first mode, the analog gain control block 308 generates a quasi peak measurement of a digitized version of the desired television channel signal 22 and utilizes the quasi peak measurement in a feedback loop to control the amplification of at least one analog VGA. In the second mode, the analog gain control block 308 is configured to set an initial gain coefficient of at least one analog VGA based on a metric of the desired television channel signal 22. In alternative embodiments, the analog gain control block 308 only operates in the first mode or the second mode.

In the analog domain, the gain control signals provided to the various VGAs can be controlled so that the gain is distributed between the various VGAs in a more effective manner. This can be done using a variety of techniques in the first and second modes. The first mode employs a technique based on recognizing the differences in analog and digital television broadcast standards and accounting for these differences when determining an effective analog gain distribution so that the input range of the ADC 106 is effectively utilized in both cases. This technique is described in further detail with regards to FIGS. 16A-16C. The second mode employs a technique that uses signal and noise information, and digital and analog metrics to take distortion into account. This technique is described in further detail with regards to FIG. 15. In contrast, conventional techniques control two or more analog VGAs by simply using measured output levels in which the outputs contain more than just the desired television channel signal 22 and not taking into account differences in analog and digital television broadcast standards.

In the digital domain, digital variable gain amplification is used to ensure an adequate signal level for the desired television channel signal 22 after filtering by the video filter 356. The amount of filtering performed by the video filter 356 is known a priori but the levels of the interferers will vary which will affect the signal level of the desired television channel signal 22. Accordingly, the digital VGA 358 can apply gain to increase the level of the desired television channel signal 22 when operating in the analog operation mode. In embodiments in which the universal television receiver 100 is connected to a downstream digital demodulator (not shown), the demodulator can adjust the digital gain control signal 400 for appropriate amplification when the video processing block 182 is operating in digital operation mode. Although not shown, a digital VGA similar to the digital VGA 358 can be connected between the audio filter 564 and the audio polyphase filter 566 in order to compensate for the reduction in audio level due to filtering and the level of interferers that are present. In this case, audio gain control can be either independently controlled based on a desired audio level or can be slaved to the digital gain control signal 398.

In an exemplary embodiment, the gain control method used herein does not rely solely on signal levels, but employs performance criteria for the demodulated video signals to more effectively set the gain settings at various locations in the RF processing block 102, the analog processing block 104 and the digital processing block 108. The performance criteria that are used can be the Bit-Error Rate (BER) for digital broadcast television signals, and Signal-to-Noise Ratio (SNR) or Signal-to-Noise+Distortion Ratio (SNDR) for analog broadcast television signals. Conventional gain control schemes only look at the signal strength right at the output of a variable gain amplifier and apply an amount of gain commensurate with the degree to which the signal strength is below some established level. However, it is important to note that the signal at the output of the variable gain amplifier can include more than the signal of interest and hence the measured level is not a true measure of the signal level. Accordingly, one of the gain control methods described herein controls the gain of various variable gain amplifiers by determining the signal quality of the demodulated video signal and in at least some cases can allow some level of distortion to occur assuming that the signal artifacts introduced from the distortion products do not affect the desired television channel signal 22 more than an allowable and measurable amount.

Figure 15:
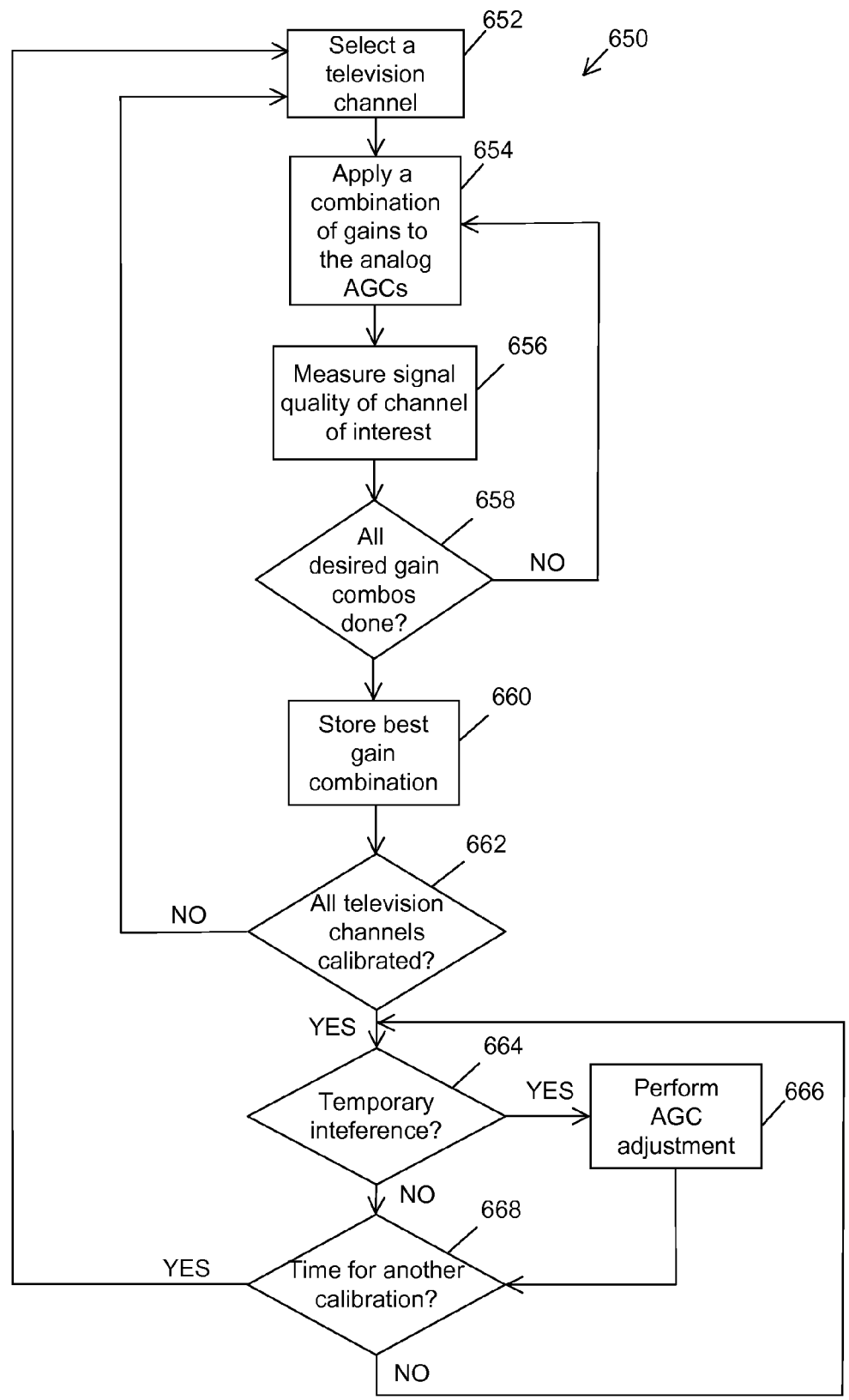
FIG. 15 is a flow chart diagram of an exemplary embodiment of a gain control method that may be employed by the universal television receiver of FIG. 3.

Referring now to FIG. 15, shown therein is a flow chart diagram of an exemplary embodiment of a gain control method 650 that can be employed by the universal television receiver 100 to determine the settings for the various VGAs in the RF and analog processing blocks 102 and 104. The gain control method 650 involves performing a calibration measurement when the universal television receiver 100 is first used, and then repeating calibration thereafter from time to time to account for any changes in the environment. For example, calibration can be carried out on power-up or when changing channels. The gain control method 650 can also account for temporary interference such as planes flying close by, for example.

The gain control method 650 starts at step 652 in which a desired television channel is selected. The method 650 then moves to step 654 at which point a first combination of gains is applied to the VGAs in the RF and analog processing blocks 102 and 104. At step 656, the quality of the demodulated desired television channel signal 22 is measured using a performance metric. The performance metric can be an analog metric such as SNR or SNDR to provide information on signal amplitude and signal distortion when the desired television channel signal 22 is broadcast according to an analog standard. For example, the SNDR metric can be used to measure distortion. Alternatively, the performance metric can be a digital metric such as BER when the desired television channel signal 22 is broadcast according to a digital standard. The signal quality (SNR, SNDR, BER or the like) is measured in the digital processing block 108 and adjustments are made to the gain control signals used to control the gain of the various analog and digital variable gain amplifiers to improve this metric. When varying the gain of the VGAs at step 654, changes to the gain coefficients are made while being careful not to overload the ADC 106. For instance, if in step 654 the gain is increased for a VGA in an earlier stage, then a proportional reduction may be needed for a VGA at a later stage to avoid overloading the ADC 106.

At step 658, the method 650 determines whether measurements have been made for a desired set of gain value (i.e. gain settings or gain coefficients) combinations of the various VGAs. If not, the method 650 goes to step 654 to apply another combination of gain values to the VGAs in the RF and analog processing blocks 102 and 104 and the digital VGA 358. If all of the desired gain value combinations have been tried, the method 650 then goes to step 660 in which the best combination of gain settings for the current television channel is saved in a look-up table in the memory of the digital processing block 108. The best combination of gain settings is selected such that the input range of the ADC 106 is effectively utilized and there is an acceptable level of signal quality in the demodulated desired television channel signal 22 determined by the performance metrics and acceptable signal quality criteria (this can be obtained from the television broadcast standards). These initial gain coefficient settings for the analog VGAs can then be stored for a given television channel in a gain coefficient table. The table can be indexed according to television channel signal and during operation the gain coefficient settings can be selected from the gain coefficient look-up table based on the desired television channel signal 22. The gain coefficient table is essentially a look-up table. At step 662, the method 650 determines whether the gain settings for other television channels must be calibrated. If so, the method 650 goes to step 652; if not, the method 650 goes to step 664.

In an example implementation, steps 654 to 660 can involve determining a first gain coefficient for at least one VGA for a nominal desired power value for the coarse channel signal 162, measuring a metric for the desired television channel signal 22, repeating the setting and measuring steps for several different gain coefficients and desired power values above and below the nominal desired power value; and selecting the gain coefficient providing the best value for the metric.

Alternatively, instead of keeping track of the measured metrics for all gain combinations and then selecting the gain coefficients that led to the best metric, the best gain coefficients can be tracked as calibration is performed by observing if the metric decreases after a gain coefficient change; if a decrease occurs then the gain coefficient(s) can be reverted one iteration. This method of gain coefficient selection can be carried out for the gain coefficients for all VGAs or first for the gain coefficients of the VGAs in the RF stage (i.e. RF processing block) and then for the gain coefficients of the VGAs in the IF stage (i.e. analog processing block) until completed.

The source of the distortion due to a particular processing block is never known, thus one typically performs some iterative adjustments using this technique. Accordingly, at steps 654 to 658, another approach can be to iterate through various gain coefficient settings for the various analog and digital VGAs and determine the maximum gain without a reduction in the measured metric. The gain coefficient for each VGA can then be adjusted upwards and downwards to determine the impact on the analog or digital metric, as the case may be, by introducing intentional distortion in order to determine how high the gain control signals can be set such that the distortion does not appreciably affect the quality of the desired television channel signal 22 after demodulation and the signal quality measured by the analog or digital metrics increase.

In another alternative embodiment, the current gain coefficient is obtained by measuring a first gain coefficient of a VGA to achieve a desired power value for the coarse channel signal 162, measuring a second gain coefficient of that VGA to achieve a desired value for the metric of the desired television channel signal 22, and calculating a difference gain coefficient or offset from the difference of the first and second gain coefficients. This VGA is now calibrated. After calibration, during use, the power at the output of the calibrated VGA can be measured, a third gain coefficient can then be calculated to achieve the desired power value and the third gain coefficient can then be adjusted by the difference gain coefficient for the calibrated VGA. The adjusted third gain coefficient is then used as the gain coefficient for the VGA. This calibration process can be performed for more than one VGA.

The various gain coefficient selection methods can also be performed for any digital VGAs that are used so that the gain coefficient look-up table can include gain coefficient settings for analog and digital VGAs. As before, the table is indexed according to television channel signal 22 and during operation the gain coefficient settings for the analog and digital VGAs can be selected based on the desired television channel signal 22 that is selected.

At step 664, the gain settings have been calibrated for all television channels. At this point, the method 650 monitors whether there are any temporary interferers, such as an airplane that flies close by, for example. If not, the method 650 moves to step 668. One technique for determining interference involves determining an expected power level for the desired television channel signal 22 and then monitoring the power level of the desired television channel signal 22 during use for any variations from the expected power level. If a temporary interferer is detected at step 664, the method 650 moves to step 666 to perform an adjustment with the analog gain control settings to compensate for the temporary interference. For instance, gain adjustment may be made for a single VGA, such as the VGA 158, to deal with a temporary interferer. The VGA 158 can be a "fine" analog VGA that has a fine step size for its gain settings while the other analog VGAs can be provided with coarse step size for their gain settings. Alternatively, more than one VGA can have fine setting control. Alternatively, one or more VGAs can be used that have a gain coefficient that is continuously variable. For a temporary interferer, the gain of the VGA 158 can be adjusted to minimize the influence of the interferer on the processed television channel signal 112. When the temporary interference is gone, the gain setting of the VGA 158 can be set based on the look-up table and the method 650 moves to step 668. If altering the gain coefficient for the single VGA does not provide sufficient gain variation to compensate for the detected temporary interference, then the analog gain control block adjusts the gain coefficient of at least another one of the VGAs to compensate for the detected temporary interference. The adjustment of the gain coefficients for the other VGAs can be made one at a time, that is for the first additional VGA, if adjusting the gain coefficient does not provide sufficient gain variation to compensate for the interferer then the gain coefficient for another VGA can be adjusted and so on and so forth.

At step 668, the method 650 determines whether it is time to perform another calibration. If so, the method 650 goes to step 652. If not, the method goes to step 664 and monitors for any temporary interferers. This calibration can be done in a periodic manner.

Accordingly, the technique of using digital and analog metrics to set the gain of the digital and analog variable gain amplifiers is used to determine the initial point at which the gain coefficients are set for the various VGAs. In this case, the initial gain coefficients are selected from the perspective of the quality of the demodulated desired television channel signal 22 rather than simply relying on power levels at the output of a VGA as is done conventionally. These gain coefficients can be used until calibration is next performed. Alternatively, the current gain coefficient for a VGA can be generated by incrementing or decrementing a previous gain coefficient based on a current measured power level of the desired television channel signal 22. Immediately following calibration, the previous gain coefficient is the initial gain coefficient obtained from calibration.

As previously mentioned, the purpose of the analog gain control block 308 is to adjust the gain settings at the RF and IF stages to adjust the level of the signal presented to the ADC 106 in order to improve the quality of the desired television channel signal 22. In an alternative, in accordance with the first mode mentioned previously, this can be done using an analog gain control feedback loop in which the output level of the ADC 106 is measured and compared to preset reference levels for both analog and digital broadcast transmission standards. If the measured level is less than the reference level then one or more gain control signals are increased, while if the measured level is higher than the reference level then one or more gain control signals are decreased. Therefore, the reference level may be thought of as a target level which the analog gain control feedback loop seeks to maintain, even when the level of the signal from the antenna 120, or other input means as the case may be, changes or the broadcast transmission standard changes for the desired television channel signal 22.

However, the characteristics of television signals transmitted under analog and digital broadcast standards, referred to herein as analog and digital broadcast television signals respectively, are fundamentally different from one another and as such the best level for digitization is different in each case. A normally (negatively) modulated analog broadcast television signal is at its highest level during the transmission of synchronizing pulses (see FIG. 12B for example). During these periods, the picture carrier signal resembles a pure sinusoid which has a peak to average power ratio of 3 dB. Such a signal can be optimally digitized by the ADC 106 by adjusting the amplitude of the signal such that its peaks are not clipped and a certain amount of minimum headroom is maintained with respect to the full-scale range of the ADC 106. In practice, several dB of headroom should be provided to allow for measurement error and dynamic effects. Conversely, digital broadcast signals may have peak to average power ratios of 10-15 dB or more. When digitizing these types of signals, the amplitude of these signals should be adjusted so that excessive clipping does not occur, though some amount of clipping may be acceptable. If the output level from the ADC 106 were to be calculated based only on the average power level, then the reference level could be set to be optimal for digitizing analog broadcast television signals or for digitizing digital broadcast television signals but not for both. Furthermore, since the coarse channel signal 162 presented to the ADC 106 may simultaneously contain both analog broadcast and digital broadcast television signals, the use of average power as a measure of level is not optimal. Similarly, the use of peak power as a measurement is also not optimal.

Figure 16A:
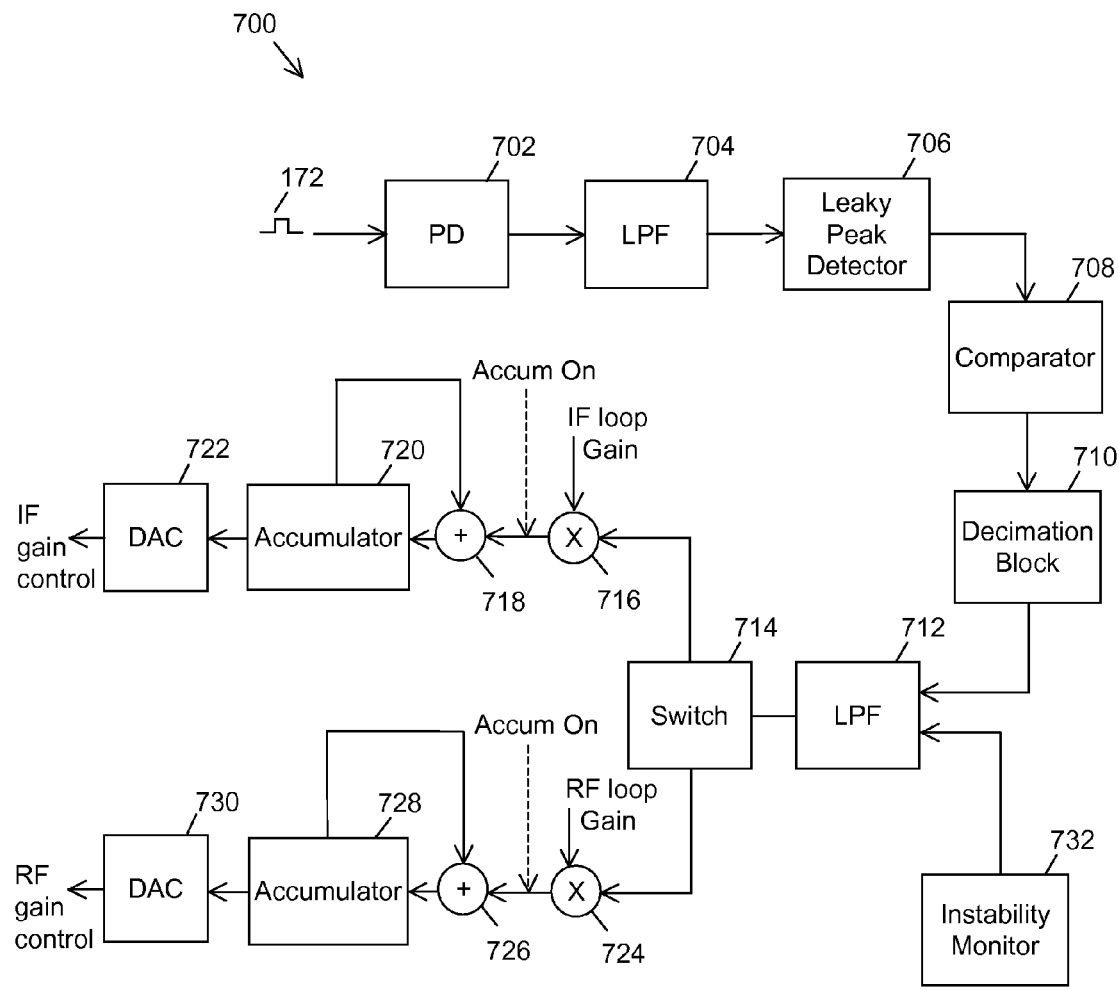
FIG. 16A is a block diagram of an exemplary embodiment of the analog gain control block of FIG. 9, which can be used to employ an alternate gain control method.

Referring now to FIG. 16A, shown therein is a block diagram of an exemplary embodiment of the analog gain control block 700, which employs a quasi peak detector to provide a measure of signal level for the output of the ADC 106. The signal level measure is used to provide more effective level control when digitizing both analog and digital broadcast television signals. Furthermore, the level control is effective regardless of whether the input to the ADC 106 is dominated by the desired television channel signal 22 or an adjacent television channel signal and regardless of whether the dominant television channel signal is transmitted using analog or digital broadcast standards. The analog gain control block 700 generally tries to maintain a 7-10 dB back-off in RMS level during synchronizing intervals for analog broadcast television signals, 12 to 15 dB back-off in RMS level for digital broadcast television signals, and somewhere in between when the digitized coarse channel signal 172 from the ADC 106 includes both signal types simultaneously. The back-off is measured relative to the full scale range of the ADC 106. Also, the analog gain control block 700 attempts to split the calculated gain between variable gain amplifiers in the RF processing block 102 and the IF variable gain amplifiers in the analog processing block 104.

The analog gain control block 700 is configured to generate a quasi peak measurement to track a level substantially equal to a mean-square level based on the digitized coarse channel signal 172 during synchronizing intervals when the desired television channel signal 22 is transmitted according to an analog broadcast standard and to track a level substantially greater than the mean-square level based on the digitized coarse channel signal 172 when the desired television channel signal 22 is transmitted according to a digital broadcast standard. When the desired television channel signal 22 is transmitted according to an analog broadcast standard, the reference level is selected to provide a first amount of headroom between a root-mean-square level of the digitized coarse channel signal and the full-scale range of the ADC 106 during synchronizing intervals. When the desired television channel signal 22 is transmitted according to a digital broadcast standard, the selected reference level provides a second amount of headroom between the root-mean-square level of the digitized coarse channel signal 172 and the full-scale range of the ADC 106. The second amount is greater than the first amount.

The analog gain control block 700 includes a Power Detector (PD) 702, a lowpass filter 704 and a leaky peak detector 706 that together provide a robust measurement of the output level of the ADC 106. The analog gain control block 700 also includes a comparator 708, a decimation block 710, a low pass filter 712, a switch 714, an IF gain adjustment path and an RF gain adjustment path. The IF gain adjustment path includes a multiplier 716, a summer 718, an accumulator 720 and a DAC 722. The RF gain adjustment path includes a multiplier 724, a summer 726, an accumulator 728 and a DAC 730. The analog gain control block 700 can also include an instability monitor 732 that is optional depending on the implementation of the ADC 106. The gain adjustment path from the instability monitor 732 can also be turned off because the bandwidth of the lowpass filter 704 can be chosen such that the measurement signal from the leaky peak detector 706 is large when the ADC 106 is unstable and in this case the analog gain control block 700 is configured to reduce the analog gain control signals that it provides to bring the ADC 106 back to a stable state. However, the instability monitor 732 can be used to detect and/or reset the ADC 106 when it is unstable.

The switch 714 and the RF gain adjustment path can also be optional if the analog gain control block 700 is used with a receiver that has an RF processing block that is not capable of receiving a gain control signal or provides its own gain control.

The power detector 702 receives the digitized coarse channel signal 172 from the ADC 106 and determines the power of this signal by squaring the magnitude of the real and imaginary components of this signal. The power detector 702 provides a power signal that is filtered by the lowpass filter 704. The lowpass filter 704 can be a first order wide-band IIR filter. The filtered power signal is then processed by the leaky peak detector 706 which tracks the peak of the output of the lowpass filter 704 and outputs a measurement signal. Since, the input signal is filtered by the lowpass filter 704 before being provided to the leaky peak detector 706, the leaky peak detector 706 will track quasi peaks, the amplitude of which depends on the amount of lowpass filtering and the nature of the input signal, but the quasi peak is lower than the actual peak of the input signal over a period of time. Accordingly, the output of the leaky peak detector 706 can be configured to track the average power (mean-square voltage) of the digitized coarse channel signal 172 during synchronizing intervals for analog broadcast standards. The output of the leaky peak detector 706 will track a level greater than the average power of the digitized coarse channel signal 172 for digital broadcast standards.

Figure 16B:
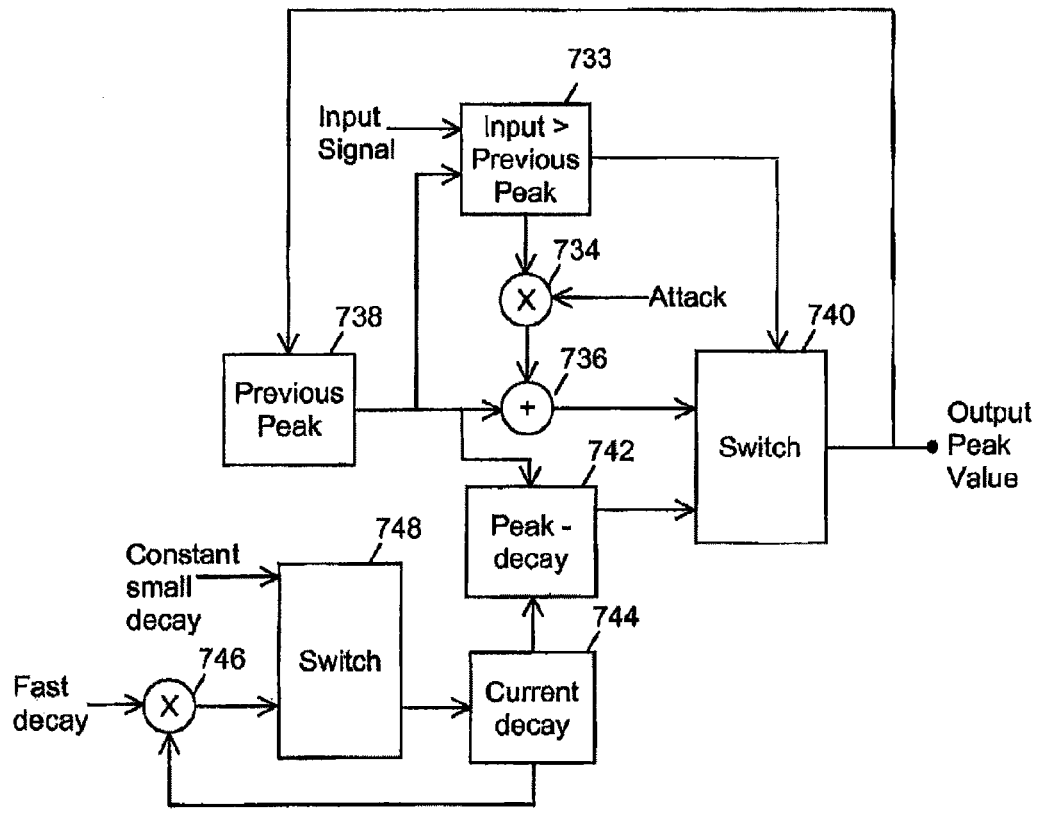
FIG. 16B is a block diagram of a leaky peak detector shown in FIG. 16A.

Referring now to FIG. 16B, shown therein is a block diagram showing the functionality for an exemplary embodiment of the leaky peak detector 706. The leaky peak detector 706 tracks the peak of its input and "leaks" over time. The leaky peak detector 706 can be implemented, from a functional point of view, using a comparator 733, a multiplier 734, a summer 736, a register 738, a switch 740, a subtractor 742, a register 744, a multiplier 746 and a switch 748. The leaky peak detector 706 also employs several parameters: a constant small decay parameter, a fast decay parameter and an attack parameter. It should be noted that the leaky peak detector 706 may be implemented using dedicated hardware or via computer code that implements the functionality of the blocks shown in FIG. 16B and is executed by a DSP.

The comparator 733 compares the level of the input signal to the leaky peak detector 706 with the previous peak value that is stored in the register 738. If the input level is larger than the previous peak value, then the difference between the input level and the previous peak value is multiplied by an attack parameter via the multiplier 734, added to the previous peak value by the summer 736 and provided by the switch 740 as the output of the leaky peak detector 706. The switch 740 performs this function when notified by the comparator 733 that the input level is greater than the previous peak value. This current peak value is also stored in the register 738 as the previous peak for the next operation of the comparator 733. The scaling of the output of the comparator 733 by the attack parameter determines how fast the leaky peak detector 706 reacts to peaks in the input signal.

On the other hand, when the input level is smaller than the previous peak value, the peak output value is decremented by a current decay parameter. In this case, the current decay parameter is subtracted from the previous peak value by the subtractor 742 and this reduced peak value is provided to the switch 740 which provides this reduced peak value as the output of the leaky peak detector 706. Also, the previous peak value is updated with this reduced peak value (i.e. decremented previous peak value). The switch 748 selects either a constant small decay value or a multiplied version of a fast decay value as the current decay parameter that is stored in the register 744. The fast decay value is multiplied by the current decay parameter stored in the register 744. The switch 748 selects the multiplied version of the fast decay value when the input signal level is less than the previous peak value for a certain period of time, otherwise the constant small decay value is selected by the switch 748.

In general, the value of the attack parameter is chosen such that the leaky peak detector 706 is reasonably responsive to peaks but not over-reactive to noise. The value of the decay parameter is chosen to be constant to avoid fluctuations due to analog broadcast video content. Since the decay parameter is small under normal operation, the leaky peak detector 706 will take a long time to decay and catch the peak of the input signal in the event of a significant drop in the amplitude of the input signal. Accordingly, a general rule for the parameters is to have fast attack and slow decay constants because the operation of the leaky peak detector 706 should be content independent (i.e. the output of the leaky peak detector 706 does not vary too much during active video lines). To improve performance, the leaky peak detector 706 is configured to enter into a fast-decay mode when it does not find a peak within a certain period of time. In the fast-decay mode, the value of the fast decay parameter is scaled recursively by the multiplier 746 until the peak output signal differs from the input signal level by a certain amount at which point the current decay value stored in the register 744 is updated with the value of the constant small decay parameter.

For example, for operation at 288 MHz, the decay parameter can vary in value from 0.0000004768 to 1. In at least some embodiments, the value of the decay parameter can vary from 0.0000004768 to 0.000005. In at least some embodiments, a value of 0.0000008 can be chosen for the decay parameter. The decay parameter should have a small value because the output of the leaky peak detector 706 should not fluctuate too much. The fast decay parameter can in general vary in value from 1 to 4096. In at least some embodiments, the value of the fast decay parameter can vary from 2 to 512. In at least some embodiments, for legacy (i.e. the desired television channel signal 22 is transmitted according to an analog broadcast standard) negative modulated signals a value of 256 can be chosen for fast step response. However, for legacy positive modulated signals, since the video content is above the sync tip, the fast decay parameter should have a small value, such as 2, to avoid a sudden drop in the peak value due to television signal content variation. For a desired television channel signal 22 that is transmitted according to a digital broadcast standard, a value of 256 can be chosen for the fast decay parameter for a fast step response. The attack parameter can in general vary in value from 0.000000476 to 1. In at least some embodiments, the value of the attack parameter can vary from 0.00003 to 0.02. The actual value is selected based on the input signal statistic. In at least some embodiments, for legacy signals, the leaky peak detector 706 tracks the peak so a value of 0.002 can be selected for the attack parameter. For a desired television channel signal 22 that is transmitted according to a digital broadcast standard, the leaky peak detector 706 tracks closer to the RMS value so a value of 0.0002 can be chosen for the attack parameter. It should be noted that the range of these parameters provided herein is defined by the number of bits (i.e. precision) in the digital circuit design.

Referring once again to FIG. 16A, the comparator 708 then produces a gain error signal by comparing the measurement signal with a reference level. The reference level is a target level that the analog gain control block 700 attempts to track for the output level of the ADC 106. Since the ADC 106 operates at a high frequency, such as 288 MHz for example, the gain error signal is greatly oversampled. Furthermore, since the AGC gain control block 700 does not have to control the IF gain and RF gain at such a high rate, the gain error signal is decimated by the decimation block 710 to a much lower rate on the order of several hundred kHz. This also reduces the bit precision required for the lowpass filter 712.

The reference level is selected such that during normal closed loop operation for analog broadcast television signals, the gain of the RF and IF VGAs will be adjusted to provide about 7-10 dB of back-off between the RMS level of the input signal to the ADC 106 during synchronizing intervals and the full scale range of the ADC 106. Since the leaky peak detector 706 tracks a level greater than the average power for digital broadcast television signals, the amount of back-off between the RMS level of the input signal to the ADC 106 and the full scale range of the ADC 106 will be larger for digital broadcast television signals than analog broadcast television signals. This difference in the amount of "back-off" will be equal to the difference in tracking level between the analog and digital broadcast signals. Depending on the configuration of the low pass filter 704 and the leaky peak detector 706, the difference may be on the order 5 dB resulting in a total back-off of 12-15 dB for digital broadcast television signals. In this way, the back-off is automatically adapted for effective digitization of the type of signal being received, without a priori knowledge of whether an analog or digital broadcast is being received. This is also effective when the coarse channel signal 162 may contain both signal types and where the relative power between them is unknown.

The gain error signal is then filtered by the lowpass filter 712 to produce a filtered gain error signal. However, in embodiments which include the instability monitor 732, the analog gain control block 700 is configured to select between the gain error signal from the comparator 708 and a gain adjustment signal provided by the instability monitor 732 as the signal which is filtered by the lowpass filter 712. In either case, the IF and RF analog gain control signals will change accordingly. In addition, the IF and RF analog gain control signals can be maintained at a previously calculated value, if this is required during operation. The operation of the instability monitor 732 is discussed in further detail below.

Figure 16C:
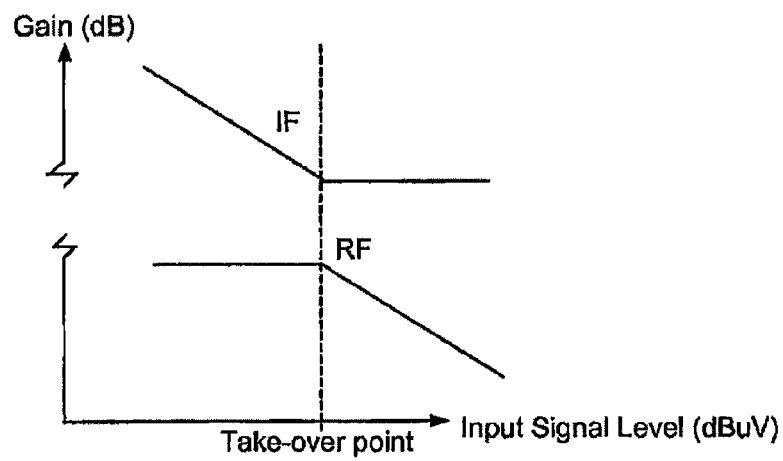
FIG. 16C is an illustration showing RF/IF take-over for the gain control method used by the analog gain control block of FIG. 16A.

The filtered gain error signal is then scaled by an IF loop gain and accumulated in the IF gain adjustment path or scaled by an RF loop gain and accumulated in the RF gain adjustment path depending on the operation of the switch 714. The switch 714 operates based on a take-over point and an input signal level as is shown in FIG. 16C. The input signal level is measured in the RF processing block 102. At power up, i.e. initialization, both the RF and IF gain control signals are at the minimum gain level and any gain adjustments that will be made are first applied to the RF gain control signal. As the input signal level gets smaller, the level of the RF gain control signal increases until it hits a maximum level at the take-over point. Further increases in gain adjustment are then applied to the IF gain control signal. Alternatively, this figure shows that for small input signal levels, the RF gain is kept at a maximum level until the input signal level approaches the take-over point at which point the RF gain is decreased with an increase in the input signal level. The amount of IF gain is also at a maximum for weak input signals, but as the input signal level increases, the amount of IF gain is reduced until the take-over point is crossed at which point the IF gain level is held constant at a minimum level. This gain adjustment scheme allows for a maximal amount of gain to be applied earlier in the analog signal processing chain for weak input signals and a minimal amount of gain to be applied for strong input signals. The operating region to the right of the take-over point can be referred to as RF gain control mode and the region to the left of the take-over point can be referred to as IF gain control mode. Alternatively, the RF gain control can be disabled in embodiments in which the receiver uses a third party tuner that performs its own AGC regulation.

The combined loop gain and bandwidth of the lowpass filter 712 determines the response time of the analog gain control block 700. The loop gain and the bandwidth of the lowpass filter 712 can be increased to improve AGC tracking for AM modulated television channel signals. However, increasing the loop gain and the bandwidth of the lowpass filter 712 too much may cause the analog gain control block 700 to be susceptible to noise or to be unstable. The loop gain for the IF gain adjustment path is provided by the multiplier 716 and the amplification factor IF loop gain. Likewise, the loop gain for the RF gain adjustment path is provided by the multiplier 724 and the amplification factor RF loop gain.

When the switch 714 is configured to adjust the amount of IF gain, the filtered gain error signal produced by the lowpass filter 712 is provided to the IF gain adjustment path at which point it is multiplied by the IF loop gain, and then accumulated by the summer 718 and the accumulator 720 with respect to a previous IF gain value. This can also be done in a negative fashion when the level of the analog IF gain control signal must decrease. The accumulated IF gain value is then provided to the DAC 722 to produce an analog IF gain control signal. The DAC 722 can be a 4-bit sigma-delta modulated DAC in which quantization noise is shifted to high frequencies in order to achieve high in-band bit resolution with a low-resolution DAC. Accordingly, in this case an analog low-pass filter (not shown) is also included to attenuate out-of-band noise at the output of the DAC 722, and a 4 dB back-off is used for stability purposes.

When the switch 714 is configured to adjust the amount of RF gain, the filtered gain error signal produced by the lowpass filter 712 is provided to the RF gain adjustment path at which point it is multiplied by the RF loop gain, and then accumulated by the summer 726 and the accumulator 728 with respect to a previous RF gain value. This can also be done in a negative fashion when the level of the analog RF gain control signal must decrease. The accumulated RF gain value is then provided to the DAC 730 to produce an analog RF gain control signal. The DAC 730 can be a 1-bit sigma-delta modulated DAC, in which case an analog low-pass filter (not shown) is also included to attenuate out-of-band noise at the output of the DAC 730, and a 0.45 dB back-off is used for stability purposes.

In embodiments of the receiver 100 that use a sigma-delta modulated ADC for the ADC 106, the instability monitor 732 is employed to check the quantized output and analog QnOverRange and QnUnderRange status bits of the ADC 106 for detecting instability. The instability monitor 732 employs a first sliding window to check the number of times that the level of the output of the ADC 106 hits the max and min full-scale levels of the ADC 106. The instability monitor 732 also employs a second sliding window to check the number of times that either the QnOverRange or the QnUnderRange status bit is high. These status bits indicate that the ADC 106 may be unstable. The length of each sliding window can be set based on the ratio of the sampling rate of the ADC 106 to the center frequency of the desired television channel at IF as well as to provide an indication of how many times the ADC 106 goes unstable during a given period of the desired television channel signal 22. Each sliding window also employs a threshold with a value selected so that instability is not detected too early, i.e. due to spurious values, or too late. In some cases, a threshold value of 50% can be used.

When the instability monitor 732 detects instability for the ADC 106, the analog gain processing block 700 can reduce the RF or IF gain accordingly to bring the ADC 106 to a stable state. The amount of gain adjustment is determined by the severity of the instability, which is a weighted sum of the percentage of instability indications in each sliding window described above. When the weighted instability indications exceed a programmable threshold, an instability signal will be asserted. If the RF and IF gains are reduced to the lowest levels but the instability signal is still being asserted, then the analog gain control block can output a signal to reset the ADC 106.

Although FIG. 16A shows only one analog IF gain control signal and one analog RF gain control signal, the analog gain control block 700 can be modified to set the level of several variable gain amplifiers in the RF and analog processing blocks 102 and 104. The analog gain control bock 700 can also be modified so that gain can be distributed amongst the digital gain amplifier used in the video processing block 182. This can be done using more take-over points in a similar fashion as that shown in FIG. 16B with additional take-over points being added for switching the amount of gain control between more than one variable gain amplifier in the IF section and for switching the amount of gain control between more than one variable gain amplifier in the RF section. In other words, gain control is modified for a variable gain amplifier until it reaches a maximum/minimum setting at which point the gain control is switched to another variable gain amplifier.

Referring now to FIG. 17A, shown therein is a block diagram of another exemplary embodiment of a universal television receiver 750. The universal television receiver 750 employs an off-the shelf RF processing block 752 which provides an IF multi-channel television signal 136' centered at 44 MHz (North America), 59 MHz (Japan) or 36 MHz (elsewhere). The IF multi-channel television signal 136' includes the desired television channel signal 22 and at least a portion of the frequency content of one or more adjacent television channel signals. In general, the components of the receiver 750 operate in a similar fashion as the components of the universal television receiver 100 with differences explained below. For instance, the analog processing block 754 and the digital processing block 756 have a similar structure and operation compared with the corresponding blocks in the universal television receiver 100 with some changes made to operating frequency and processing methodology.

For the analog processing block 754, switched capacitor filters are not used and so continuous time sub-sampling is not done. In addition, while the off-the-shelf RF processing block 752 may employ a SAW filter, coarse bandpass filters similar to coarse bandpass filters 150 and 156 are typically still needed for attenuation and anti-aliasing with the requirement that there is sufficient rolloff to provide a sufficient amount of attenuation (such as 72 dB for example) for overlapping signal components (due to sampling) near the coarse frequency region of interest. However, if the RF processing block 752 provides sufficient attenuation, then no additional filtering may be necessary. These filters in the analog processing block 754 have a center frequency at the IF frequency of the RF processing block 752. The sampling rate used for the ADC 106 can be selected to be several times the IF frequency. For example, the sampling rate can be on the order of 288 MHz.

For the digital processing block 756, depending on the sampling rate and the amount of downsampling that is used, some of the order of the components in this block, such as a frequency rotator, and the combination of a filter and a downsampler, may be reversed for improved processing efficiency. Also, in the digital processing block 756, equalization does not have to be performed if the digital demodulator 758 provides this function. In addition, analog carrier recovery is still performed due to uncertainty in the reference frequencies used in the frequency synthesizers in the RF and analog processing blocks 752 and 754 as well as the transmitters that transmit the television signals. Furthermore, the digital processing block 756 has a video processing block corresponding to the video processing block 182. Accordingly, if the desired television channel signal 22 is transmitted using an analog broadcast standard, the digital processing block 756 provides an output signal to the DAC block 110 which produces one or more output signals 112 depending on the particular analog broadcast standard. If the desired television channel signal 22 is transmitted using a digital broadcast standard, the digital processing block 756 provides a digital modulated video signal 112' which the digital demodulator 758 processes to produce a digital transport stream output 762 that can then be processed by an MPEG-2 decoder to produce video. This processing includes tracking the carrier frequency of the desired television channel signal 22. As previously mentioned, the tracking is applied to a certain frequency such as a center carrier frequency for all of the carriers that may be used for a give digital broadcast standard.

The digital demodulator 758 can optionally provide a digital mode frequency shift feedback signal 760 to the first frequency rotator of the video processing block in the digital processing block 756 to adjust the frequency shift that is applied to the processed digitized coarse channel signal 192 so that it is centered about DC regardless of the frequency offset error. The digital mode frequency shift feedback signal 760 can be provided via software or hardware as is commonly known by those skilled in the art to the first frequency rotator in the video processing block. The digital demodulator 758 can update the value of the digital mode frequency shift feedback signal 760 at various times during operation. For instance, the digital demodulator 758 can update the values in the digital mode frequency shift feedback signal 760 each time the universal television receiver 750 is tuned to a different television channel. In other embodiments, the digital demodulator 758 can also update the digital mode frequency shift feedback signal 760 to account for drift in the frequency offset error due to temperature change and the like.

Furthermore, the two-stage gain control method can be employed by the universal television receiver 750 in which gain control is used for variable gain amplification in both the analog stage (i.e. analog circuitry) and the digital stage (i.e. digital circuitry). The analog gain control techniques discussed in relation to FIGS. 15 and 16A-16C can be used. The digital demodulator 758 can also provide the digital gain control signal 400, as described below.

Referring now to FIG. 17B, shown therein is a block diagram of an exemplary embodiment for the digital demodulator 758. Generally, the digital demodulator 758 includes a demodulator block 770, an error correction block 772 and a digital gain control block 774. This general representation covers any digital demodulator. For instance, for a DVB-T digital demodulator, the demodulator block 770 is an OFDM demodulator, and the error correction block 772 includes a Viterbi decoder and a Reed-Solomon decoder. Those skilled in the art are familiar with the implementation of the demodulator block 770, the error correction block 772 and the digital gain control block 774 for a given digital television broadcast standard.

The demodulator block 770 demodulates the modulated digital signal 112' provided by the video processing block of the digital processing block 756. The demodulator block 770 can also lock to the carrier frequency of the desired television channel signal 22 and can optionally generate the digital mode frequency shift feedback signal 760 so that the video processing block in the digital processing block 756 can compensate for frequency offset errors when operating in digital operation mode. The output of the demodulator block 770 is then processed by the error correction block 772 to correct for any errors in the digital television channel information and produce a digital transport stream output 762. In some cases, the error correction block 772 can also produce the signal B2 to signify that the desired television channel signal 22 has been properly demodulated and communicate signal B2 back to the control block 190 as explained previously with respect to FIG. 7.

The digital gain control block 774 generates the digital gain control signal 400 based on the signal quality of the input data to the digital demodulator 758. For instance, the digital gain control block 774, in one implementation, compares the level of the input data to the digital demodulator 758 with a desired level, and generates an appropriate value for the digital gain control signal 400 so that this input signal is either amplified or attenuated by the video processing block to achieve this level. The digital gain control block 774 is configured to determine this amount of amplification or attenuation, as the case may be, based on the input signal before it is processed by the demodulator block 770. Alternatively, the digital gain control block 774 can generate the digital gain control signal 400 by measuring the signal quality of the modulated digital signal 112' using a digital metric and adjust the value of the digital gain control signal 400 to ensure that a proper signal quality is achieved. This can also include using a gain coefficient table as was described in relation to FIG. 15.

Figure 18:
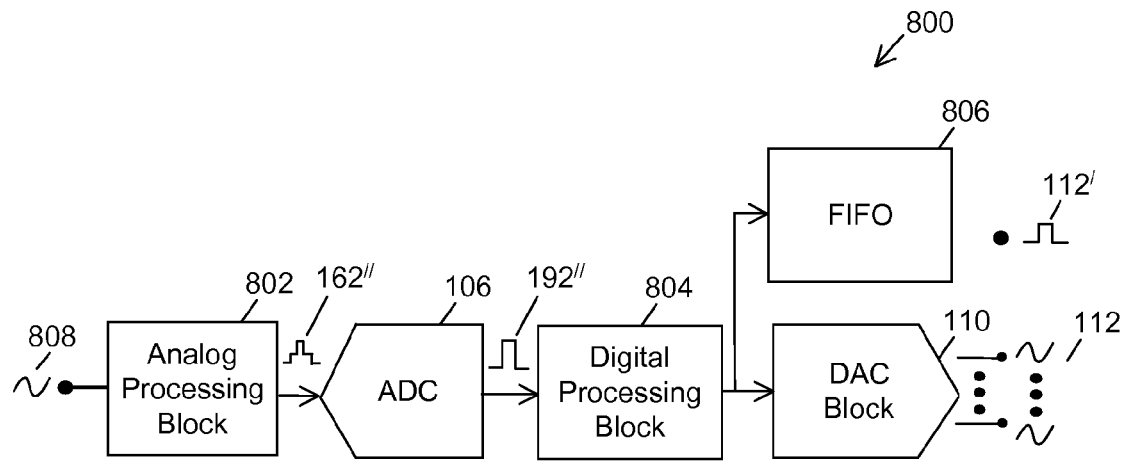
FIG. 18 is a block diagram of another exemplary embodiment of a universal television receiver.

Referring now to FIG. 18, shown therein is another embodiment of a receiver 800. The receiver 800 includes an analog processing block 802, ADC 106, a digital processing block 804, a FIFO block 806 and DAC block 110. The receiver 800 receives an IF signal 808 from a third-party television tuner and processes this signal to provide output signals 112 or 112' depending on whether the television broadcast standard is digital or analog. The input to the DAC block 110 is a digital representation of a video output for an analog television broadcast standard which is provided to the FIFO block 806 that generates the output signal 112' in a digital format. A similar arrangement can be used for non-modulated audio as the SIF output is at an Intermediate Frequency (IF).

The IF signal 808 includes the desired television channel signal 22 and other television channel signals and in conventional receivers is generally followed by a SAW filter and a fixed-gain amplifier to compensate for the loss in the SAW filter. However, in the receiver 800, the SAW filter and fixed-gain amplifier are not required. Rather, the receiver 800 takes advantage of the differences in the standards used for intermediate-frequencies throughout the world: 44 MHz in North America, 59 MHz in Japan and 36 MHz for most of the remaining world. Accordingly, the components of the receiver 800 operate in a substantially similar manner as was described for the corresponding components in the receiver 750, with some changes to accommodate the third party television tuner that provides the IF signal 808. For instance, the analog processing block 802 includes an optional attenuator and a variable-gain amplifier for signal level control. In alternative implementations, the ADC 106 is implemented as a bandpass sigma-delta ADC with its input centered at one of the aforementioned IF frequencies. Otherwise the analog processing block 802 and the digital processing block 804 operate as was described for the corresponding blocks in the receiver 750. The receiver 800 can also apply the gain control techniques of FIGS. 15 and 16A-16C with modifications made, as described previously, in the event that the third party tuner does not accept an RF gain control signal. The FIFO block 806 is used to regulate the output data flow to a downstream digital element. It should be noted that the other receiver embodiments shown herein can employ a similar FIFO block for this purpose.

It should be noted that there can be instances in which the clock or other operational frequencies used in the receiver embodiments described herein have significant energy at a frequency region which interferes with the processing of the desired television channel signal 22 thus compromising effective SNR. This can occur during the process of converting analog signals to a digital representation. For example, with a sampling rate of 288 MHz and the desired television channel centered at 36 MHz, signals at either of 252 MHz or 324 MHz would be aliased into the desired television channel. It should be noted that the term desired television channel refers to the frequency band that includes the frequency content of the desired television channel signal 22. Although these frequencies are far from the input frequency, the wideband nature of television systems implies that signal power could be present there.

There can also be coupled signals that also interfere with the desired television channel signal 22. For example, in any combined RF/mixed-signal system, the problem of interfering signals within the chip is a constant challenge. Internal oscillators, clocks, and circuitry can generate a plethora of frequencies any one of which may create interference on its own or when combined with other frequencies within the chip. The resulting signals, often referred to as spurs, are conventionally only addressed in silicon.

Conventional television tuners have some degree of filtering which serves to reduce power at the high aliasing frequencies. However, this filtering has no effect on local-oscillator leakage from the tuner or the other spurious signals just described. Although the leakage power can be as large as some television channels, it is conventionally reduced by a combination of SAW filter(s) and anti-aliasing filters before the ADC 106. However, no SAW filters are used and a minimum of anti-alias filtering is employed in the various embodiments of the analog processing block described herein; thus, the local-oscillator signal is present at full strength and may be at an aliasing frequency (i.e. a frequency that is aliased onto the frequency range that contains the desired television channel signal 22 during processing, i.e. aliased onto the desired television channel signal 22). In this regard, even a single tone may be problematic for television signals transmitted according to certain broadcast standards.

To mitigate the effects of these different types of interference, it can be assumed that interference occurs at certain frequencies and if these frequencies coincide with the desired television channel, then the control block 190 can shift clock and sampling rates so that the interference is no longer in the frequency region where the desired television channel signal 22 is being processed and no longer adversely affects the processing of the desired television channel signal 22. The adjustment in sampling rate frequency shifts an aliased version of the interferer away from the desired television channel. Resampling ratios are used to compensate for the adjusted sampling rate as described below. The shift in clock frequency affects the frequency value of the mixing signals and the sampling rate. However, because of the use of coarse filtering, coarse channel signals, and the carrier frequency recovery performed in the video and audio processing blocks, the ADC, digital processing block, DAC and the LO of the various embodiments described herein can operate together to allow the sampling rate of the entire receiver to vary. Normally, in conventional receivers, the sampling rate is fixed. However, the technique of variation in sampling rate can be employed by the receivers described herein to allow for the avoidance of potential alias signals and spurious signals generated by the various clocking domains by shifting the frequency regions that fold back or alias, due to the nature of sampling, onto the desired television channel. Other shifts can also be employed to other components of the receiver to further deal with interferers and this is discussed further below.

Figure 19A:
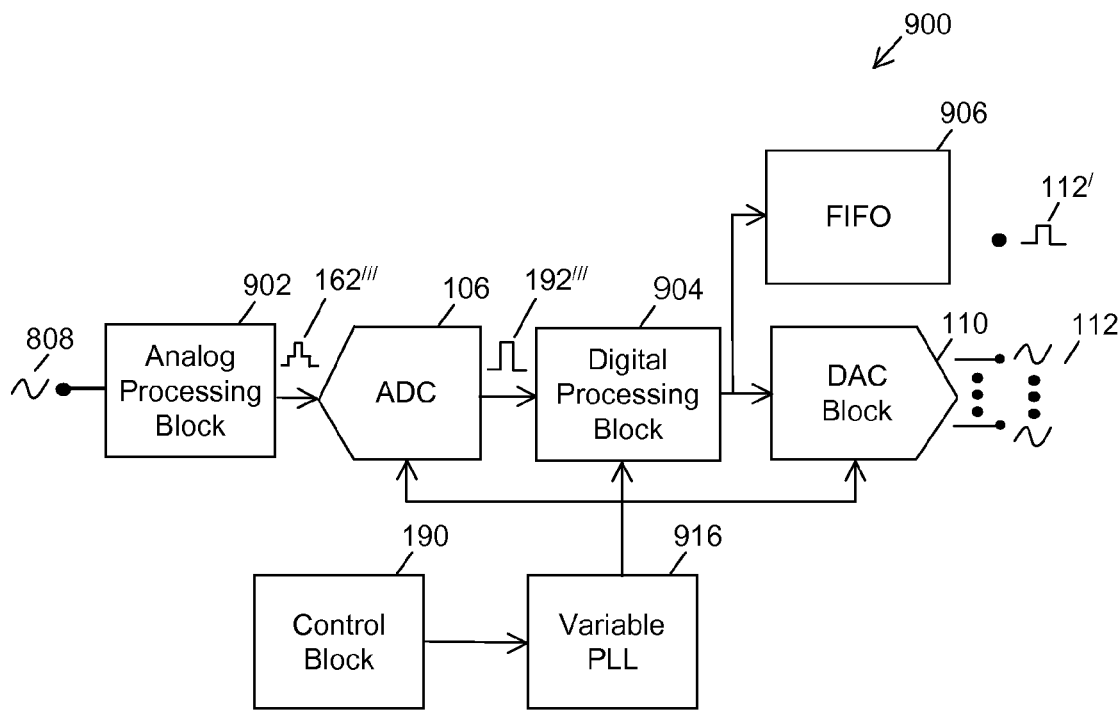
FIG. 19A is a block diagram of another exemplary embodiment of a universal television receiver that employs aliasing avoidance.

Referring now to FIG. 19A, shown therein is an alternative embodiment of a universal receiver 900 that employs shifts in clock frequency and sampling rate to avoid interference that can be aliased onto the desired television channel. Although this technique is described with reference to the receiver 900, the technique can also be used with the other receiver embodiments described herein. The universal receiver 900 comprises an analog processing block 902, an ADC 106, a digital processing block 904, a DAC block 110 and a FIFO 906. These blocks generally operate in a similar fashion as the corresponding blocks in receivers 750 and 800 with the additional feature of aliasing avoidance sampling rate adjustment described below. The universal receiver 900 also includes a variable Phase Lock Loop (PLL) 916, and the control block 190.

To avoid or otherwise mitigate the effects of aliased interference, the sampling rate of the universal receiver 900 can be changed during operation. Since the sampling rate of the ADC 106 is not fixed, the digital processing block 904 is configured to operate at a sampling rate that corresponds to the modified sampling rate of the ADC 106. This is also true for the DAC block 110. The entire digital signal path maintains a consistent clock rate. As noted earlier, in the description of the universal television receiver 100, near the input and output of the digital processing block 904 there are polyphase filters. In particular, the video processing block 182 includes polyphase filters 352 and 368, the audio filtering blocks 184 and 186 include polyphase filters 554 and 566, and the audio processing block 188 includes polyphase filters 606, 614, and 628. This is also true for the digital processing block 904. These polyphase filters 352, 368, 554, 566, 606, 614 and 628 are used to change the effective sampling rate that is employed so that signal sampling rates internally maintain the proper ratio with respect to physical clock rates to ensure that the filtering and processing characteristics within these blocks are consistent regardless of the actual physical sampling rates that are used. Accordingly, the polyphase filters 352 and 554 at the inputs of the video processing block 182, the audio filtering blocks 184 and 186 and the audio processing block 188 provide a first conversion in the effective sampling rate so that processing within these blocks occurs as if the physical sampling rate was never changed. The polyphase filters 368, 566, 606, 614 and 628 at the outputs of these blocks 182-188 then apply a second conversion in the effective sampling rate to convert back to the physical sampling rate that is used by the DAC block 110 in order to properly generate the analog output signals. Alternatively, a different output rate can be used if a standard digital output data rate had to be accommodated. Accordingly, this technique of interference avoidance includes using a first input resampling ratio for the "input" polyphase filters 352 and 554 to transform the adjusted sampling rate to a nominal processing rate that was otherwise going to be used for the processing elements between the input and output polyphase filters and using at least one output resampling ratio for the "output" polyphase filters 368, 566, 606, 614 and 628 to transform the nominal processing rate to the adjusted sampling rate or another sampling rate (more outputs resampling ratios can be used if the different outputs of the universal receiver 900 are to be provided at different rates).

Accordingly, the digital processing block 904 is configured to apply resampling ratios to compensate for the adjusted sampling rate that is used to avoid aliased interferers. This technique can be applied to aliased versions of other interferers and is not restricted to interferers generated by the local oscillator of the tuner that is used in conjunction with the receiver. For example, harmonics of the IF picture carrier of the desired television channel signal 22 as well as distortion products of various components of the receiver are predictable sources of interferers whose frequency, and the frequency of the aliased versions thereof, are known a priori and can therefore be handled with this technique.

In addition, it should be noted that this aliasing avoidance technique can be used with any tuner implementation and not just the tuner implementations that are described herein. For example, this technique is applicable to single conversion tuners, dual-conversion tuners and super-heterodyne tuners.

The technique of shifting the sampling rate to avoid aliased interference involves several aspects. Firstly, because the physical sampling rate has changed, but the desired television channel signal 22 remains at the same input frequency relative to the ADC 106, after sampling, the desired television channel signal 22 is now further offset from its expected location in terms of normalized frequency. As has been described previously, the architecture employed for the various receiver embodiments described herein allows for some shift in the frequency location of the desired television channel. The frequency change is determined by the control block 190. The second aspect involves altering the effective sampling rate that is employed by the polyphase filters 352 and 554 in order to frequency translate/transform signals for processing by subsequent fixed-width filtering stages when this technique is used with the frequency resampling technique discussed earlier for handling different channel bandwidths for different broadcast standards. To accomplish this, a first or input resampling ratio is applied, which is the ratio of the original sampling rate to the new desired sampling rate, to reflect the altered relative values because of the new physical sampling rate. Thirdly, at the output of the video processing block 182, the sampling rate is returned to its original state prior to signal conversion to the analog domain by the DAC block 110 by applying a second or output resampling ratio. The second ratio is typically the inverse of the first ratio, however, another value can be used for the second resampling rate if the output rate is desired to be at another different rate.

Table 1 illustrates how the resampling rates are modified to provide consistent operation when the physical sample rates of the ADC and DAC are changed in order to provide various modes of interference avoidance while configured to receive an NTSC television signal, for example. All values in Table 1 are in MHz except for the ratios $F_{s3}/F_{s2}$ and $F_{s5}/F_{s4}$. It can be seen that as the sample rate of the ADC 106 changes to avoid aliasing of interferers into the desired television channel, the input to the video polyphase filter 352, after being downsampled by a factor of 8, also changes. However, the sample rate for the output of the video polyphase filter 352 is held constant because the amount of resampling provided by the video polyphase filter 352 is changed in a similar manner as the change in the sample rate of the ADC 106. This allows the components between the video polyphase filter 352 and the video polyphase filter 368 to operate as if there had been no change to the sample rate of the ADC 106. The video polyphase filter 368 then applies a corresponding inverted resampling ratio (the corresponding numbers in rows 4 and 6 are the inverse of one another) so that the sample rate of the output of the video polyphase filter 368 matches the sample rate of the input of the video polyphase filter 352. Likewise, the sample rate of the input to the DAC 372 is the same as the sample rate of the output of the ADC 106. However, as mentioned, in some cases the video polyphase filter 368 applies a different resampling ratio so that the sampling rate of the input to the DAC 372 is different from the sample rate of the output of the ADC 106. This change in sample rate to avoid aliasing can be done independently or in addition to the change in sample rate for multi-channel processing described with respect to FIG. 10 depending on the particular receiver architecture in which the technique of sampling rate adjustment is employed.

TABLE 1

Exemplary Values for Resampling Ratios (all values in MHz)

| Sample Rate | Mode 1 | 2 | 3 | 4 | 5 |
|---|---|---|---|---|---|
| Output of ADC 106 ($F_{s1}$) | 280 | 284 | 288 | 292 | 296 |
| Input to video polyphase filter 352 ($F_{s2}$) | 35.0 | 35.5 | 36 | 36.5 | 37.0 |
| Output of video polyphase filter 352 ($F_{s3}$) | 15.16 | 15.16 | 15.16 | 15.16 | 15.16 |
| $F_{s3}/F_{s2}$ | 0.4331 | 0.4270 | 0.4211 | 0.4153 | 0.4097 |
| Input to video polyphase filter 368 ($F_{s4}$) | 15.16 | 15.16 | 15.16 | 15.16 | 15.16 |
| Output of video polyphase filter 368 ($F_{s5}$) | 35.0 | 35.5 | 36.0 | 36.5 | 37.0 |
| $F_{s5}/F_{s4}$ | 2.3087 | 2.3417 | 2.3747 | 2.4077 | 2.4406 |
| Input to DAC 372 ($F_{s6}$) | 280 | 284 | 288 | 292 | 296 |

In an exemplary embodiment, in order to shift the physical clock and sampling rates, the universal receiver 900 employs the variable PLL 916, which can generate several fixed output frequencies based on a sampling rate control signal received from the control block 190. To determine whether a sampling rate offset is required, the control block 190 considers the frequencies used by all of the local oscillators that are employed by the universal receiver 900 as well as the frequencies used by the local oscillators that are employed in circuits which are connected to the receiver 900, such as an RF front end tuner. The control block 190 considers these local frequencies and harmonics of these local oscillator frequencies to be interferers. The control block 190 then considers the aliasing bands associated with a plurality of sampling rates that can be selected from. The aliasing bands are determined based on the desired television channel that is being digitized and these aliasing bands basically occur at integer multiples of the sampling rate plus or minus the IF frequency range that corresponds to the desired television channel (see FIGS. 19C and 19D for an example of the aliasing bands at the first integer multiple). When the control block 190 determines that at least one interferer resides in an aliasing band when using the nominal sampling rate, the control block 190 checks for other sampling rates for which the aliasing bands do not include an interferer and then calculates the required values for the resampling ratios. Accordingly, while the amplitude of the interferer is not known a priori, it is assumed that the presence of an aliased interferer within the desired television channel will have a detrimental effect on the quality of the desired television channel signal 22 and should be removed.

For example, the variable PLL 916 can generate a clock signal at five fixed output frequencies: 280 MHz, 284 MHz, 288 MHz, 292 MHz and 296 MHz. The nominal operating frequency can be set to the middle of the five values, i.e. 288 MHz. When the control block 190 determines that an interferer is in an aliasing band of the 288 MHz sampling rate, the control block 190 can instruct the variable PLL 916 to generate a modified clock signal for which the interferer is not in an aliasing band. The modified clock signal is used to provide the adjusted sampling rate. The modified clock signal is then provided to the ADC 106, the digital processing block 904 and the DAC block 110.

Figure 19B:
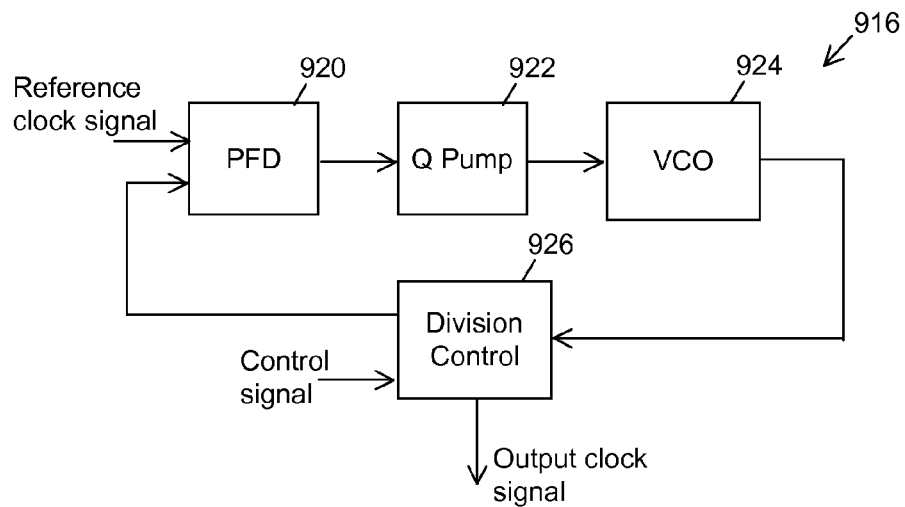
FIG. 19B is a block diagram of an exemplary embodiment for the variable Phase Lock Loop of FIG. 19A.

In an exemplary embodiment shown in FIG. 19B, the variable PLL 916 includes a Phase/Frequency Detector (PFD) 920, a charge (Q) pump 922, a Voltage Controlled Oscillator (VCO) 924 and a division control block 926. The PFD 920 receives a reference clock signal and a frequency divided version of an oscillation signal that is output by the VCO 924. The PFD 920 determines the error in phase for the frequency divided signal with respect to the reference signal, and provides this phase error to the charge pump 922. The charge pump 922 then generates an output voltage to track the desired output frequency of the variable PLL 916. The VCO 924 receives the output voltage of the charge pump 922 and generates the oscillation signal. The frequency of the oscillation signal is then shifted to a lower rate by the division control block 926 according to the sampling rate control signal provided from the control block 190 based on a desired sampling rate. The division control block 926 then provides the desired clock signal for sampling at the desired sampling rate.

Figure 19C:
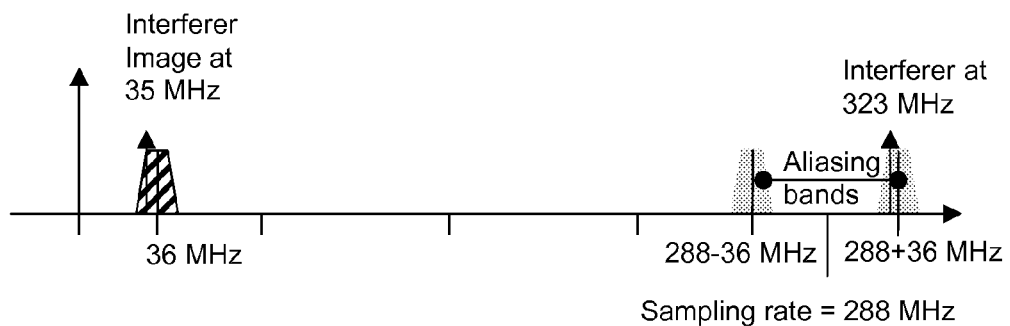
FIG. 19C is a spectral plot illustrating interference of a desired television channel due to aliasing.
Figure 19D:
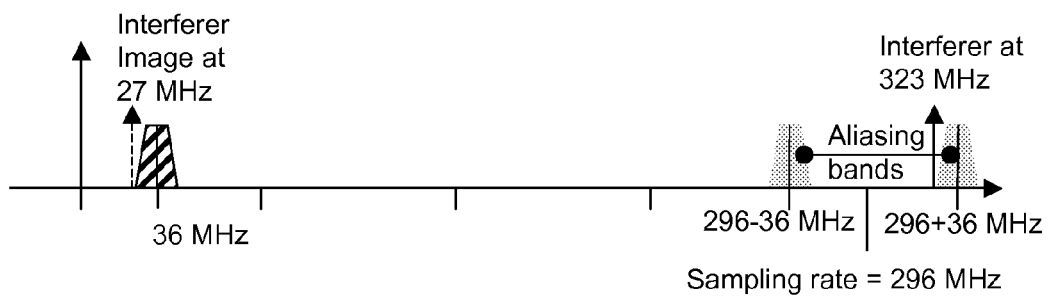
FIG. 19D is a spectral plot illustrating the avoidance of an aliased interferer onto the desired television channel by using sampling rate adjustment.

Referring now to FIG. 19C, shown therein is a spectral plot showing the effects of aliased interference when the aliasing avoidance technique is not employed. In this example, a nominal sampling rate of 288 MHz is employed for analog-to-digital conversion and the desired television channel signal 22 is a European 8 MHz wide television channel centered at 36 MHz. The ADC 106 is also centered at 36 MHz which is $\frac{1}{8}^{th}$ of the sampling rate. An interfering signal is present at 323 MHz, which could be a Local-Oscillator (LO) signal from a third party tuner (i.e. RF processing block) for example, and the aliased version of this signal appears 1 MHz away from the center of the coarse region of interest at IF (as the interferer is 1 MHz away from the center of the aliasing band), which reduces the effective SNR of the desired television channel signal 22. However, by changing the frequency of the clock signal provided by the variable PLL 916, the sampling rate can be altered as shown in FIG. 19D. For instance, if the sampling rate is increased to 296 MHz, the center of the digitized coarse region of interest is now at 37 MHz, and the desired television channel remains between 32 and 40 MHz. However, the aliased version of the interfering signal at 323 MHz is now 10 MHz away from the center of the digitized coarse region of interest and thus falls at an equivalent frequency of 27 MHz. Alternatively, the sampling rate can be changed to 292 MHz in which case the digitized coarse region of interest is now centered at 36.5 MHz. The desired television channel remains between 32-40 MHz and but the aliased interferer is moved to a frequency of 31 MHz. Alternatively, the sampling rate can be changed to 280 MHz which shifts the aliased interferer to a frequency of 43 MHz.

In an alternative, in addition to changing the sampling rate, another modification that can be made to move an aliased interferer away from the desired television channel is to also shift the local oscillator frequency. For instance, even if the sampling rate is changed, an aliased interferer may lie on the edge of the desired television channel. In this case, since the number of sampling rates may be limited, in order to provide an additional frequency shift to move the aliased interferer away from the desired television channel, the frequency of the local oscillator can be slightly moved when the local oscillator is the cause of the interferer. The effect of shifting the frequency of the local oscillator in this way is also a shift in the IF frequency of the desired television channel. However, this shift can be tolerated due to the coarse nature of the filtering that is employed by the receiver 900 as well as the frequency locking that is employed by the video and audio processing blocks, which were described for the universal television receiver 100.

In another alternative, in addition to changing the sampling rate, another modification that can be made to move an aliased interferer away from the coarse frequency region of interest is to calculate the offset of the center frequency of the desired television channel within the coarse frequency region (i.e. the capture bandwidth of the ADC 106). This offset is available based on the frequency tracking that is done by the video processing block 182 as described with reference to FIG. 10. The sampling rate can then be adjusted accordingly so that the aliased interferer does not overlap with the desired television channel even though the aliased interferer may overlap with a portion of the coarse frequency region of interest.

In another embodiment, the receiver can be modified to address interferers that are not aliased such as those interferers due to distortion, coupling and the like with respect to the Local Oscillator (LO) used in the mixing stage. Accordingly, these types of interferers include any distortion components that can end up at the desired television channel, at the image from the LO frequency or at the IF frequency. These can be due to harmonic, intermodulation, or mixing results and can be any combination of the three. For instance, interference may be due to a distortion product in which the local oscillator of the RF processing block (i.e. tuner) is one of the frequency sources. Alternatively, the interference may result when any combination of the video carrier and/or audio carrier of the desired television channel signal 22 has generated a strong intermodulation tone or harmonic product which combine at the image frequency of the LO and are then placed onto the desired television channel signal 22.

The receiver can be modified by shifting the LO frequency of the mixing stage with or without sampling rate adjustment. The LO frequency can first be shifted, without employing the technique of adjusting the sampling rate described above, to frequency shift interferers away from the desired television channel. Due to this frequency shift, the desired television channel may move, but this poses no difficulties for frequency shifts up to a certain amount due to the use of coarse filtering that is employed in the RF and analog processing blocks. Receiver architectures with traditional SAW filters cannot accommodate any such shift in LO frequency since SAW filters are very frequency specific and necessitate the precise placement of the desired television channel signal 22 to ensure that it is properly filtered without losing any information. However, the various embodiments of the receiver architectures described herein use imprecise or coarse filters that have coarse pass bands that are wider than the bandwidth of the desired television channel and can therefore accommodate a shift in frequency of the desired television channel at IF at the output of the tuner (i.e. output of the RF processing block) and at the input to the demodulator (i.e. input to the analog processing block).

With this technique, the local oscillator provides a variable oscillation frequency that can be shifted depending on the location of the interferer. As the LO frequency is shifted, the location of the interferer tone will be moved. If the difference in frequency between the interferer and the location of the desired television channel is small then merely adjusting the LO frequency will result in a sufficient change to move the interferer out of the desired television channel while keeping the desired television channel within the confines of the coarse pass bands of the filters used in the analog processing block. The amount of frequency shift can be known a priori based on the type of interferer. For instance, if the interferer is due to a distortion product of at least one of the picture carrier and/or audio carrier of the desired television channel signal 22 combined with the frequency location of the local oscillator or its image, then the amount of the shift in the variable oscillation frequency is that which is required to shift the interferer away from the desired television channel or its image.

Figure 20A:
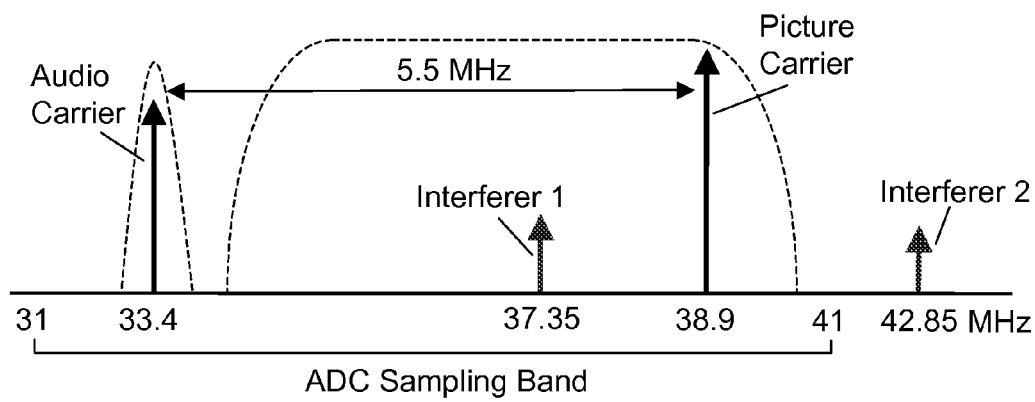
FIG. 20A is a spectral plot illustrating interference of a desired television channel due to mixing distortion products.

For example, referring now to FIG. 20A shown therein is a spectral plot illustrating interference of a desired television channel due to distortion. In this case prior to mixing by the local oscillator, the picture and audio carriers of the desired television channel signal 22 have frequencies of 76.25 MHz and 81.75 MHz respectively. The local oscillator frequency is 115.15 MHz and after mixing the picture and audio carriers have frequencies of 38.9 and 33.4 MHz respectively (i.e. LO frequency—picture carrier frequency and LO frequency—audio carrier frequency). However, after mixing a first interferer is also present at 37.35 MHz. This interferer is due to the mixing of distortion, i.e. a harmonic of the picture carrier at 152.5 MHz (i.e. 2*76.25 MHz) has mixed with the LO frequency. There is also a second interferer present at 42.85 MHz which is due to the intermodulation of the picture and audio carriers mixing with the LO. Note that that other distortion (not shown) due to a harmonic of the audio carrier (i.e. 2*audio carrier frequency) or other combinations of the picture and audio carrier frequencies (i.e. audio carrier frequency—picture carrier frequency) may get mixed into the desired television channel by the LO depending on the frequency value of the distortion and the LO frequency. In this case the first interferer at 37.35 MHz may be problematic. It should also be noted that in this case for the ADC 106, the sampling rate is 288 MHz, the sampling band center is at 36 MHz, the lower limit of the sampling band is 31 MHz and the upper band of the sampling limit is 41 MHz. This is shown as the ADC sampling band in FIG. 20A.

Figure 20B:
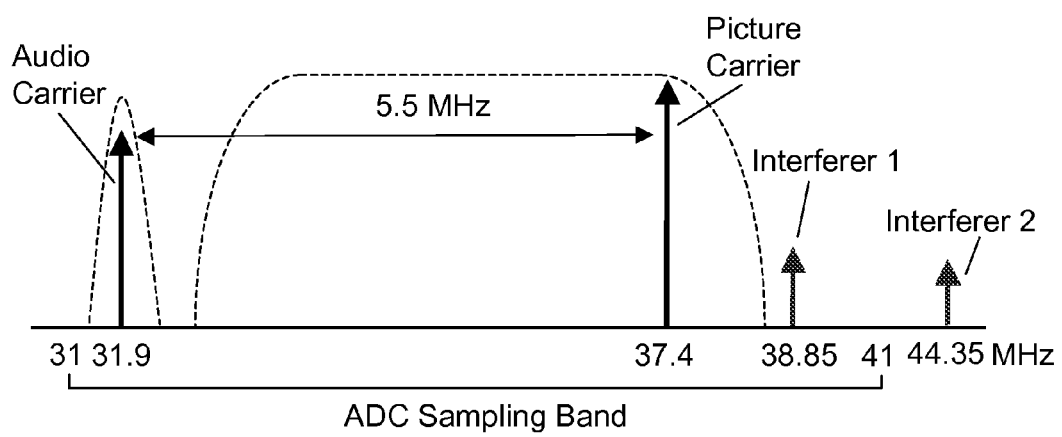
FIG. 20B is a spectral plot illustrating the avoidance of distortion interference of the desired television channel by using a local oscillator frequency shift.

Referring now to FIG. 20B, shown therein is a spectral plot illustrating the avoidance of the distortion interference of FIG. 20A by applying a local oscillator frequency shift. In this case, the picture carrier, audio carrier and distortion are at the same frequencies of 76.25 MHz, 81.75 MHz and 152.5 MHz prior to mixing, however the LO frequency has now been shifted slightly to 113.65 MHz. Accordingly, after mixing the picture and audio carriers have frequencies of 37.4 and 31.9 MHz respectively while the first interferer now has a frequency of 38.85 MHz and the second interferer now has a frequency of 44.35 MHz. Accordingly, in this case both of the interferers have now been frequency shifted away from the desired television channel by applying a small frequency shift to the LO frequency such that no interferer directly lies within the desired television band. Also, the sampling properties of the ADC 106 have not been changed.

In those cases in which a much larger shift is needed in the variable oscillation frequency of the LO such that the desired television channel is no longer within the coarse pass bands of the analog processing block, the technique of adjusting the sampling rate is also used to ensure that the interferer is shifted away from the desired television channel while still capturing the desired television channel within the coarse pass bands of the coarse filters employed by the analog processing block. The sampling rate adjustment moves the center of the band of interest (i.e. that which is captured by the ADC 106) and therefore accommodates for the resulting frequency shift in the desired television channel due to changing the oscillator frequency. Accordingly, when the LO frequency has been changed by such an amount that the desired television channel moves out of the capture bandwidth of the ADC 106, the adjustment in sampling rate can be used to move the center of the capture bandwidth of the ADC 106 by an appropriate amount so that it now includes the desired television channel and excludes the interferer.

Figure 21A:
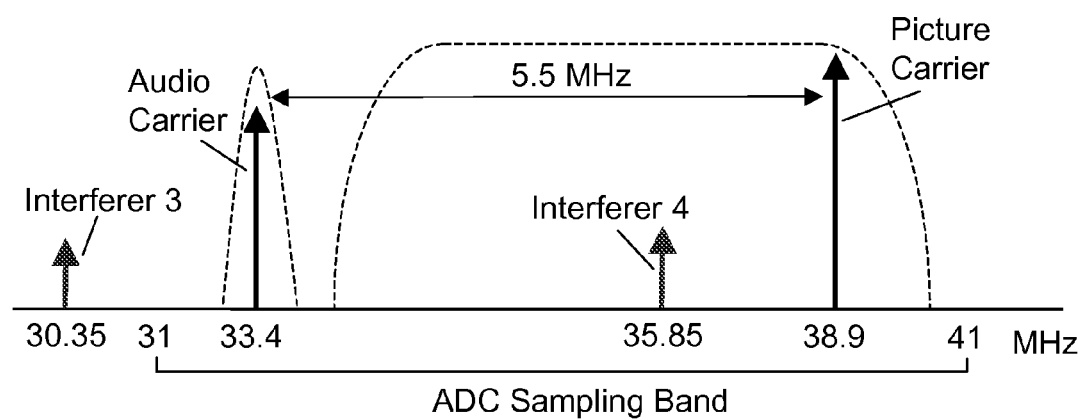
FIG. 21A is another spectral plot illustrating interference of a desired television channel due to mixing of distortion products.

For example, referring now to FIG. 21A shown therein is a spectral plot illustrating interference of a desired television channel due to distortion. In this case prior to mixing by the local oscillator, the picture and audio carriers of the desired television channel signal 22 have frequencies of 69.25 MHz and 74.75 MHz respectively. The local oscillator frequency is 108.2 MHz and after mixing the picture and audio carriers have frequencies of 38.9 and 33.4 MHz respectively (i.e. LO frequency—picture carrier frequency and LO frequency—audio carrier frequency). However, after mixing interferer 3 is present at 30.35 MHz. This interferer is due to the mixing of distortion, i.e. a harmonic of the picture carrier at 138.5 MHz (i.e. 2*69.25 MHz) has mixed with the LO frequency. There is also interferer 4 present at 35.85 MHz which is due to intermodulation of the picture and audio carriers mixing with the LO. In this case interferer 4 at 35.85 MHz may be problematic. It should also be noted that in this case for the ADC 106, the sampling rate is 288 MHz, the sampling band center is at 36 MHz, the lower limit of the sampling band is 31 MHz and the upper limit of the sampling band is 41 MHz.

Figure 21B:
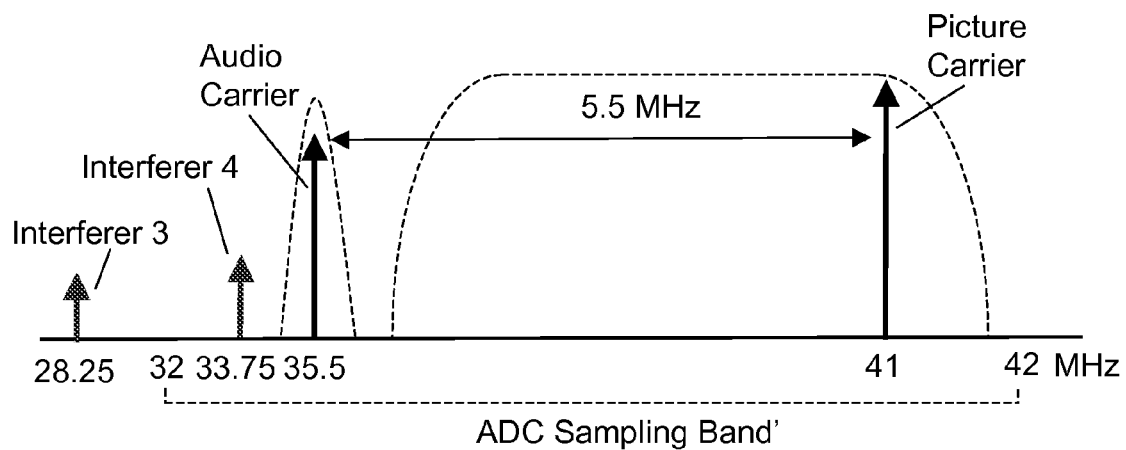
FIG. 21B is a spectral plot illustrating the avoidance of distortion interference of the desired television channel by using a local oscillator frequency shift and sampling rate adjustment.

Referring now to FIG. 21B, shown therein is a spectral plot illustrating the avoidance of the distortion interference of FIG. 21A by applying a local oscillator frequency shift. In this case, the picture carrier, audio carrier and distortion are at the same frequencies of 69.25 MHz, 74.75 MHz, 138.5 and 144 MHz prior to mixing, however the LO frequency has now been shifted slightly to 110.3 MHz. Accordingly, after mixing the picture and audio carriers have frequencies of 41 and 35.5 MHz respectively while interferer 3 now has a frequency of 28.25 MHz and interferer 4 has a frequency of 33.75 MHz. Accordingly, in this case both interferers have also been frequency shifted away from the desired television channel by applying a small frequency shift to the LO frequency such that no interferer directly lies within the desired television band. However, the television band has also shifted such that it doesn't correspond with the sampling band of the ADC 106. Accordingly, in this case, the sampling properties of the ADC 106 are changed such that the sampling rate is now 296 MHz, the sampling band center is now at 37 MHz, the lower limit of the sampling band is now at 32 MHz and the upper limit of the sampling band is now at 42 MHz. This allows the shifted desired television channel to be properly digitized without loss of information. It should be noted that the amplitudes and frequency spacing shown in FIGS. 20A, 20B, 21A and 21B are not shown to scale.

It should be noted that various aspects of processing methodology and corresponding structure have been provided herein for several different embodiments of a television receiver. Processing techniques and corresponding structure have been described for processing wideband television channel signals to obtain the video and audio information of a desired television channel signal 22 that can be transmitted according to a variety of analog or digital broadcast standards. This includes applying resampling that is configurable based on the particular broadcast standard so that a main fixed video or main fixed audio filter can be used to process television channel signals of various bandwidths. Processing techniques and corresponding structure have also been described for employing variable gain control that includes a combination of analog and digital variable gain control. Several different techniques for determining how the gain is varied during operation are provided herein. Processing techniques and corresponding structure have also been described for employing phase noise reduction to compensate for any phase noise in the desired television channel signal 22 when transmitted under an analog broadcast standard. Processing techniques and corresponding structure have also been described for using various "coarse techniques" for filtering or mixing as well as using frequency tracking to accommodate various changes due to transmission frequency or hardware as described herein. Processing techniques and corresponding structure have also been described for interference avoidance based on adjusting sampling rate, shifting certain oscillation frequencies or both adjusting sampling rate and shifting certain oscillation frequencies. Processing techniques and corresponding structure have also been described for compensating for overmodulation. Various embodiments for each of these processing techniques and corresponding structure have been described herein. It should be noted that these processing techniques and corresponding structure can all be used together in one embodiment, or various sub-combinations of these processing techniques and corresponding structure can be used as described herein when appropriate, or one or more of these techniques can be used in other receiver architectures when appropriate (i.e. "when appropriate" means that the end result is a working embodiment).

It should be noted that the filtering and downsampling that is performed by various blocks in the universal television receiver 100 may be realized by cascading several filters and downsamplers in series. This results in improved realization efficiency and greater processing efficiency since filters with a smaller number of filter taps can be used. Further, it should be noted that the sampling rates, the degree of downsampling and the sequence order of the various filters, downsamplers and frequency rotators can be adjusted for more efficient implementation. Also, it should be understood that the digital processing block 108 is implemented as a combination of an application specific integrated circuit along with a digital signal processor, with registers and memory and the like. Accordingly, the functionality of the blocks in the digital processing block 108 is implemented using a combination of hardware and software. It should further be understood that these various blocks in the digital processing section can be implemented with a different structure, either in hardware or software, from that shown herein as long as the same functionality is maintained. Similarly, modifications can be made to the RF and analog processing blocks as long as the basic functionality is maintained.

It should also be noted that the various embodiments of the receivers described herein are generally configured to process analog television broadcast standards comprising NTSC, SECAM, and PAL and digital television broadcast standards comprising ATSC, DVB-T, DMB-T and ISDB-T. Also, it should be noted that the term amplification circuitry can be interpreted to include variable gain amplifiers or amplifiers that do not have variable gain.

In one aspect, at least one of the embodiments described herein provides a television receiver for processing received television signals to provide video and audio information for a desired television channel signal. The television receiver comprises an analog processing block for providing coarse filtering and amplification to a multi-channel television signal to produce a first signal, the coarse filtering being configured to use pass bands that are wide enough to accommodate frequency shifts in the desired television channel signal and analog circuitry variability; an analog to digital converter coupled to the analog processing stage for digitizing the first signal to produce a second signal; and a digital processing block coupled to the analog to digital converter for processing the second signal to obtain the video and audio information for the desired television channel signal. The receiver is configured to track a carrier frequency of the desired television channel signal and generate and apply a frequency shift feedback signal to compensate for frequency shifts in the carrier frequency.

The digital processing block can be configured to additionally apply a known frequency shift for known frequency offset errors in the carrier frequency.

The receiver can further comprise an RF processing block coupled to the analog processing block for receiving broadcast television signals and providing amplification, filtering and mixing to generate the multi-channel television signal, wherein the RF processing block comprises a mixing stage having an oscillator with a coarse step size or a fine step size, and the digital processing block is further configured to compensate for the step size of the oscillator when generating the known frequency shift.

The analog processing block comprises at least one coarse bandpass filter or at least one coarse low pass filter for providing analog filtering.

If the television receiver comprises an RF processing block, the mixing stage can comprise elements for providing an additional level of analog filtering.

The digital processing block can also be further configured to provide equalization for compensating for non-ideal analog filtering in at least one of the analog and RF processing blocks.

The first signal is a coarse channel signal, the second signal is a digitized coarse channel signal, and the digital processing block is further configured to process the digitized coarse channel signal to provide a processed digitized coarse channel signal, and the digital processing block comprises a video processing block having a frequency tracking loop for tracking the carrier frequency of the desired television channel signal. The frequency tracking loop comprises a first frequency rotator for shifting the frequency content of the processed digitized coarse channel signal to the baseband based on the known frequency shift and additionally the frequency shift feedback signal for analog broadcast transmission standards; a video filter stage for filtering the output of the first frequency rotator; and a digital variable gain amplifier for amplifying the output of the video filter stage.

The receiver can further comprise a digital demodulator coupled to the digital processing block for processing the output of the digital variable gain amplifier and tracking the carrier frequency of the desired television channel signal to provide a digital transport stream in accordance with a digital television broadcast standard.

In this case, the digital demodulator can further be configured to generate and provide the frequency shift feedback signal to the first frequency rotator when the desired television channel signal is broadcast according to a digital television broadcast standard.

The frequency tracking loop further comprises a second frequency rotator coupled to the digital variable gain amplifier for frequency shifting the output of the digital variable gain amplifier; and a picture carrier recovery block coupled to the first and second frequency rotators, the picture carrier recovery block being configured to receive the output of the second frequency rotator, generate and provide the frequency shift feedback signal to the first frequency rotator and provide the video information of the desired television channel signal for analog broadcast transmission standards.

The picture carrier recovery block comprises a carrier recovery filter configured to filter the output of the second frequency rotator to produce a filtered picture carrier signal; a first phase rotator configured to apply phase adjustment to the filtered picture carrier signal to produce a phase-adjusted filtered picture carrier signal; and a carrier recovery block coupled to the first phase rotator and the first frequency rotator, the carrier recovery block being configured to process the phase-adjusted filtered picture carrier signal to compensate for phase noise and produce a phase control signal that is provided to the first phase rotator to control the amount of the phase adjustment, the carrier recovery block further being configured to generate the frequency shift feedback signal.

The carrier recovery block includes a phase-frequency detector configured to receive an input phase signal based on the output of the second frequency rotator, generate a phase error signal by comparing the input phase signal with a reference phase signal, and generate a frequency error signal based on the phase error signal; a summer configured to sum the frequency error signal and a version of the phase error signal to produce an adjusted frequency error signal; a frequency loop amplifier configured to provide an amplified frequency error signal based on the adjusted frequency error signal; and a frequency oscillator block configured to generate the frequency shift feedback signal based on the amplified frequency error signal.

The frequency oscillator block comprises a frequency accumulator configured to update a current frequency based on the amplified frequency error signal to produce a frequency adjusted signal; and a frequency clipping block configured to specify upper and lower limits for the frequency adjusted signal, and when the frequency adjusted signal exceeds one of the limits, the frequency clipping block is configured to limit the frequency adjusted signal to that limit. The frequency shift feedback signal is generated based on the output of the frequency clipping block.

The carrier recovery block further comprises a low pass filter configured to filter the phase error signal to produce a filtered phase error signal; and a phase loop amplifier configured to amplify the filtered phase error signal to produce the version of the phase error signal.

The digital processing block further comprises an audio filtering block having a second frequency tracking loop configured to extract an audio carrier frequency of the desired television channel signal for analog television broadcast standards and the audio filtering block is configured to apply a second known frequency shift to compensate for a known frequency offset in the audio carrier frequency.

The second frequency tracking loop comprises a third frequency rotator for shifting the frequency content of the processed digitized coarse channel signal to the baseband; an audio filter stage for filtering the output of the third frequency rotator; a frequency demodulator coupled to the audio filter stage for demodulating the output of the audio filter stage and producing a first intermediate audio signal; and an audio IF carrier recovery block that is configured to track the audio carrier signal that corresponds to the desired television channel signal based on one of the first intermediate audio signal and a sound IF carrier recovery signal, and to produce an audio frequency shift feedback signal which is provided to the third frequency rotator.

In an alternative, the digital processing block further comprises an audio filtering block that is configured to process the output of the first frequency rotator to extract an audio carrier frequency of the desired television channel signal for analog television broadcast standards, wherein the processing is based on the phase control signal.

In this alternative, the audio filtering block comprises a third frequency rotator for shifting the frequency content of the frequency shift feedback signal to the baseband; an audio filter stage for filtering the output of the third frequency rotator; a frequency demodulator for demodulating the output of the audio filter stage and producing a first intermediate audio signal; and an audio IF carrier recovery block that is configured to track the audio carrier signal that corresponds to the desired television channel signal.

In another aspect, at least one of the embodiments described herein provides a method of processing received television signals in a television receiver to provide video and audio information for a desired television channel signal. The method comprises providing coarse filtering and amplification to a multi-channel television signal to produce a first signal, the coarse filtering being configured to use pass bands that are wide enough to accommodate frequency shifts in the desired television channel signal and analog circuitry variability in the television receiver; digitizing the first signal to produce a second signal; and processing the second signal to obtain the video and audio information for the desired television channel signal by tracking a carrier frequency of the desired television channel signal and generating and applying a frequency shift feedback signal to compensate for frequency shifts in the carrier frequency.

The method further comprises additionally applying a known frequency shift for known frequency offset errors in the carrier frequency.

The method can comprise utilizing an RF processing block for receiving broadcast television signals and providing amplification, filtering and mixing to generate the multi-channel television signal, the RF processing block comprising a mixing stage having an oscillator with a coarse step size or a fine step size, and the method further comprises compensating for the step size of the oscillator when generating the known frequency shift.

The step of providing coarse filtering and amplification comprises utilizing at least one coarse bandpass filter or at least one coarse low pass filter for providing analog filtering.

When using an RF processing block, the method further comprises providing the mixing stage with elements for providing an additional level of analog filtering.

The processing step can comprise providing equalization for compensating for non-ideal analog filtering.

The first signal is a coarse channel signal, the second signal is a digitized coarse channel signal, and the method further comprises processing the digitized coarse channel signal to provide a processed digitized coarse channel signal; shifting the frequency content of the processed digitized coarse channel signal to the baseband based on the known frequency shift and additionally the frequency shift feedback signal for analog broadcast transmission standards; filtering the shifted frequency content of the processed digitized coarse channel signal with a video filter stage to produce a filtered signal; and amplifying the filtered signal to produce an amplified signal.

The method can further comprise using a digital demodulator to process the amplified signal and track the carrier frequency of the desired television channel signal to provide a digital transport stream in accordance with a digital television broadcast standard.

In this case, the method can further comprise using the digital demodulator to generate and provide the frequency shift feedback signal when the desired television channel signal is broadcast according to a digital television broadcast standard.

For analog broadcast transmission standards, the method further comprises frequency shifting the amplified signal to produce a frequency shifted amplified signal; generating the frequency shift feedback signal based on the frequency shifted amplified signal and providing the frequency shift feedback signal to the first frequency rotator; and filtering the frequency shifted amplified signal to provide the video information of the desired television channel signal.

The method can further comprise filtering the frequency shifted amplified signal to produce a filtered picture carrier signal; applying phase adjustment to the filtered picture carrier signal to produce a phase-adjusted filtered picture carrier signal; and processing the phase-adjusted filtered picture carrier signal to compensate for phase noise, to produce a phase control signal that is used to control the amount of the phase adjustment, and to generate the frequency shift feedback signal.

The method further comprises receiving an input phase signal based on the frequency shifted amplified signal; generating a phase error signal by comparing the input phase signal with a reference phase signal; generating a frequency error signal based on the phase error signal; summing the frequency error signal and a version of the phase error signal to produce an adjusted frequency error signal; amplifying the phase adjusted frequency error signal to produce an amplified frequency error signal; and generating the frequency shift feedback signal based on the amplified frequency error signal.

Generating the frequency shift feedback signal comprises updating a current frequency based on the amplified frequency error signal to produce a frequency adjusted signal; limiting the frequency adjusted signal to an upper or lower limit when the frequency adjusted signal exceeds the upper or lower limit respectively; and generating the frequency shift feedback signal based on the limited frequency adjusted signal.

The method further comprises filtering the phase error signal to produce a filtered phase error signal; and amplifying the filtered phase error signal to produce the version of the phase error signal.

The method further comprises using a second frequency tracking loop to extract an audio carrier frequency of the desired television channel signal for analog television broadcast standards by applying a second known frequency shift to compensate for a known frequency offset in the audio carrier frequency.

The method further comprises frequency shifting the frequency content of the processed digitized coarse channel signal to the baseband; filtering the frequency shifted signal using an audio filtering stage to produce a filtered signal; demodulating the filtered signal to produce a first intermediate audio signal; and tracking the audio carrier signal that corresponds to the desired television channel signal based on one of the first intermediate audio signal and a sound IF carrier recovery signal and producing an audio frequency shift feedback signal used in the frequency shifting step.

In an alternative, the method further comprises processing the shifted frequency content of the processed digitized coarse channel signal to extract an audio carrier frequency of the desired television channel signal for analog television broadcast standards, wherein the processing is based on the phase control signal.

In this alternative, the method further comprises frequency shifting the shifted frequency content of the processed digitized coarse channel signal to the baseband; filtering the frequency shifted signal using an audio filtering stage to produce a filtered signal; demodulating the filtered signal to produce a first intermediate audio signal; and tracking the audio carrier signal that corresponds to the desired television channel signal based on the first intermediate audio signal.

It should be understood that various modifications can be made to the embodiments described herein, without departing from these embodiments, the scope of which is defined in the appended claims.

The invention claimed is:

1. A receiver for processing received transmission signals to provide at least one of video and audio information for a desired channel signal, wherein the receiver comprises:
   an analog processing block for providing coarse filtering and amplification to a multi-channel signal to produce a first signal, the coarse filtering being configured to use pass bands that are wide enough to accommodate frequency shifts in the desired channel signal and analog circuitry variability, the first signal being a coarse channel signal;
   an analog to digital converter coupled to the analog processing block for digitizing the first signal to produce a second signal, the second signal being a digitized coarse channel signal; and
   a digital processing block coupled to the analog to digital converter for processing the second signal to obtain the information for the desired channel signal, wherein the receiver is configured to track a carrier frequency of the desired channel signal and generate and apply a frequency shift feedback signal to compensate for frequency shifts in the carrier frequency;
   wherein the digital processing block is configured to additionally apply a known frequency shift for known frequency offset errors in the carrier frequency; and
   wherein the receiver further comprises an RF processing block coupled to the analog processing block for receiving the transmission signals and providing amplification, filtering and mixing to generate the multi-channel signal, wherein the RF processing block comprises a mixing stage having an oscillator with a coarse step size or a fine step size, and the digital processing block is further configured to compensate for the step size of the oscillator when generating the known frequency shift.

2. The receiver of claim 1, wherein the digital processing block is further configured to provide equalization for compensating for non-ideal analog filtering in at least one of the analog processing block and RF processing block.

3. A receiver for processing received transmission signals to provide information for a desired channel signal, wherein the receiver comprises:
   an analog processing block for providing coarse filtering and amplification to a multi-channel signal to produce a first signal, the coarse filtering being configured to use pass bands that are wide enough to accommodate frequency shifts in the desired channel signal and analog circuitry variability, the first signal being a coarse channel signal;
   an analog to digital converter coupled to the analog processing block for digitizing the first signal to produce a second signal, the second signal being a digitized coarse channel signal; and
   a digital processing block coupled to the analog to digital converter for processing the second signal to obtain the information for the desired channel signal, wherein the receiver is configured to track a carrier frequency of the desired channel signal and generate and apply a frequency shift feedback signal to compensate for frequency shifts in the carrier frequency;
   wherein the digital processing block is configured to additionally apply a known frequency shift for known frequency offset errors in the carrier frequency; and
   wherein the digital processing block is further configured to process the digitized coarse channel signal to provide a processed digitized coarse channel signal, and the digital processing block comprises a first processing block having a frequency tracking loop for tracking the carrier frequency of the desired channel signal, wherein the frequency tracking loop comprises:
      a first frequency rotator for shifting frequency content of the processed digitized coarse channel signal to baseband based on the known frequency shift and additionally based on the frequency shift feedback signal for analog broadcast transmission standards;
      a filter stage for filtering the output of the first frequency rotator; and
      a digital variable gain amplifier for amplifying the output of the filter stage.

4. The receiver of claim 3, wherein the receiver further comprises a digital demodulator coupled to the digital processing block for processing the output of the digital variable gain amplifier and tracking the carrier frequency of the desired channel signal to provide a digital transport stream in accordance with a digital transmission standard.

5. The receiver of claim 4, wherein the digital demodulator is further configured to generate and provide the frequency shift feedback signal to the first frequency rotator when the desired channel signal is broadcast according to a digital transmission standard.

6. The receiver of claim 3, wherein the frequency tracking loop further comprises:
   a second frequency rotator coupled to the digital variable gain amplifier for frequency shifting the output of the digital variable gain amplifier; and
   a first carrier recovery block coupled to the first and second frequency rotators, the first carrier recovery block being configured to receive the output of the second frequency rotator, generate and provide the frequency shift feedback signal to the first frequency rotator and provide the information of the desired channel signal in accordance with analog transmission standards.

7. The receiver of claim 6, wherein the first carrier recovery block comprises:
   a carrier recovery filter configured to filter the output of the second frequency rotator to produce a filtered carrier signal;
   a first phase rotator configured to apply phase adjustment to the filtered carrier signal to produce a phase-adjusted filtered carrier signal; and
   a second carrier recovery block coupled to the first phase rotator and the first frequency rotator, the second carrier recovery block being configured to process the phase-adjusted filtered carrier signal to compensate for phase noise and produce a phase control signal that is provided to the first phase rotator to control an amount of the phase adjustment, the second carrier recovery block further being configured to generate the frequency shift feedback signal.

8. The receiver of claim 6, wherein the first carrier recovery block comprises a second carrier recovery block including:
   a phase-frequency detector configured to receive an input phase signal based on the output of the second frequency rotator, generate a phase error signal by comparing the input phase signal with a reference phase signal, and generate a frequency error signal based on the phase error signal;
a summer configured to sum the frequency error signal and a version of the phase error signal to produce an adjusted frequency error signal;
a frequency loop amplifier configured to provide an amplified frequency error signal based on the adjusted frequency error signal; and
a frequency oscillator block configured to generate the frequency shift feedback signal based on the amplified frequency error signal.

9. The receiver of claim 8, wherein the frequency oscillator block comprises:
a frequency accumulator configured to update a current frequency based on the amplified frequency error signal to produce a frequency adjusted signal; and
a frequency clipping block configured to specify upper and lower limits for the frequency adjusted signal, and when the frequency adjusted signal exceeds one of the upper and lower limits, the frequency clipping block is configured to limit the frequency adjusted signal to the one of the upper and lower limits, wherein the frequency shift feedback signal is generated based on the output of the frequency clipping block.

10. The receiver of claim 8, wherein the first carrier recovery block further comprises:
a low pass filter configured to filter the phase error signal to produce a filtered phase error signal; and
a phase loop amplifier configured to amplify the filtered phase error signal to produce the version of the phase error signal.

11. The receiver of claim 3, wherein the carrier frequency is a first carrier frequency, and the digital processing block further comprises a filtering block having a second frequency tracking loop configured to extract a second carrier frequency of the desired channel signal for analog transmission standards and the filtering block is configured to apply a second known frequency shift to compensate for a known frequency offset in the second carrier frequency.

12. The receiver of claim 11, wherein the frequency shift feedback signal comprises a first frequency shift feedback signal, the filter stage comprises a first filter stage, and the second frequency tracking loop comprises:
a third frequency rotator for shifting the frequency content of the processed digitized coarse channel signal to the baseband;
a second filter stage for filtering the output of the third frequency rotator;
a frequency demodulator coupled to the second filter stage for demodulating the output of the second filter stage and producing a first intermediate signal; and
an IF carrier recovery block that is configured to track a carrier signal that corresponds to the desired channel signal based on one of the first intermediate signal and an IF carrier recovery signal, and to produce a second frequency shift feedback signal which is provided to the third frequency rotator.

13. The receiver of claim 11, wherein the first carrier frequency is a video carrier frequency and the second carrier frequency is an audio carrier frequency.

14. The receiver of claim 7, wherein the carrier frequency is a first carrier frequency, and the digital processing block further comprises a filtering block that is configured to process the output of the first frequency rotator to extract a second carrier frequency of the desired television channel signal for analog transmission standards, wherein the processing is based on the phase control signal.

15. The receiver of claim 7, wherein the filter stage comprises a first filter stage, the carrier frequency is a first carrier frequency, and the digital processing block further comprises a filtering block that is configured to process the output of the first frequency rotator to extract a second carrier frequency of the desired channel signal for analog transmission standards, wherein the filtering block comprises:
a third frequency rotator for shifting frequency content of the output of the first frequency rotator to baseband;
a second filter stage for filtering the output of the third frequency rotator;
a frequency demodulator for demodulating the output of the second filter stage and producing a first intermediate signal; and
an IF carrier recovery block that is configured to track a carrier signal that corresponds to the desired channel signal.

16. A method of processing received transmission signals in a receiver to provide information for a desired channel signal, wherein the method comprises:
providing coarse filtering and amplification to a multi-channel signal to produce a first signal, the coarse filtering being configured to use pass bands that are wide enough to accommodate frequency shifts in the desired channel signal and analog circuitry variability in the receiver, the first signal being a coarse channel signal;
digitizing the first signal to produce a second signal, the second signal being a digitized coarse channel signal;
processing the second signal digitally to obtain the information for the desired channel signal by tracking a carrier frequency of the desired channel signal;
generating and applying a frequency shift feedback signal to compensate for frequency shifts in the carrier frequency; and
applying a known frequency shift for known frequency offset errors in the carrier frequency;
wherein the method comprises utilizing an RF processing block for receiving transmission signals and providing amplification, filtering and mixing to generate the multi-channel signal, the RF processing block comprising a mixing stage having an oscillator with a coarse step size or a fine step size, and the method further comprises compensating for the step size of the oscillator when generating the known frequency shift.

17. A method of processing received transmission signals in a receiver to provide information for a desired channel signal, wherein the method comprises:
providing coarse filtering and amplification to a multi-channel signal to produce a first signal, the coarse filtering being configured to use pass bands that are wide enough to accommodate frequency shifts in the desired channel signal and analog circuitry variability in the receiver, the first signal being a coarse channel signal;
digitizing the first signal to produce a second signal, the second signal being a digitized coarse channel signal;
processing the second signal digitally to obtain the information for the desired channel signal by tracking a carrier frequency of the desired channel signal;
generating and applying a frequency shift feedback signal to compensate for frequency shifts in the carrier frequency; and
applying a known frequency shift for known frequency offset errors in the carrier frequency;

wherein the method further comprises:
processing the digitized coarse channel signal to provide a processed digitized coarse channel signal;
shifting frequency content of the processed digitized coarse channel signal to baseband based on the known frequency shift and additionally based on the frequency shift feedback signal for analog transmission standards;
filtering the shifted frequency content of the processed digitized coarse channel signal with a filter stage to produce a filtered signal; and
amplifying the filtered signal to produce an amplified signal.

18. The method of claim 17, wherein the method further comprises using a digital demodulator to process the amplified signal and track the carrier frequency of the desired channel signal to provide a digital transport stream in accordance with a digital transmission standard.

19. The method of claim 18, wherein the method further comprises using the digital demodulator to generate and provide the frequency shift feedback signal when the desired channel signal is broadcast according to a digital transmission standard.

20. The method of claim 17, wherein for analog transmission standards, the method further comprises:
frequency shifting the amplified signal to produce a frequency shifted amplified signal;
generating the frequency shift feedback signal based on the frequency shifted amplified signal and providing the frequency shift feedback signal to the first frequency rotator; and
filtering the frequency shifted amplified signal to provide the information of the desired channel signal.

21. The method of claim 20, wherein the method further comprises:
filtering the frequency shifted amplified signal to produce a filtered carrier signal;
applying phase adjustment to the filtered carrier signal to produce a phase-adjusted filtered carrier signal; and
processing the phase-adjusted filtered carrier signal to compensate for phase noise, to produce a phase control signal that is used to control an amount of the phase adjustment, and to generate the frequency shift feedback signal.

22. The method of claim 20, wherein the method further comprises:
receiving an input phase signal based on the frequency shifted amplified signal;
generating a phase error signal by comparing the input phase signal with a reference phase signal;
generating a frequency error signal based on the phase error signal;
summing the frequency error signal and a version of the phase error signal to produce an adjusted frequency error signal;
amplifying the phase adjusted frequency error signal to produce an amplified frequency error signal; and
generating the frequency shift feedback signal based on the amplified frequency error signal.

23. The method of claim 22, wherein generating the frequency shift feedback signal comprises:
updating a current frequency based on the amplified frequency error signal to produce a frequency adjusted signal;
limiting the frequency adjusted signal to upper and lower limits when the frequency adjusted signal exceeds one of the upper and lower limits respectively; and
generating the frequency shift feedback signal based on the limited frequency adjusted signal.

24. The method of claim 22, wherein the method further comprises:
filtering the phase error signal to produce a filtered phase error signal; and
amplifying the filtered phase error signal to produce the version of the phase error signal.

25. The method of claim 17, wherein the carrier frequency comprises a first carrier frequency and the method further comprises using a second frequency tracking loop to extract a second carrier frequency of the desired channel signal for analog transmission standards by applying a second known frequency shift to compensate for a known frequency offset in second carrier frequency.

26. The method of claim 25, wherein the filter stage comprises a first filter stage, the frequency shift feedback signal comprises a first frequency shift feedback signal, and the method further comprises:
frequency shifting the frequency content of the processed digitized coarse channel signal to the baseband to produce a frequency shifted signal;
filtering the frequency shifted signal using a filtering stage to produce a filtered signal;
demodulating the filtered signal to produce a first intermediate signal; and
tracking a carrier signal that corresponds to the desired channel signal based on one of the first intermediate signal and a sound IF carrier recovery signal and producing a second frequency shift feedback signal used in the step of frequency shifting the frequency content of the processed digitized coarse channel signal to the baseband.

27. The method of claim 25, wherein the first carrier frequency is a video carrier frequency and the second carrier frequency is an audio carrier frequency.

28. The method of claim 20, wherein the carrier frequency comprises a first carrier frequency and the method further comprises processing the shifted frequency content of the processed digitized coarse channel signal to extract a second carrier frequency of the desired television channel signal for analog transmission standards, wherein the processing is based on the phase control signal.

29. The method of claim 20, wherein the carrier frequency comprises a first carrier frequency, the filter stage comprises a first filter stage, and the method further comprises:
frequency shifting the shifted frequency content of the processed digitized coarse channel signal to the baseband to produce a frequency shifted signal;
filtering the frequency shifted signal using a filtering stage to produce a filtered signal;
demodulating the filtered signal to produce a first intermediate signal; and
tracking a carrier signal that corresponds to the desired channel signal based on the first intermediate signal.

* * * * *